United States Patent
Gao et al.

(10) Patent No.: US 11,330,254 B2
(45) Date of Patent: May 10, 2022

(54) VIDEO ENCODING METHOD AND APPARATUS, VIDEO DECODING METHOD AND APPARATUS, COMPUTER DEVICE, AND STORAGE MEDIUM

(71) Applicant: Tencent Technology (Shenzhen) Company Limited, Shenzhen (CN)

(72) Inventors: Xinwei Gao, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/988,511

(22) Filed: Aug. 7, 2020

(65) Prior Publication Data

US 2020/0374511 A1 Nov. 26, 2020

Related U.S. Application Data

(63) Continuation of application No. PCT/CN2019/084927, filed on Apr. 29, 2019.

(30) Foreign Application Priority Data

Jun. 20, 2018 (CN) .......................... 201810637511.2

(51) Int. Cl.
*H04N 19/103* (2014.01)
*H04N 19/132* (2014.01)
(Continued)

(52) U.S. Cl.
CPC ......... *H04N 19/103* (2014.11); *H04N 19/132* (2014.11); *H04N 19/176* (2014.11); *H04N 19/61* (2014.11)

(58) Field of Classification Search
CPC .. H04N 19/103; H04N 19/132; H04N 19/176; H04N 19/61
(Continued)

(56) References Cited

U.S. PATENT DOCUMENTS

| 2006/0245502 A1* | 11/2006 | Cheng | H04N 19/147 375/240.24 |
| 2011/0013692 A1* | 1/2011 | Cohen | H04N 19/59 375/240.02 |

(Continued)

FOREIGN PATENT DOCUMENTS

| CN | 102883157 A | 1/2013 |
| CN | 105898308 A | 8/2016 |

(Continued)

OTHER PUBLICATIONS

Tencent Technology, WO, PCT/CN2019/084927, Jul. 4, 2019, 5 pgs.

(Continued)

*Primary Examiner* — Nguyen T Truong
(74) *Attorney, Agent, or Firm* — Morgan, Lewis & Bockius LLP

(57) ABSTRACT

The embodiments of this application relate to a video encoding method performed at a computer device. The video encoding method includes: during video encoding, obtaining an input video sequence; selecting, from candidate video sequence encoding modes, a target video sequence encoding mode corresponding to the input video sequence, the candidate video sequence encoding modes including a constant-resolution encoding mode and a mixed-resolution encoding mode; and encoding each input video frame of the input video sequence according to the target video sequence encoding mode, to obtain encoded data.

14 Claims, 18 Drawing Sheets

(51) Int. Cl.
*H04N 19/176* (2014.01)
*H04N 19/61* (2014.01)

(58) Field of Classification Search
USPC ................................... 375/240.02
See application file for complete search history.

(56) References Cited

U.S. PATENT DOCUMENTS

| | | | |
|---|---|---|---|
| 2011/0026593 A1* | 2/2011 | New | H04N 19/59 |
| | | | 375/240.12 |
| 2012/0269275 A1* | 10/2012 | Hannuksela | H04N 19/61 |
| | | | 375/240.25 |
| 2016/0323600 A1 | 11/2016 | Ma | |
| 2018/0192061 A1* | 7/2018 | He | H04N 19/164 |

FOREIGN PATENT DOCUMENTS

| | | |
|---|---|---|
| CN | 107155107 A | 9/2017 |
| CN | 108848377 A | 11/2018 |
| CN | 109495740 A | 3/2019 |
| JP | 5225201 B2 | 7/2013 |
| KR | 20090041944 A | 4/2009 |

OTHER PUBLICATIONS

Tencent Technology, IPRP, PCT/CN2019/084927, Dec. 22, 2020, 6 pgs.
Tencent Technology, ISR, PCT/CN2019/084927, Jul. 4, 2019, 2 pgs.

* cited by examiner

| | ... | ... | ... | ... | ... | ... | |
|---|---|---|---|---|---|---|---|
| ... | C1 | c11 | A1 | a11 | B1 | b11 | ... |
| ... | c12 | c13 | a12 | a13 | b12 | b13 | ... |
| ... | C2 | c21 | A2 | a21 | B2 | b21 | ... |
| ... | c22 | c23 | a22 | a23 | b22 | b13 | ... |
| ... | C3 | c31 | A3 | a31 | B3 | b31 | ... |
| ... | c32 | c33 | a32 | a33 | b32 | b33 | ... |
| | ... | ... | ... | ... | ... | ... | |

FIG. 9B

|  | B1 | ... | ... | ... | B2 | ... | ... | ... | B3 |
|---|---|---|---|---|---|---|---|---|---|
|  | ... | ... | ... | ... | a12 | a13 | a14 | a15 | ... |
|  | ... | ... | ... | ... | a8 | a9 | a10 | a11 | ... |
|  | ... | ... | ... | ... | a4 | a5 | a6 | a7 | ... |
|  | A1 | ... | ... | ... | A2 | a1 | a2 | a3 | A3 |
|  | ... | ... | ... | ... | ... | ... | ... | ... | ... |
|  | ... | ... | ... | ... | ... | ... | ... | ... | ... |
|  | ... | ... | ... | ... | ... | ... | ... | ... | ... |
|  | C1 | ... | ... | ... | C2 | ... | ... | ... | C3 |

FIG. 9C

VIDEO ENCODING METHOD AND APPARATUS, VIDEO DECODING METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2019/084927, entitled "VIDEO CODING METHOD AND APPARATUS, VIDEO DECODING METHOD AND APPARATUS, COMPUTER DEVICE, AND STORAGE MEDIUM" filed on Apr. 29, 2019, which claims priority to Chinese Patent Application No. 201810637511.2, filed with the State Intellectual Property Office of the People's Republic of China on Jun. 20, 2018, and entitled "VIDEO ENCODING METHOD AND APPARATUS, VIDEO DECODING METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a video encoding method and apparatus, a video decoding method and apparatus, a computer device, and a storage medium.

BACKGROUND OF THE DISCLOSURE

With the development of digital media technologies and computer technologies, videos are applied to various fields, such as mobile communication, network monitoring, and network television. With the improvement of hardware performance and screen resolution, users' demand for high-definition videos is increasing.

SUMMARY

Embodiments of this applications provide a video encoding method and apparatus, a video decoding method and apparatus, a computer device, and a storage medium. By using the video encoding method, a target video sequence encoding mode of an input video sequence can be flexibly selected, the input video sequence is encoded according to the target video sequence encoding mode, and an encoding mode of the input video sequence is adaptively adjusted, so that video encoding quality can be improved under a condition of a limited bandwidth.

A video encoding method is provided. The method is performed by a computer device having a processor and memory storing a plurality of computer programs to be executed by the processor, and includes:
obtaining an input video sequence;
selecting, from candidate video sequence encoding modes, a target video sequence encoding mode corresponding to the input video sequence, the candidate video sequence encoding modes comprising a constant resolution encoding mode and a mixed resolution encoding mode; and
encoding each input video frame of the input video sequence according to the target video sequence encoding mode, to obtain encoded data.

A computer device is provided, and includes memory and a processor, the memory storing a plurality of computer programs. The plurality of computer programs, when executed by the processor, cause the processor to perform the steps of the foregoing video encoding method.

A non-transitory computer-readable storage medium is provided, and stores a plurality of computer programs. The plurality of computer programs, when executed by a processor of a computer device, cause the computer device to perform the steps of the foregoing video encoding method.

BRIEF DESCRIPTION OF THE DRAWINGS

FIG. 9B is a schematic diagram of performing interpolation on a reference frame according to an embodiment.

FIG. 9C is a schematic diagram of performing interpolation on a reference frame according to an embodiment.

DESCRIPTION OF EMBODIMENTS

Figure 1:
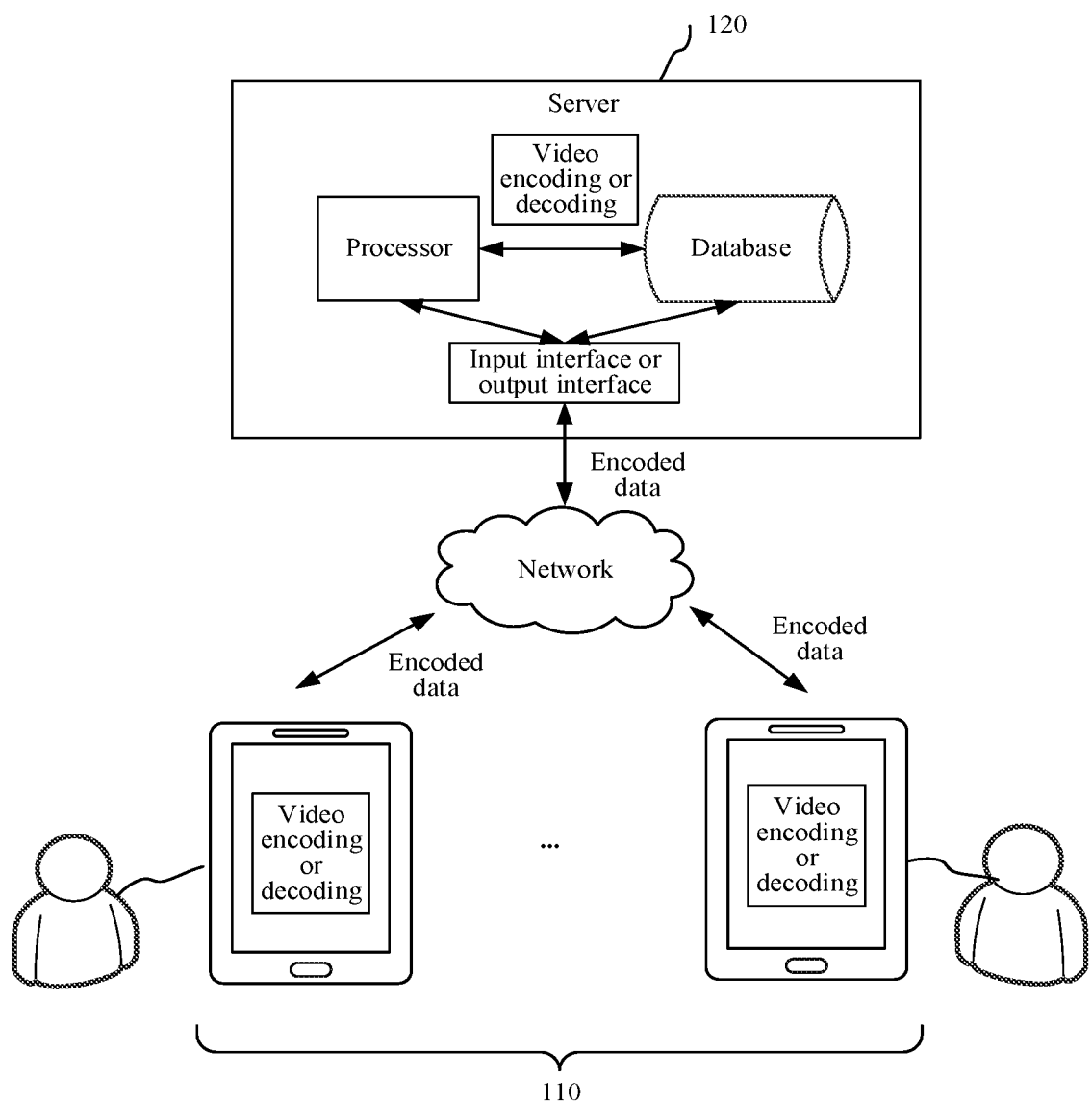
FIG. 1 is a diagram of an application environment of a video encoding method and a video decoding method according to an embodiment.

To make the objectives, technical solutions, and advantages of this application clearer and more understandable, this application is further described in detail below with reference to the accompanying drawings and the embodiments. It is to be understood that the specific embodiments described herein are only used for explaining this application, but are not intended to limit this application.

It may be understood that the terms "first", "second" and the like used in this application may be used for describing various elements in this specification. However, the elements are not limited by the terms unless otherwise specified. The terms are only used for distinguishing one element from another element. For example, without departing from the scope of this application, a first vector transformation parameter may be referred to as a second vector transformation parameter, and similarly, a second vector transformation parameter may be referred to as a first vector transformation parameter.

Under a condition of a limited bandwidth, conventional encoders indiscriminately encode video frames. This may lead to poor video quality in some scenarios. For example, at 750 kbps, quality of some video frames is poor when all video frames are indiscriminately encoded. H.264, H.265, iOS and other encoders have the similar problem.

In view of this, the embodiments of this application provide a video encoding method and apparatus, a computer device, and a storage medium. The video encoding method includes: during video encoding, obtaining an input video sequence; obtaining, from candidate video sequence encoding modes, a target video sequence encoding mode corresponding to the input video sequence, the candidate video sequence encoding modes including a constant-resolution encoding mode and a mixed-resolution encoding mode; and encoding each input video frame of the input video sequence according to the target video sequence encoding mode, to obtain encoded data. Therefore, the target video sequence encoding mode of the input video sequence can be flexibly selected, the input video sequence is encoded according to the target video sequence encoding mode, and the resolution of the input video sequence is adaptively adjusted, thereby improving video encoding quality under a condition of a limited bandwidth.

The embodiments of this application further provide a video decoding method and apparatus, a computer device, and a storage medium. The video decoding method includes: during video decoding, obtaining encoded data corresponding to a video sequence; obtaining a target video sequence decoding mode corresponding to the video sequence, the target video sequence decoding mode including a constant-resolution decoding mode or a mixed-resolution decoding mode; and decoding, according to the target video sequence decoding mode, the encoded data corresponding to the video sequence, to obtain a corresponding decoded video frame sequence. Therefore, during decoding, decoding can be flexibly performed according to the target video sequence decoding mode corresponding to the video sequence, so that an accurate decoded video frame can be obtained.

FIG. 1 is a diagram of an application environment of a video encoding method and a video decoding method according to an embodiment. As shown in FIG. 1, the application environment includes a terminal 110 and a server 120.

The terminal 110 or the server 120 may perform video encoding by using an encoder or video decoding by using a decoder. The terminal 110 or the server 120 may also perform video encoding by using a processor running a video encoding program or video decoding by using a processor running a video decoding program. After receiving, through an input interface, encoded data transmitted by the terminal 110, the server 120 may directly transmit the encoded data to the processor for decoding, or may store the encoded data in a database for subsequent decoding. After encoding an original video frame by using the processor to obtain encoded data, the server 120 may directly transmit the encoded data to the terminal 110 through an output interface, or may store the encoded data in a database for subsequent transmission. Certainly, the server 120 may alternatively transmit, after obtaining encoded data transmitted by the terminal 110, the encoded data to a corresponding receiving terminal for decoding.

The terminal 110 and the server 120 may be connected through a network. The terminal 110 may be specifically a computer device such as a desktop terminal or a mobile terminal. The mobile terminal may specifically include at least one of a mobile phone, a tablet computer, a notebook computer, and the like, but is not limited thereto. The server 120 may be implemented by an independent server or a server cluster that includes a plurality of servers.

Figure 2:
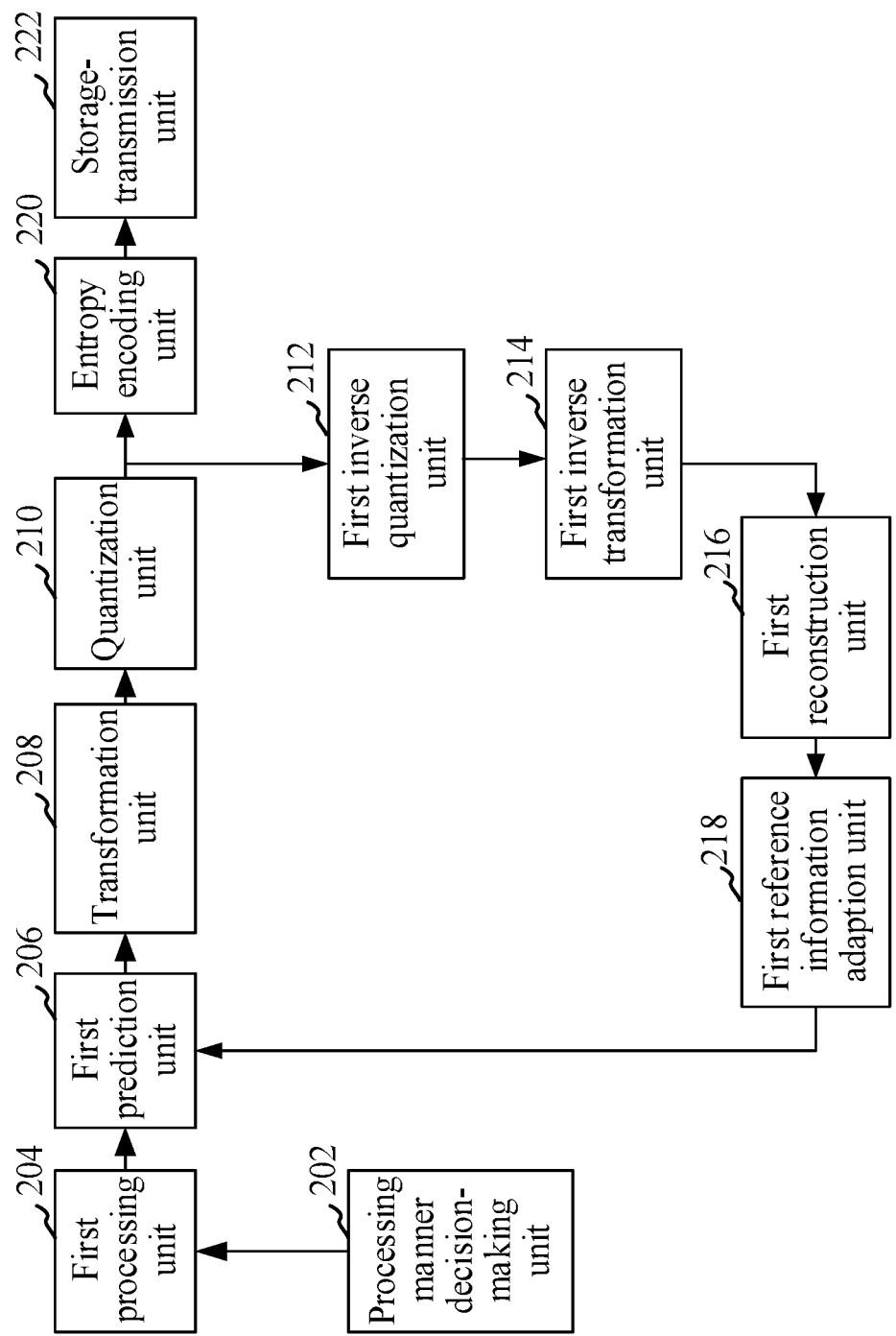
FIG. 2 is an encoding framework diagram corresponding to a video encoding method according to an embodiment.

FIG. 2 is an encoding framework diagram corresponding to a video encoding method according to an embodiment. In the video encoding method provided in this embodiment of this application, each input video frame of an input video sequence may be obtained; the input video frame is encoded, to obtain corresponding encoded data; and the encoded data is stored or transmitted, or stored and transmitted by using a storage-transmission unit 222. A processing manner decision-making unit 202 may make a decision on a processing manner of the input video frame, to obtain the processing manner corresponding to the input video frame. A first processing unit 204 may process the input video frame according to the processing manner, to obtain a current frame. A first prediction unit 206 may perform intra-frame prediction or inter-frame prediction on each encoded block of the current frame at a resolution of the current frame, obtain a predicted value and a corresponding motion vector according to an image value of a reference block corresponding to the encoded block, and calculate a difference between an actual value and the predicted value of the encoded block to obtain a predicted residual, the motion vector representing a displacement of the encoded block relative to the reference block. A transformation unit 208 transforms the predicted residual and vector information in a spatial domain to a frequency domain, and may encode a transformation parameter. A transformation method may be discrete Fourier transform, discrete cosine transform, and the like. The vector information may be an actual motion vector representing a displacement or a motion vector difference, the motion vector difference being a difference between the actual motion vector and a predicted motion vector.

A quantization unit 210 maps transformed data to another value. For example, the transformed data may be divided by a quantization step to obtain a relatively small value. A quantization parameter is a sequence number corresponding to a quantization step, and a corresponding quantization step may be found according to a quantization parameter. A small quantization parameter indicates reservation of most details of an image frame and a high corresponding bit rate. A large quantization parameter indicates a low corresponding bit rate, relatively great distortion and not high quality of an image. A principle of quantization is expressed by using the following formula: FQ=round(y/Qstep). y is a value corresponding to a video frame before quantization is performed, Qstep is a quantization step, and FQ is a quantized value obtained through quantization performed on y. A Round(x) function is used for performing rounding off to an even number on a value, that is, banker's rounding. A correspondence between the quantization parameter and the quantization step may be specifically set according to a requirement. For example, in some video encoding standards, for brightness coding, the quantization step has 52 values that are integers from 0 to 51; and for chroma coding, the quantization step has values that are integers from 0 to 39; the quantization step increases as the quantization parameter increases; and each time the quantization parameter is increased by 6, the quantization step is doubled.

An entropy encoding unit 220 is configured to perform entropy encoding. The entropy encoding is a data encoding manner in which encoding is performed according to an entropy principle and no information is lost, and can express particular information by using a relatively small character. An entropy encoding method may be, for example, the Shannon coding or the Huffman coding.

A first inverse quantization unit 212, a first inverse transformation unit 214, a first reconstruction unit 216, and first reference information adaption unit 218 are units corresponding to a reconstructed path. Frames are reconstructed by using the units of the reconstructed path to obtain reference frames, so that the consistency between reference frames in encoding and reference frames in decoding can be maintained. A step performed by the first inverse quantization unit 212 is an inverse process of quantization. A step performed by the first inverse transformation unit 214 is an inverse process of transformation performed by the transformation unit 208. The first reconstruction unit 216 is configured to add residual data obtained through inverse transformation to predicted data to obtain a reconstructed reference frame. The first reference information adaption unit 218 is configured to perform, at the resolution of the current frame, adaption processing on at least one of reference information such as a reference frame obtained through reconstruction, location information corresponding to encoded blocks of the current frame, and location information and motion vectors corresponding to reference blocks of the reference frame, so that the first prediction unit 206 performs prediction according to reference information obtained after the adaption processing.

Figure 3:
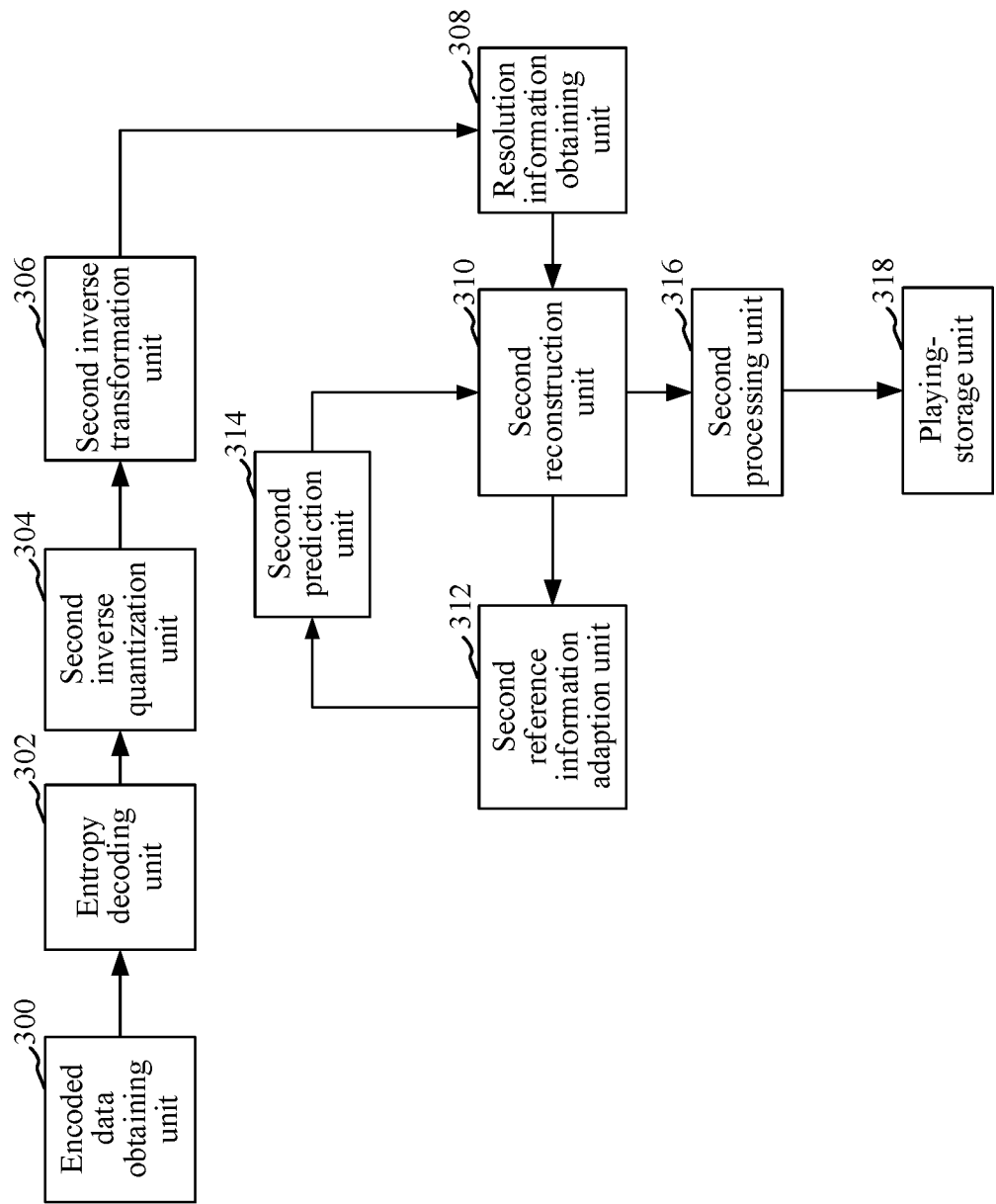
FIG. 3 is a decoding framework diagram corresponding to a video decoding method according to an embodiment.

FIG. 3 is a decoding framework diagram corresponding to a video decoding method according to an embodiment. In the video decoding method provided in this embodiment of this application, an encoded data obtaining unit 300 may obtain encoded data corresponding to each current video frame of a video sequence; an entropy decoding unit 302 may perform entropy decoding to obtain entropy decoded data; a second inverse quantization unit 304 may perform inverse quantization on the entropy decoded data, to obtain inversely-quantized data; and a second inverse transformation unit 306 may perform inverse transformation on the inversely-quantized data, to obtain inversely-transformed data. The inversely-transformed data may be the same as data that is obtained after the first inverse transformation unit 214 in FIG. 2 performs inverse transformation. A resolution information obtaining unit 308 is configured to obtain resolution information corresponding to the current video frame. A second reference information adaption unit 312 is configured to: obtain a reference frame reconstructed by a second reconstruction unit; perform, according to resolution information of the current video frame, adaption processing on at least one of reference information such as location information corresponding to the reference frame, location information corresponding to each block of the current video frame, and location information and motion vectors corresponding to each reference block of the reference frame; and perform prediction according to information obtained after the adaption processing. A second prediction unit 314 obtains, according to the reference information obtained after the adaption, the reference block corresponding to the current block, and obtains a predicted value the same as the predicted value in FIG. 2 according to an image value of the reference block. The second reconstruction unit 310 performs reconstruction according to the predicted value and the inversely-transformed data, that is, a predicted residual, to obtain a reconstructed video frame. A second processing unit 316 processes the reconstructed video frame according to the resolution information corresponding to the current video frame, to obtain a corresponding decoded video frame. A playing-storage unit 318 may play or store, or play and store the decoded video frame.

It may be understood that the foregoing encoding framework diagram and decoding framework diagram are merely an example, and do not constitute a limitation to the encoding method to which the solutions of this application are applied. Specific encoding framework diagram and decoding framework diagram may include more or fewer units than those shown in the figures, or combine some units, or have a different component unit deployment. For example, loop filtering may also be performed on the reconstructed video frame, to reduce blocking artifacts of the video frame, thereby improving video quality.

In the embodiments of this application, an end performing encoding is referred to as an encoding end, and an end performing decoding is referred to as a decoding end. The encoding end and the decoding end may be the same end or different ends. The foregoing computer device, for example, a terminal or server, may be an encoding end, or may be a decoding end.

Figure 4:
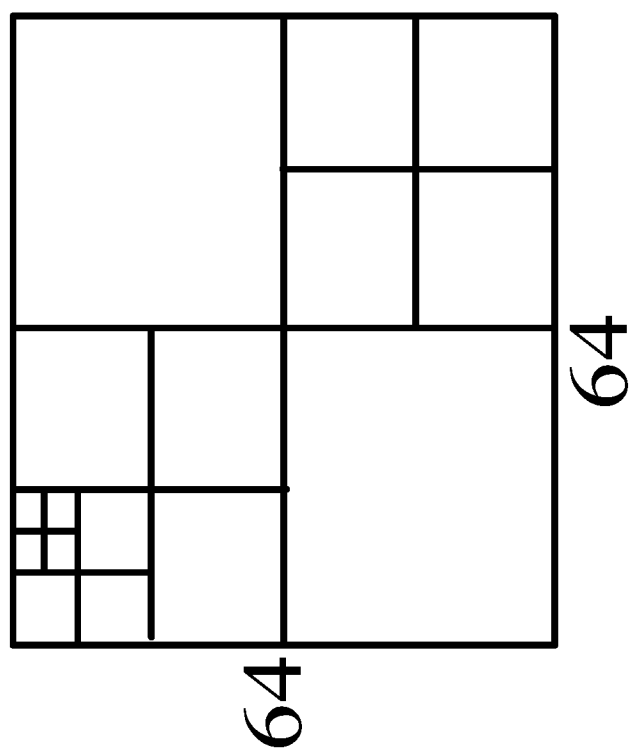
FIG. 4 is a schematic diagram of an encoded block according to an embodiment.

The current frame may be divided into a plurality of encoded blocks. Sizes of the encoded blocks may be set or calculated according to a requirement. For example, all sizes of the encoded blocks may be 8*8 pixels. Alternatively, rate-distortion costs corresponding to division manners of various encoded blocks may be calculated, and a division manner corresponding to a low rate-distortion cost is selected for division of the encoded blocks. FIG. 4 is a schematic diagram of division of an image block of 64*64 pixels. One block represents one encoded block. It may be learned from FIG. 4 that sizes of encoded blocks may include 32*32 pixels, 16*16 pixels, 8*8 pixels, and 4*4 pixels. Certainly, the sizes of the encoded blocks may alternatively be other sizes, for example, being 32*16 pixels or 64*64 pixels. It may be understood that during decoding, the encoded blocks are in a one-to-one correspondence with to-be-decoded blocks Therefore, pixels of the to-be-decoded blocks may also include 32*32 pixels, 16*16 pixels, 8*8 pixels, 4*4 pixels, and the like.

Figure 5:
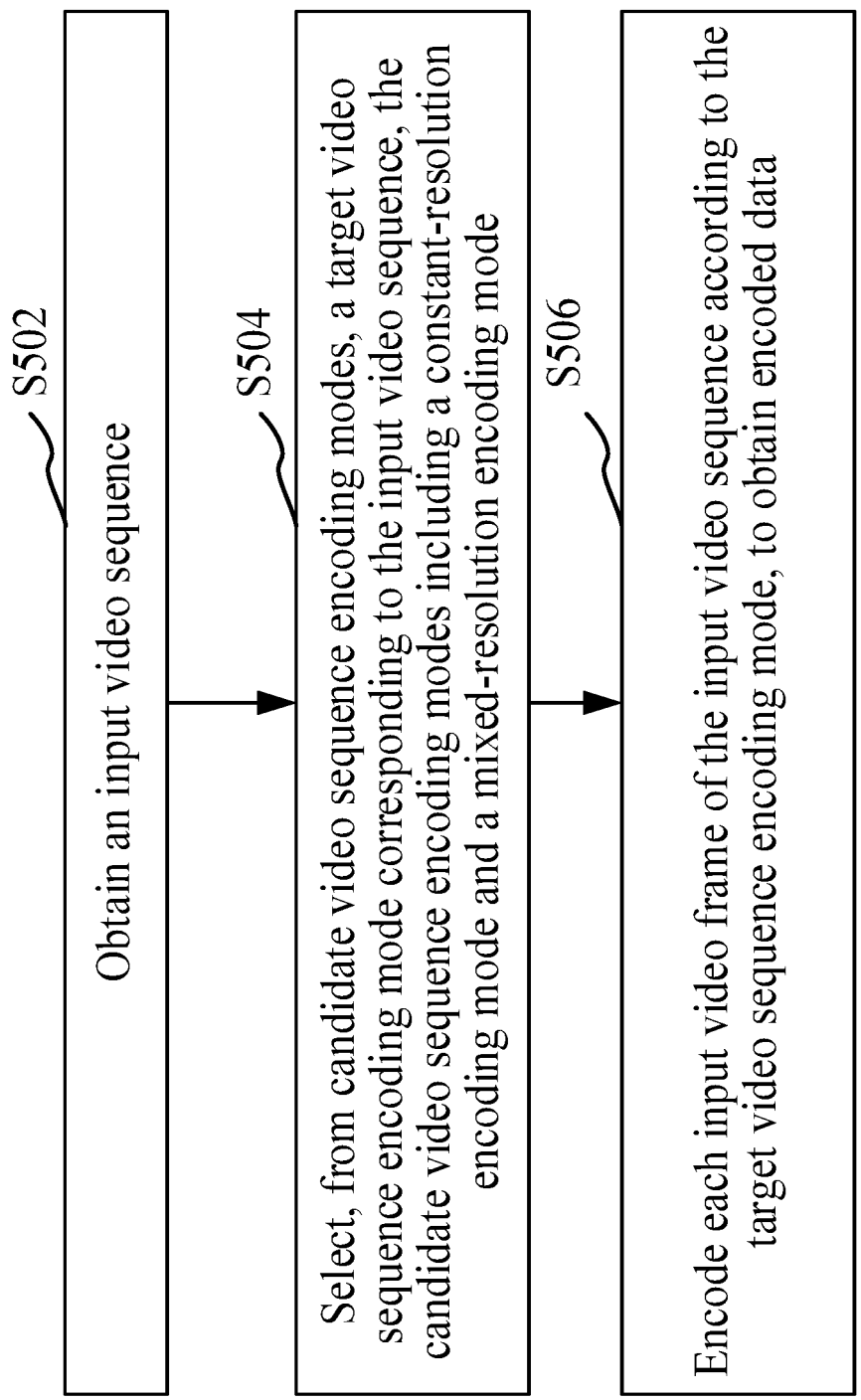
FIG. 5 is a flowchart of a video encoding method according to an embodiment.

As shown in FIG. 5, in an embodiment, a video encoding method is provided. In this embodiment, an example in which the method is applied to the terminal 110 or the server 120 in the foregoing FIG. 1 is mainly used for description. The method may specifically include the following steps:

Step S502: Obtain an input video sequence.

Specifically, the input video sequence may include a plurality of input video frames. A video frame is a unit forming a video. The input video sequence may be a video sequence that is acquired by a computer device in real time. For example, the input video sequence may be a video sequence obtained by using a camera of the terminal in real time, or may be a video sequence prestored by the computer device. Encoded frame prediction types corresponding to the input video frames in the input video sequence may be an I frame, a B frame, a P frame, and the like. The encoded frame prediction types corresponding to the input video frames may be determined according to an encoding algorithm. The I frame is an intra predictive frame; the P frame is a forward-predicted frame; and the B frame is a bidirectional predicted frame. Encoded blocks of the P frame and the B frame may be encoded through intra-frame prediction, or may be encoded through inter-frame prediction.

Step S504: Select, from candidate video sequence encoding modes, a target video sequence encoding mode corresponding to the input video sequence, the candidate video sequence encoding modes including a constant-resolution encoding mode and a mixed-resolution encoding mode.

Specifically, the constant-resolution encoding mode means that current frames corresponding to the input video sequence are encoded at the same resolution, for example, a full resolution. Full-resolution encoding means performing encoding when a resolution of an input video frame is maintained unchanged. It may be understood that resolutions of input video frames in the same video sequence are usually the same, so that a full-resolution encoding mode herein is one of constant-resolution encoding modes. Certainly, sampling processing with the same sample proportion may also be performed on full-resolution input video frames of the input video sequence, to obtain video frames having the same resolution. The mixed-resolution encoding mode means that resolutions of the current frames corresponding to the input video sequence are adaptively adjusted. That is, the current frames corresponding to the input video sequence may have different resolutions. The current frames refer to video frames that are directly used for encoding. A method for the computer device to obtain, from the candidate video sequence encoding modes, the target video sequence encoding mode corresponding to the input video sequence may be set according to a requirement. For example, assuming that a plurality of input video sequences need to be encoded, constant-resolution encoding may be performed on one or more of the input video sequences, and mixed-resolution encoding may be performed on the other input video sequences.

In an embodiment, the obtaining a target video sequence encoding mode corresponding to the input video sequence includes: obtaining current environment information, the current environment information including at least one of current encoding environment information and current decoding environment information; and determining, according to the current environment information, the target video sequence encoding mode corresponding to the input video sequence.

Specifically, the environment information may include one or more of: a processing capability of a device performing the video encoding method, a processing capability of a device performing a video decoding method, and current application scenario information. A processing capability may be represented by using a processing speed. For example, for a device having a strong processing capability, because of a high processing speed, a corresponding target video sequence encoding mode may be the full-resolution encoding mode. The target video sequence encoding mode is the mixed-resolution encoding mode in a case that a current application scenario corresponding to the current application scenario information is a real-time application scenario. The target video sequence encoding mode is the constant-resolution encoding mode in a case that a current application scenario corresponding to the current application scenario information is a non-real-time application scenario. A correspondence between the current environment information and a video sequence encoding mode may be set. After the current environment information is obtained, a target video sequence encoding mode corresponding to the input video sequence is obtained according to the correspondence between the current environment information and the video sequence encoding mode. For example, a correspondence between an average value of a processing speed of the device performing the video encoding method and a processing speed of the device performing the video decoding method and a video sequence encoding mode may be set. After the processing speed of the device performing the video encoding method and the processing speed of the device performing the video decoding method are obtained, the average value of the two processing speeds is calculated, and a target video sequence encoding mode is obtained according to the average value. Whether the current application scenario is a real-time application scenario may be set according to a requirement. For example, a video call application scenario and an online game application scenario are real-time application scenarios, and application scenarios corresponding to video encoding on a video website and encoding of an offline video may be non-real-time application scenarios.

Step S506: Encode each input video frame of the input video sequence according to the target video sequence encoding mode, to obtain encoded data.

Specifically, the computer device performs constant-resolution encoding on each input video frame of the input video sequence in a case that the target video sequence encoding mode is the constant-resolution encoding mode. The computer device performs mixed-resolution encoding on the input video sequence in a case that the target video sequence encoding mode is the mixed-resolution encoding mode. That is, the current frames corresponding to the input video sequence may have different resolutions, and encoding needs to be performed according to resolution information corresponding to the input video frame.

In the foregoing video encoding method, during video encoding, an input video sequence is obtained; a target video sequence encoding mode corresponding to the input video sequence is obtained from candidate video sequence encoding modes, the candidate video sequence encoding modes including a constant-resolution encoding mode and a mixed-resolution encoding mode; and each input video frame of the input video sequence is encoded according to the target video sequence encoding mode, to obtain encoded data. Therefore, the target video sequence encoding mode of the input video sequence can be flexibly selected, the input video sequence is encoded according to the target video sequence encoding mode, and an encoding mode of the input video sequence is adaptively adjusted, so that video encoding quality can be improved under a condition of a limited bandwidth.

In an embodiment, step S506, that is, the encoding each input video frame of the input video sequence according to the target video sequence encoding mode, to obtain encoded data includes: adding target video sequence encoding mode information corresponding to the target video sequence encoding mode to the encoded data.

Specifically, the target video sequence encoding mode information is used for describing the encoding mode adopted for the input video sequence. The computer device may add a flag bit Sequence_Mix_Resolution_Flag describing the target video sequence encoding mode to the encoded data. A specific value of the flag bit may be set according to a requirement. A location at which video sequence encoding mode information is added to the encoded data may be sequence-level header information. For example, when Sequence_Mix_Resolution_Flag is 1, the corresponding target video sequence encoding mode may be the mixed-resolution encoding mode. When Sequence_Mix_Resolution_Flag is 0, the corresponding target video sequence encoding mode may be the constant-resolution encoding mode.

Figure 6:
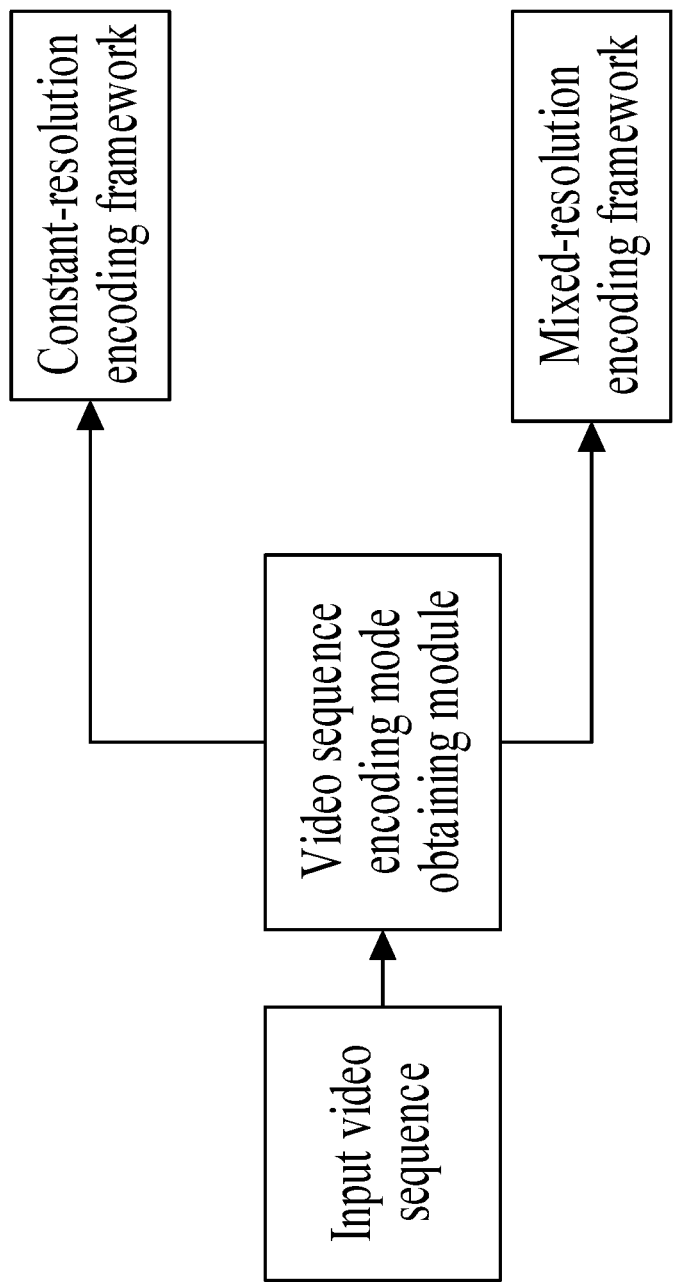
FIG. 6 is a schematic diagram of a video encoding framework according to an embodiment.

In an embodiment, video encoding frameworks are shown in FIG. 6. The video encoding frameworks include a constant-resolution encoding framework and a mixed-resolution encoding framework. The mixed-resolution encoding framework may correspond to the encoding framework in FIG. 2. After the input video sequence is obtained, a decision is made on a video sequence encoding mode at a video sequence encoding mode obtaining module. When the target video sequence encoding mode is the mixed-resolution encoding mode, the mixed-resolution encoding framework is used for encoding. When the target video sequence encoding mode is the constant-resolution encoding mode, constant-resolution encoding is performed by using the constant-resolution encoding framework in FIG. 6. The constant-resolution encoding framework may be an HEVC encoding framework, an H.265 encoding framework, and the like.

Figure 7A:
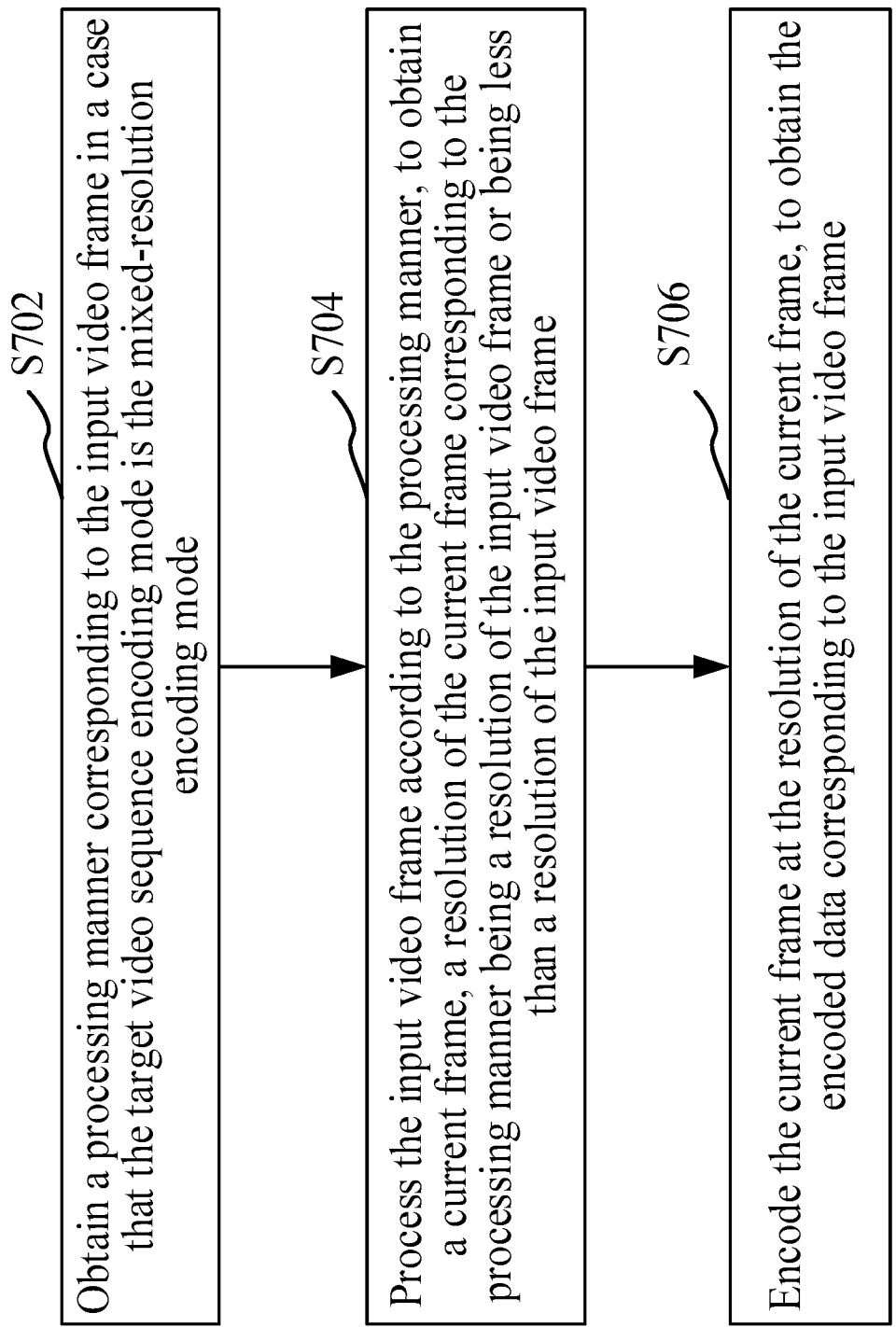
FIG. 7A is a flowchart of encoding each input video frame of an input video sequence according to a target video sequence encoding mode, to obtain encoded data according to an embodiment.

In an embodiment, as shown in FIG. 7A, step S506, that is, encoding each input video frame of the input video sequence according to the target video sequence encoding mode, to obtain encoded data includes:

Step S702: Obtain a processing manner corresponding to the input video frame in a case that the target video sequence encoding mode is the mixed-resolution encoding mode.

Specifically, the input video frame is a video frame in the input video sequence. A processing manner corresponding to the input video frame is selected by the computer device from candidate processing manners. The candidate processing manners may include a full-resolution processing manner and a downsampling processing manner. A method for the computer device to obtain the processing manner corresponding to the input video frame may be set according to an actual requirement. For example, the method may be: obtaining a processing parameter corresponding to the input video frame, and obtaining the corresponding processing manner according to the processing parameter. The processing parameter is a parameter used for determining a processing manner. The processing parameter specifically used may be set according to a requirement. For example, the processing parameter may include at least one of current encoding information and an image feature corresponding to the input video frame.

In an embodiment, when the processing manner corresponding to the input video frames includes the downsampling processing manner, a downsampling proportion and a downsampling method may further be obtained. The downsampling proportion is a ratio obtained by dividing a resolution after sampling by a resolution before the sampling. For the downsampling method, direct average, a filter, bi-cubic interpolation, bilinear Interpolation, or the like may be used. The downsampling proportion may be preset, or may be flexibly adjusted. For example, each downsampling proportion may be set to ½. Alternatively, a downsampling proportion of the first input video frame of the input video sequence may be ½, and a downsampling proportion of the second input video frame of the input video sequence may be ¼. The downsampling proportion may be obtained according to an encoded location of the input video frame in a group of pictures (GOP). A latter encoded location indicates a smaller downsampling proportion. A downsampling direction may be one of vertical downsampling, horizontal downsampling, and a combination of vertical and horizontal downsampling. For example, if a resolution of a video frame before sampling is 800*800 pixels, when a downsampling proportion is ½, and horizontal downsampling is performed, a resolution of the video frame after the sampling is 400*800 pixels. When a downsampling proportion is ½ and vertical downsampling is performed, a resolution of the video frame after the sampling is 800*400 pixels.

In an embodiment, the downsampling proportion may be obtained according to a capability of a processor of a device performing the video encoding method such as a terminal or a server. A device having a processor with a strong processing capability corresponds to a large downsampling proportion, and a device having a processor with a poor processing capability corresponds to a small downsampling proportion. A correspondence between a processing capability of a processor and a downsampling proportion may be set. When encoding needs to be performed, a processing capability of a processor is obtained, and a corresponding downsampling proportion is obtained according to the processing capability of the processor. For example, a downsampling proportion corresponding to a 16-bit processor may be set to ⅛, and a downsampling proportion corresponding to a 32-bit processor may be set to ¼.

In an embodiment, the downsampling proportion may be obtained according to a frequency or a quantity of times that the input video frame is used as a reference frame. A correspondence between the downsampling proportion and the frequency or the quantity of times that the input video frame is used as a reference frame may be set. A higher frequency or a larger quantity of times that the input video frame is used as a reference frame indicates a larger downsampling proportion. A lower frequency or a smaller quantity of times that the input video frame is used as a reference frame indicates a smaller downsampling proportion. For example, for the I frame, a high frequency that the I frame is used as a reference frame corresponds to a large downsampling proportion, and the downsampling proportion may be ½. For the P frame, a low frequency that the I frame is used as a reference frame corresponds to a small downsampling proportion. For example, the downsampling proportion may be ¼. The downsampling proportion is obtained according to the frequency or the quantity of times that the input video frame is used as a reference frame, and when there is a high frequency or a large quantity of times that the input video frame is used as a reference frame, image quality is relatively good. Therefore, prediction accuracy can be improved, predicted residuals can be reduced, and quality of an encoded image can be improved.

In an embodiment, a downsampling method may be obtained according to a capability of a processor of a device performing the video encoding method such as a terminal or a server. A device having a processor with a strong processing capability corresponds to a downsampling method having a high complexity, and a device having a processor with a poor processing capability corresponds to a downsampling method having low complexity. A correspondence between a processing capability of a processor and a downsampling method may be set. When encoding needs to be performed, a processing capability of a processor is obtained, and a corresponding downsampling method is obtained according to the processing capability of the processor. For example, a complexity of bi-cubic interpolation is higher than that of bilinear interpolation. Therefore, a downsampling method corresponding to a 16-bit processor may be set to be bilinear Interpolation, and a downsampling method corresponding to a 32-bit processor may be set to be bi-cubic interpolation.

In this embodiment of this application, when the downsampling processing manner is used for processing the input video frame, downsampling may also be performed according to different downsampling methods or downsampling proportions, and the manner for processing the input video frame is more flexible.

In an embodiment, the computer device may obtain the processing manner corresponding to the input video frame according to at least one of current encoding information corresponding to the input video frame and image feature information corresponding to the input video frame. The current encoding information refers to video compression parameter information obtained when a video is encoded, for example, one or more of a frame prediction type, a motion vector, a quantization parameter, a video source, a code rate, a frame rate, and a resolution. The image feature information refers to information related to image content, and includes one or more of image motion information and image texture information, such as an edge. The current encoding information and the image feature information reflect a scenario, a detail complexity, motion intensity, or the like that correspond to a video frame. For example, a motion scenario may be determined by using one or more of a motion vector, a quantization parameter, or a code rate. A large quantization parameter usually indicates high motion intensity, and a large motion vector indicates that an image scenario is a large motion scenario. Determining may also be performed according to a ratio of a code rate of an encoded I frame to that of an encoded P frame or a ratio of a code rate of an encoded I frame to that of an encoded B frame. If the ratio exceeds a first preset threshold, it is determined that an image is a still image, or if the ratio is less than a second preset threshold, it may be determined that an image is an image with high motion intensity. Alternatively, a target object is directly tracked according to image content, and whether a scenario is a large motion scenario is determined according to a motion speed of the target object. A fixed code rate indicates a fixed amount of information that can be expressed. For a scenario with high motion intensity, an amount of information in time domain is large, and accordingly, a code rate that can be used for expressing information in a spatial domain is small. Therefore, a relatively good image quality effect can be achieved by using a low resolution, and a downsampling mode for encoding is more inclined to be selected. An image switching scenario may be determined according to the frame prediction type, and a preferable processing manner may also be determined according to influence of the frame prediction type on other frames. For example, an I frame is usually the first frame, or image switching may exist, and quality of the I frame affects quality of a subsequent P frame or B frame. Therefore, for an intra predictive frame, when compared with an inter predictive frame, a full-resolution processing manner is more inclined to be selected, to ensure image quality. The P frame may be used as a reference frame of the B frame, and image quality of the P frame affects image quality of the subsequent B frame. Therefore, a full-resolution processing manner is more inclined to be selected in encoding by using the P frame compared with encoding by using the B frame. A texture complexity of a video frame is determined according to the image feature information, for example, image texture information. If texture is complex and includes a large number of details, there is a large amount of image spatial information. If downsampling is performed, a relatively large amount of detail information may be lost due to the downsampling, and video quality is affected. Therefore, for a video frame having a complex texture, compared with a video frame having a simple texture, full-resolution processing is more inclined to be selected.

In an embodiment, the computer device may obtain the processing manner corresponding to the input video frame according to a magnitude relationship between a current quantization parameter corresponding to the input video frame and a quantization parameter threshold. If the current quantization parameter is greater than the quantization parameter threshold, the computer device determines that the processing manner is the downsampling processing manner; otherwise, the computer device determines that the processing manner is the full-resolution processing manner. The quantization parameter threshold may be obtained according to a proportion of intra coded blocks of a forward-encoded video frame encoded before the input video frame is encoded. A correspondence between a proportion of intra coded blocks and a quantization parameter threshold may be preset, so that after a proportion of intra coded blocks of a current frame is determined, the computer device may determine, according to the correspondence, a quantization parameter threshold corresponding to the proportion of the intra coded blocks of the current frame. For fixed quantization parameter encoding, a current quantization parameter may be a corresponding fixed quantization parameter value. For fixed code rate encoding, the computer device may calculate a current quantization parameter corresponding to the input video frame according to a code rate control model. Alternatively, the computer device may use a quantization parameter corresponding to a reference frame as the current quantization parameter corresponding to the input video frame. In this embodiment of this application, a larger current quantization parameter usually indicates higher motion intensity, and the downsampling processing manner is more inclined to be selected for a scenario having high motion intensity.

In an embodiment, the proportion of the intra coded blocks is in a positive correlation with the quantization parameter threshold. For example, the correspondence between the proportion $Intra_0$ of the intra coded blocks and the quantization parameter threshold $QP_{TH}$ may be predetermined as:

$$QP_{TH} = \begin{cases} 33, & Intra_0 < 10\% \\ 31, & 10\% \leq Intra_0 < 50\% \\ 29, & Intra_0 \geq 50\% \end{cases}$$

Step S704: Process the input video frame according to the processing manner, to obtain a current frame, a resolution of the current frame corresponding to the processing manner being a resolution of the input video frame or being less than a resolution of the input video frame.

Specifically, the current frame is obtained by processing the input video frame according to the processing manner. When the processing manner is the full-resolution processing manner, the computer device may use the input video frame as the current frame. When the processing manner is the downsampling processing manner, the computer device may perform downsampling processing on the input video frame, to obtain the current frame. For example, when the resolution of the input video frame is 800*800 pixels, and the processing manner is performing ½ downsampling in both a horizontal direction and a vertical direction, a resolution of the current frame that is obtained through the downsampling is 400*400 pixels.

Step S706: Encode the current frame at the resolution of the current frame, to obtain the encoded data corresponding to the input video frame.

Specifically, the encoding may include at least one of prediction, transformation, quantization, and entropy encoding. When the current frame is an I frame, the computer device performs intra-frame prediction on the current frame at the resolution of the current frame. When the current frame is a P frame or B frame, a reference frame corresponding to the current frame may be obtained; prediction is performed according to the reference frame to obtain a predicted residual; and transformation, quantization, and entropy encoding are performed on the predicted residual to obtain the encoded data corresponding to the input video frame. During the process of obtaining the encoded data, at least one of the reference frame, location information corresponding to each encoded block of the current frame, location information corresponding to each reference block of the reference frame, and a motion vector is processed according to the resolution of the current frame. For example, during calculation of the predicted residual, the reference frame may be processed according to resolution information of the current frame, to obtain a target reference frame. A target reference block corresponding to each encoded block is obtained from the target reference frame. Prediction is performed according to the target reference block, to obtain a predicted value corresponding to the encoded block, and then the predicted residual is obtained according to a difference between an actual value of the encoded block and the predicted value. During calculation of a target motion vector, if a resolution of the reference frame is different from that of the current frame, location information of the encoded block or location information of a decoded block may be transformed according to resolution information of the reference frame and the current frame, so that location information corresponding to the current frame and location information of the reference frame are under the same quantization scale, and then the target motion vector is obtained according to the transformed location information, to reduce a value of the target motion vector, and reduce a data volume of the encoded data. Alternatively, if resolution information corresponding to the target motion vector is different from the resolution information of the current frame, when a first motion vector corresponding to an encoded block of the current frame is calculated at the resolution of the current frame, the first motion vector is transformed according to the resolution information of the current frame and target motion vector unit resolution information, to obtain a target motion vector at a target resolution. For example, assuming that the resolution of the current frame is 400*800 pixels, and the resolution of the reference frame is 800*1600 pixels, ½ downsampling may be performed on the reference frame according to the resolution of the current frame, to obtain that the resolution of the target reference frame is 400*800 pixels, and then video encoding is performed according to the target reference frame.

In this embodiment of this application, after the processing manner corresponding to the input video frame is obtained, the input video frame may be processed according to the processing manner, to obtain a current frame, a resolution of the current frame corresponding to the processing manner being a resolution of the input video frame or being less than a resolution of the input video frame; and the current frame is encoded at the resolution of the current frame to obtain the encoded data corresponding to the input video frame. In this way, a processing manner of a video frame can be flexibly selected for processing the input video frame, and the resolution of the input video frame and the data volume of the encoded data can be adaptively adjusted. In addition, the encoding is performed at the resolution of the current frame, so that accurate encoded data can be obtained.

In an embodiment, step S706, that is, the encoding the current frame at the resolution of the current frame, to obtain the encoded data corresponding to the input video frame includes: adding processing manner information corresponding to the processing manner to the encoded data corresponding to the input video frame.

Specifically, the processing manner information is used for describing the processing manner adopted by the input video frame. A flag bit Frame_Resolution_Flag describing the processing manner may be added to the encoded data. That is, a syntactic element of information describing the processing manner is added to the encoded data. Values of flag bits corresponding to processing manners may be set according to a requirement. For example, when a processing manner is the full-resolution processing manner, a corresponding Frame_Resolution_Flag may be 0; and when a processing manner is the downsampling processing manner, a corresponding Frame_Resolution_Flag may be 1.

Figure 7B:
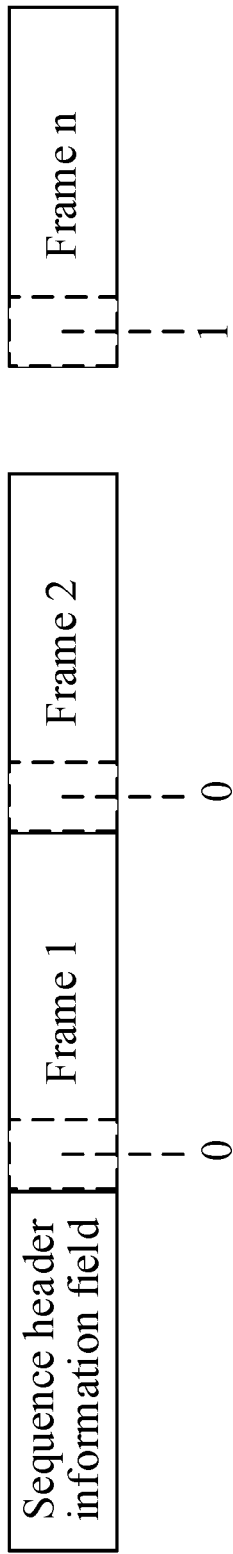
FIG. 7B is a schematic diagram of encoded data according to an embodiment.

In an embodiment, the processing manner information may be added to frame-level header information corresponding to the encoded data. For example, the processing manner information may be added to a preset location of the frame-level header information. Frame-level header information is header information of encoded data corresponding to an input video frame. Sequence-level header information refers to header information of encoded data corresponding to a video sequence. Group-level header information refers to header information of encoded data corresponding to a GOP. One video frame sequence may include a plurality of GOPs, and one GOP may include a plurality of video frames. Boxes indicated by dashed lines in FIG. 7B represent frame-level header information of encoded data corresponding to input video frames. Frame 1, Frame 2, and Frame n respectively represent encoded data corresponding to a first video frame, encoded data corresponding to a second video frame, and encoded data corresponding to an $n^{th}$ video frame. In FIG. 7B, processing manners corresponding to the first input video frame and the second input video frame are the full-resolution processing manner, and a processing manner corresponding to the third input video frame is the downsampling processing manner.

In an embodiment, downsampling processing manner information for downsampling the input video frame may further be added to the encoded data corresponding to the input video frame, so that when obtaining the encoded data, a decoding end can obtain a corresponding upsampling method and a corresponding upsampling proportion for a reconstructed video frame according to the downsampling processing manner information. The downsampling processing manner information includes at least one of downsampling method information and downsampling proportion information. A location at which the downsampling method information is added to the encoded data may be one of corresponding group-level header information, corresponding sequence-level header information, and corresponding frame-level header information. The location at which the downsampling method information is added to the encoded data may be determined according to an action range corresponding to the downsampling method. A location at which the downsampling proportion information is added to the encoded data may be any one of corresponding group-level header information, corresponding sequence-level header information, and corresponding frame-level header information. The location at which the downsampling proportion information is added to the encoded data may be determined according to an action range corresponding to the downsampling proportion, and the action range refers to an applicable range. For example, if an action range of the downsampling proportion is a GOP, downsampling proportion information corresponding to the GOP may be added to header information corresponding to the GOP. If an action range of the downsampling proportion is a video sequence, downsampling proportion information is added to sequence-level header information corresponding to the video sequence, and represents that downsampling processing is performed on each video frame of the video sequence by using the downsampling proportion corresponding to the downsampling proportion information.

In an embodiment, the obtaining a processing manner corresponding to the input video frame includes: obtaining a processing parameter corresponding to the input video frame, and determining the processing manner corresponding to the input video frame according to the processing parameter. The adding processing manner information corresponding to the processing manner to the encoded data corresponding to the input video frame includes: adding, when the processing parameter cannot be reproduced in a decoding process, the processing manner information corresponding to the processing manner to the encoded data corresponding to the input video frame.

Specifically, the processing parameter may include at least one of image encoding information corresponding to the input video frame and image feature information corresponding to the input video frame. That the processing parameter cannot be reproduced in a decoding process means that the processing parameter cannot be obtained or generated in the decoding process. For example, if the processing parameter is information corresponding to image content of the input video frame, a loss of image information exists in an encoding process, so that there is a difference between a decoded video frame on a decoding end and the input video frame. Therefore, the information corresponding to the image content of the input video frame is not obtained in the decoding process. That is, the information corresponding to the image content cannot be reproduced in the decoding process. A rate-distortion cost needs to be calculated in an encoding process, and the rate-distortion cost is not calculated in a decoding process, so that when the processing parameter includes a rate-distortion cost, the processing parameter cannot be reproduced in the decoding process. Peak signal to noise ratio (PSNR) information of a reconstructed video frame and the input video frame that is obtained in the encoding process cannot be obtained in the decoding process. Therefore, the PSNR information cannot be reproduced in the decoding process.

In an embodiment, for example, processing parameters such as a quantity of intra coded blocks corresponding to the input video frame and a quantity of inter coded blocks corresponding to the input video frame may be obtained on the decoding end, that is, may be reproduced. When the processing parameter can be reproduced on the decoding end, the computer device may add the processing manner information corresponding to the processing manner to the encoded data corresponding to the input video frame, or may not add the processing manner information corresponding to the processing manner to the encoded data corresponding to the input video frame. When the processing manner information corresponding to the processing manner is added to the encoded data corresponding to the input video frame, the decoding end may read the processing manner information from the encoded data, and does not need to obtain the processing manner according to processing data. When the processing manner information corresponding to the processing manner is not added to the encoded data corresponding to the input video frame, a decoding device (namely, the decoding end) determines a processing manner the same as that of an encoding end according to the processing parameter, so that the data volume of the encoded data can be reduced.

Figure 8:
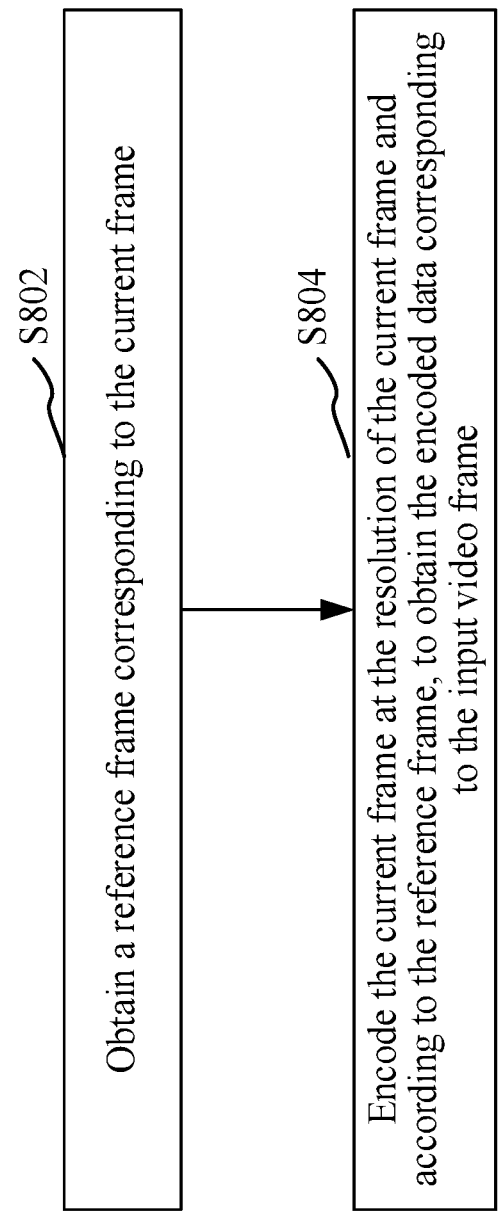
FIG. 8 is a flowchart of encoding a current frame at a resolution of the current frame, to obtain encoded data corresponding to an input video frame according to an embodiment.

In an embodiment, as shown in FIG. 8, step S706, that is, the encoding the current frame at the resolution of the current frame, to obtain the encoded data corresponding to the input video frame includes:

Step S802: Obtain a reference frame corresponding to the current frame.

Specifically, the reference frame is a video frame to which reference needs to be made when the current frame is encoded, and is a video frame that is obtained by reconstructing data obtained by encoding the current frame previously. There may be one or more reference frames corresponding to the current frame. For example, when the current frame is a P frame, there may be one corresponding reference frame; and when the current frame is a B frame, there may be two corresponding reference frames. The reference frame corresponding to the current frame may be obtained according to a reference relationship, and the reference relationship is determined according to video encoding and decoding standards. For example, if a second video frame in a GOP is a B frame, corresponding reference frames may be an I frame of the GOP and a video frame that corresponds to a fourth frame of the GOP and that is obtained through decoding and reconstruction after encoding.

In an embodiment, the obtaining a reference frame corresponding to the current frame includes: obtaining a first reference rule, the first reference rule including a resolution magnitude relationship between the current frame and the reference frame; and obtaining, according to the first reference rule, the reference frame corresponding to the current frame.

Specifically, the first reference rule determines a resolution magnitude restrictive relationship between the current frame and the reference frame. The resolution magnitude relationship includes at least one of the resolution of the current frame being the same as that of the reference frame and the resolution of the current frame being different from that of the reference frame. When the first reference rule includes that the resolution of the current frame is the same as that of the reference frame, the first reference rule may further include a processing manner reference rule of the resolution of the current frame and the resolution of the reference frame. For example, the processing manner reference rule may include one or two of that: for a current frame using the full-resolution processing manner, reference may be made to a reference frame using the full-resolution processing manner; and for a current frame using the downsampling processing manner, reference may be made to a reference frame using the downsampling processing manner. When the first reference rule includes that the resolution of the current frame is different from that of the reference frame, the first reference rule may further include one or two of: the resolution of the current frame being greater than that of the reference frame, and the resolution of the current frame being less than that of the reference frame. Therefore, in an embodiment, the first reference rule may specifically include one or more of that: for a current frame having an original resolution, reference may be made to a reference frame having a downsampling resolution; for a current frame having a downsampling resolution, reference may be made to a reference frame having an original resolution; for a current frame having an original resolution, reference may be made to a reference frame having an original resolution; and for a current frame having a downsampling resolution, reference may be made to a reference frame having a downsampling resolution. The current frame having the original resolution means that the resolution of the current frame is the same as that of an input video frame corresponding to the current frame. The reference frame having the original resolution means that the resolution of the reference frame is the same as that of an input video frame corresponding to the reference frame. The current frame having the downsampling resolution means that the current frame is obtained by performing downsampling processing on a corresponding input video frame. The reference frame having the downsampling resolution means that the reference frame is obtained by performing downsampling processing on a corresponding input video frame. After the first reference rule is obtained, the reference frame corresponding to the current frame is obtained according to the first reference rule, so that the obtained reference frame satisfies the first reference rule.

In an embodiment, step S706, that is, the encoding the current frame at the resolution of the current frame, to obtain the encoded data corresponding to the input video frame includes: adding rule information corresponding to the first reference rule to the encoded data corresponding to the input video frame.

Specifically, the rule information is used for describing a used reference rule. The computer device may add a flag bit Resolution_Referencer_Rules describing the reference rule to the encoded data. A reference rule represented by a specific value of the flag bit may be set according to a requirement. A location at which the rule information is added to the encoded data may be one or more of group-level header information, sequence-level header information, and frame-level header information. The location at which the rule information is added to the encoded data may be determined according to an action range of the first reference rule. For example, when the first reference rule is that: for an original resolution current frame, reference may be made to a downsampling resolution reference frame, a corresponding Resolution_Referencer_Rules may be 1; and when the first reference rule is that: for a downsampling resolution current frame, reference may be made to a downsampling resolution reference frame, a corresponding Resolution_Referencer_Rules may be 2. If the video sequence uses the same first reference rule, a location at which rule information is added to encoded data may be sequence-level header information. If the first reference rule is a reference rule used by one GOP of the video sequence, a location at which rule information is added to encoded data is group-level header information corresponding to the GOP using the first reference rule.

Step S804: Encode the current frame at the resolution of the current frame and according to the reference frame, to obtain the encoded data corresponding to the input video frame.

Specifically, the computer device may obtain the reference frame corresponding to the current frame; perform prediction according to the reference frame to obtain a predicted residual; and perform transformation, quantization, and entropy encoding on the predicted residual to obtain the encoded data corresponding to the input video frame. During the process of obtaining the encoded data, the computer device processes, according to the resolution of the current frame, at least one of the reference frame, location information corresponding to each encoded block of the current frame, location information corresponding to each reference block of the reference frame, and a motion vector. After the reference frame is obtained, the computer device may obtain, from the reference frame, a reference block corresponding to the encoded block of the current frame, and encode the encoded block according to the reference block. The computer device may alternatively process the reference frame according to the resolution of the current frame, to obtain a corresponding target reference frame; obtain, from the target reference frame, a target reference block corresponding to the encoded block of the current frame; and encode the encoded block according to the target reference block, to obtain the encoded data corresponding to the input video frame.

In an embodiment, the encoding the current frame at the resolution of the current frame, to obtain the encoded data corresponding to the input video frame includes: obtaining, at the resolution of the current frame, a corresponding encoding manner when the current frame is encoded; and adding encoding manner information corresponding to the encoding manner to the encoded data corresponding to the input video frame.

Specifically, the encoding manner is a processing manner related to the encoding. For example, the encoding manner may include one or more of an upsampling manner used for a video frame that is obtained after a reference frame is decoded and reconstructed during encoding, rule information corresponding to the reference rule, a sampling manner for performing sampling processing on the reference frame, and a resolution corresponding to a motion vector. By adding the encoding manner information corresponding to the encoding manner to the encoded data corresponding to the input video frame, the encoded data corresponding to the current video frame may be decoded according to the encoding manner information during decoding.

In an embodiment, the encoding manner information corresponding to the encoding manner may not be added to the encoded data. Instead, the encoding manner is preset in an encoding and decoding standard, and a decoding manner corresponding to the encoding manner is set in the decoding end. Alternatively, the encoding end and the decoding end may calculate, according to the same or corresponding algorithms, an encoding manner and a decoding manner that match each other. For example, it is preset in the encoding and decoding standard that: a method for upsampling the reference frame during encoding is the same as a method for upsampling the reference frame during decoding.

Figure 9A:
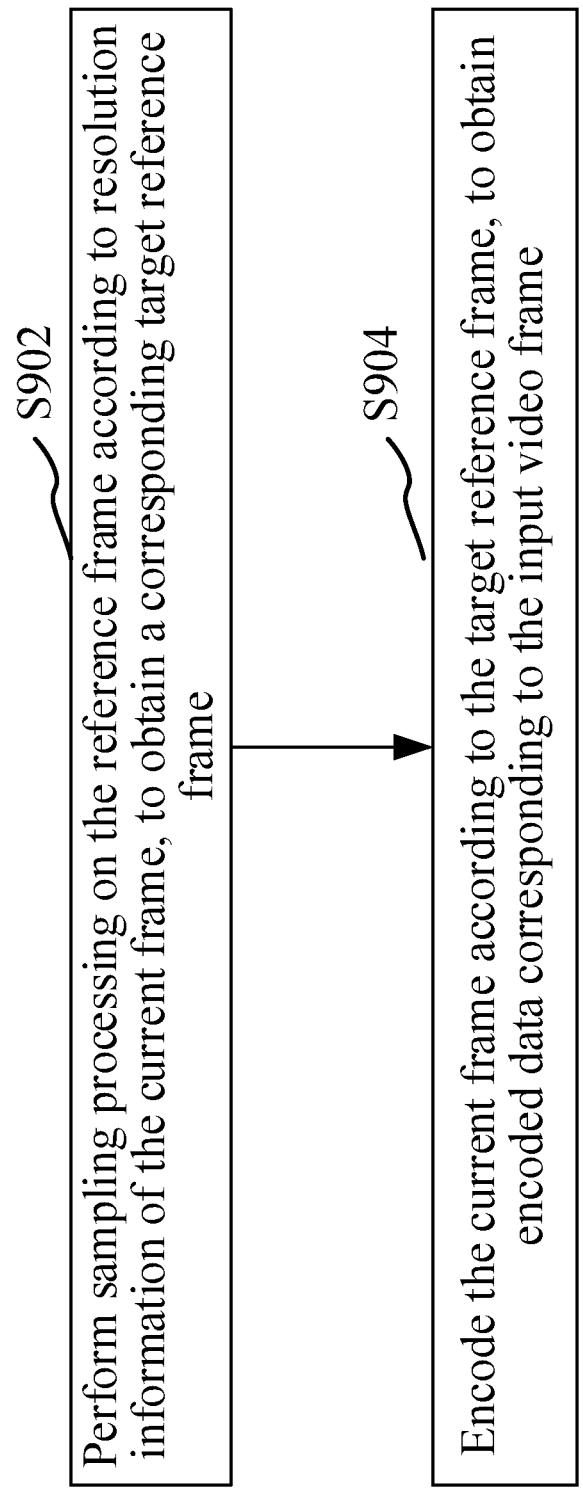
FIG. 9A is a flowchart of encoding a current frame according to a reference frame, to obtain encoded data corresponding to an input video frame according to an embodiment.

In an embodiment, as shown in FIG. 9A, step S804, that is, the encoding the current frame according to the reference frame, to obtain encoded data corresponding to the input video frame includes:

Step S902: Perform sampling processing on the reference frame according to resolution information of the current frame, to obtain a corresponding target reference frame.

Specifically, the target reference frame is a video frame that is obtained after sampling processing is performed on the reference frame. Sampling processing is a process in which the reference frame is sampled by using the resolution information of the current frame, so that resolution information of the obtained target reference frame matches the resolution information of the current frame. During the sampling processing, the computer device may first determine a sampling manner, the sampling manner including one of a direct sub-pixel interpolation manner and an after-sampling sub-pixel interpolation manner. In the direct sub-pixel interpolation manner, sub-pixel interpolation processing is directly performed on the reference frame. In the after-sampling sub-pixel interpolation manner, after sampling processing is performed on the reference frame, sub-pixel interpolation processing is then performed on the reference frame.

Sub-pixel interpolation is a process in which interpolation is performed on reference data of integer pixels in the reference frame to obtain reference data of a sub-pixel level. For example, FIG. 9B and FIG. 9C are schematic diagrams of performing interpolation on a reference frame according to an embodiment. Referring to FIG. 9B, pixels such as A1, A2, A3, B1, B2, and B3 are 2*2 integer pixels in the reference frame. Reference data of sub-pixels is calculated according to reference data of the integer pixels. For example, reference data of a sub-pixel a23 may be calculated according to an average value of reference data of the three integer pixels A1, A2, and A3; reference data of a sub-pixel a21 may be calculated according to an average value of reference data of the three integer-pixels A2, B2, and C2; and then reference data of a sub-pixel a22 may be calculated according to the reference data of the sub-pixel a23 and the reference data of the sub-pixel a21, thereby implementing ½ pixel precision interpolation on the reference frame. Referring to FIG. 9C, pixels such as A1, A2, A3, B1, B2, and B3 are 4*4 integer-pixels in the reference frame. Reference data of 15 sub-pixels is calculated according to reference data of the integer-pixels, thereby implementing ¼ pixel precision interpolation on the reference frame. For example, reference data of a sub-pixel a8 is calculated according to reference data of integer pixels A2 and B2; reference data of a sub-pixel a2 is calculated according to reference data of integer pixels A2 and A3; and similarly, reference data of 15 sub-pixels a1 to a15 is calculated, thereby implementing ¼ pixel precision interpolation on the integer pixel A2.

During the process of encoding the current frame, the reference block corresponding to the encoded block in the current frame needs to be found from the reference frame by using a motion search technology; a motion vector is calculated according to motion information of the encoded block relative to the reference block; and the motion vector is encoded to inform the decoding end of a location, in the reference frame, of reference data corresponding to the reference block. Therefore, sub-pixel interpolation processing is performed on the reference frame to obtain a target reference frame, and motion estimation may be performed on the current frame according to the target reference frame having a higher resolution, so as to improve accuracy of motion estimation, thereby improving encoding quality.

In an embodiment, the encoding end and the decoding end may set sampling manners for performing processing according to the reference frame to obtain the target reference frame in respective encoding rules and decoding rules. The used sampling manners need to be the same. During encoding and decoding, sampling manners corresponding to processing performed on the reference frame are determined according to the setting.

In an embodiment, the encoding the current frame at the resolution of the current frame, to obtain the encoded data corresponding to the input video frame includes: adding sampling manner information corresponding to sampling processing performed on the reference frame to encoded data corresponding to the reference frame. A location at which the sampling manner information corresponding to the sampling processing performed on the reference frame is added to the encoded data may be any one of corresponding sequence-level header information, corresponding group-level header information, and corresponding frame-level header information. The location at which the sampling manner information is added to the encoded data may be determined according to an action range corresponding to the sampling manner. The sampling manner information may be added to frame-level header information of the encoded data corresponding to the input video frame, and represents that when the input video frame is encoded, sub-pixel interpolation processing is performed on the corresponding reference frame in the sampling manner corresponding to the sampling manner information. For example, when a flag bit Pixel_Sourse_Interpolation that is in the frame-level header information of the encoded data and used for determining the sampling manner is 0, it represents that sub-pixel interpolation processing is directly performed on the reference frame corresponding to the input video frame; and when Pixel_Sourse_Interpolation is 1, it represents that after sampling processing is performed on the reference frame corresponding to the input video frame, sub-pixel interpolation processing is then performed on the reference frame corresponding to the input video frame. The decoding end may perform sub-pixel interpolation processing on the reference frame in a sub-pixel interpolation manner represented by the flag bit in the encoded data, to obtain a target reference frame, so that the encoded data may be decoded according to the target reference frame to obtain a reconstructed video frame.

In an embodiment, the computer device may determine, according to a proportion relationship between the resolution of the current frame and the resolution of the reference frame, a proportion for sampling the reference frame. For example, if all resolutions of input video frames are 2M*2N, and a current input video frame is processed in a full-resolution processing manner, that is, the current input video frame is directly used as the current frame, the resolution of the current frame is 2M*2N; and if an input video frame that may be used as a reference frame is processed in a downsampling processing manner, to obtain that the resolution of the reference frame after downsampling is M*2N, a resolution of a corresponding reference frame that is obtained after reconstruction is also M*2N. Therefore, it is determined that upsampling processing is performed on the reference frame by using a sampling proportion of a width of 2 and a height of 1, to obtain a frame having a resolution the same as the resolution of the current frame. If a current input video frame is processed in a downsampling processing manner, a resolution of the current frame that is obtained after downsampling is M*N; and if an input video frame that may be used as a reference frame is processed in a full-resolution processing manner, a resolution of a reference frame obtained after reconstruction is 2M*2N. Therefore, it is determined that downsampling processing is performed on the reference frame by using a sampling proportion of a width of ½ and a height of ½, to obtain a frame having a resolution the same as the resolution of the current frame.

In an embodiment, because the resolutions of the input video frames are usually the same, the computer device may downsample an input video frame to obtain a downsampling proportion corresponding to the current frame, and downsample an input video frame that may be used as a reference frame to obtain a downsampling proportion corresponding to a reference frame, so as to determine the proportion for sampling the reference frame. For example, downsampling processing is performed on the input video frame by using a sampling proportion of ½ to obtain a current frame, and downsampling processing is performed on an input video frame that may be used as a reference frame by using a sampling proportion of ¼ to obtain a reference frame, so that a downsampling proportion corresponding to a reference frame that is obtained after reconstruction according to encoded data of the reference frame is also ¼. Therefore, according to a multiple relationship between the two downsampling proportions, it may be determined that upsampling processing is performed on the reference frame by using a sampling proportion of 2 to obtain a frame having a resolution the same as the resolution of the current frame.

In an embodiment, a sampling method for sampling the reference frame matches a sampling algorithm for downsampling the input video frame to obtain the current frame. That is, if the reference frame needs to be downsampled, the downsampling algorithm is the same as the downsampling algorithm for downsampling a video frame to obtain the current frame. If the reference frame needs to be upsampled, the upsampling algorithm is an opposite sampling algorithm matching the downsampling algorithm for downsampling the input video frame to obtain the current current frame.

In this embodiment, the sampling algorithm for sampling the reference frame matches the sampling algorithm for downsampling the video frame to obtain the current encoded video frame, to further improve a degree of image matching between the reference frame and the current encoded video frame, thereby further improving accuracy of inter-frame prediction, reducing predicted residuals, and improving quality of an encoded image.

Step S904: Encode the current frame according to the target reference frame, to obtain encoded data corresponding to the input video frame.

Specifically, after the target reference frame is obtained, an image block similar to an encoded block is obtained by searching the target reference frame and is used as a target reference block, and a pixel difference between the encoded block and the target reference block is calculated to obtain a predicted residual. A first motion vector is obtained according to a displacement between the encoded block and the corresponding target reference block. The encoded data is obtained according to the first motion vector and the predicted residual.

In an embodiment, the computer device may transform the first motion vector according to target motion vector unit resolution information, to obtain a target motion vector at a target resolution, and generate the encoded data according to the target motion vector and the predicted residual. The method for transforming the first motion vector according to the target motion vector unit resolution information to obtain the target motion vector is described in the following.

In an embodiment, the computer device may also calculate a vector difference between the target motion vector and a corresponding predicted motion vector, and encode the vector difference, to obtain the encoded data, thereby further reducing the volume of the encoded data. Steps of calculating the vector difference may include: obtaining an initial predicted motion vector corresponding to a current encoded block; obtaining a second vector transformation parameter according to current motion vector unit resolution information corresponding to the initial predicted motion vector and the target motion vector unit resolution information; obtaining, according to the initial predicted motion vector and the second vector transformation parameter, a target predicted motion vector corresponding to the current encoded block; and obtaining a motion vector difference according to the target motion vector and the target predicted motion vector. The target predicted motion vector is a motion vector at the target resolution, and a method for calculating the vector difference is described in the following.

In an embodiment, Step S902, that is, the performing sampling processing on the reference frame according to resolution information of the current frame, to obtain a corresponding target reference frame includes: performing sampling processing on the reference frame according to the resolution information and motion estimation pixel precision of the current frame, to obtain the corresponding target reference frame.

The motion estimation pixel precision is a unit length of the motion vector corresponding to the encoded block in the current frame. When encoding the encoded block in the current frame, the computer device may refine the unit length of the motion vector corresponding to the encoded block according to obtained motion estimation pixel precision. The motion vector obtained in this manner is more refined and accurate. Therefore, sampling processing needs to be performed on the reference frame according to the obtained motion estimation pixel precision to obtain the target reference frame, then a first motion vector corresponding to the encoded block in the current frame is calculated according to the target reference frame, and encoding is performed based on the first motion vector to obtain the encoded data corresponding to the current frame.

Specifically, the computer device may obtain resolution information of the reference frame, and determine a method for performing sampling processing on the reference frame, a sampling proportion corresponding to the sampling processing, and pixel interpolation precision according to a sub-pixel interpolation manner used for the current frame, the resolution information of the current frame, the resolution information of the reference frame, and the motion estimation pixel precision corresponding to the current frame. A magnitude of the motion estimation pixel precision may be set according to a requirement, for example, usually being ½ pixel precision, ¼ pixel precision, or ⅛ pixel precision.

In an embodiment, the computer device may configure corresponding motion estimation pixel precision for the current frame according to image feature information of the current frame. The image feature information may be, for example, a size, texture information, and a motion speed of the current frame. The motion estimation pixel precision corresponding to the current frame may be determined by combing a plurality of types of image feature information. More complex image data carried by the current frame indicates richer image information and higher corresponding motion estimation pixel precision. For example, when inter-frame prediction is performed on a P frame, a motion vector corresponding to each encoded block in the P frame may be calculated by using relatively high motion estimation pixel precision; and when inter-frame prediction is performed on a B frame, a motion vector corresponding to each encoded block in the B frame may be calculated by using relatively low motion estimation pixel precision.

In an embodiment, the performing sampling processing on the reference frame according to the resolution information and motion estimation pixel precision of the current frame, to obtain the corresponding target reference frame includes: calculating pixel interpolation precision according to the resolution information and the motion estimation pixel precision of the current frame; and directly performing sub-pixel interpolation processing on the reference frame according to the pixel interpolation precision, to obtain the corresponding target reference frame.

Specifically, the pixel interpolation precision is pixel precision corresponding to sub-pixel interpolation performed on the reference frame. When the sub-pixel interpolation manner is the direct sub-pixel interpolation manner, it represents that sub-pixel interpolation processing may be directly performed on the reference frame to obtain the target reference frame. Therefore, the pixel interpolation precision may be calculated according to the resolution information and the motion estimation pixel precision of the current frame. Proportions of the resolution information of the reference frame and the resolution information of the current frame may be calculated, and the pixel interpolation precision is obtained according to the proportions and the motion estimation pixel precision.

In an embodiment, when the resolution of the reference frame is greater than that of the current frame, data of some sub-pixels in the reference frame may be directly multiplexed, and may be used as data corresponding to sub-pixels corresponding to the motion estimation pixel precision. For example, the resolution of the current frame is M*N, and the resolution of the reference frame is 2M*2N. If the motion estimation pixel precision is ½, and the pixel interpolation precision is 1, the reference frame may be directly used as the target reference frame; and if the motion estimation pixel precision is ¼, the pixel interpolation precision that is obtained through calculation is ½, so that pixel interpolation processing may be performed on the reference frame by using ½ pixel interpolation precision to obtain the target reference frame.

In an embodiment, when a resolution represented by the resolution information of the current frame is the same as the resolution of the reference frame, sub-pixel interpolation processing is directly performed on the reference frame according to the motion estimation pixel precision, to obtain the corresponding target reference frame.

Specifically, if the input video frame is processed in a full-resolution processing manner to obtain the current frame, and the resolution of the reference frame is also the original resolution, the resolution of the current frame is the same as that of the reference frame. Alternatively, if the input video frame is processed in a downsampling processing manner to obtain the current frame, and the reference frame is also obtained by constructing encoded data that is obtained through encoding in a downsampling processing manner having the same sampling proportion, the resolution of the current frame is the same as that of the reference frame. Therefore, sub-pixel interpolation processing may be directly performed on the reference frame based on the motion estimation pixel precision to obtain the target reference frame; and the pixel interpolation precision corresponding to the sub-pixel interpolation processing is the same as the motion estimation pixel precision.

In an embodiment, the performing sampling processing on the reference frame according to the resolution information and motion estimation pixel precision of the current frame, to obtain the corresponding target reference frame includes: performing sampling processing on the reference frame according to the resolution information of the current frame, to obtain an intermediate reference frame; and performing sub-pixel interpolation processing on the intermediate reference frame according to the motion estimation pixel precision, to obtain the target reference frame.

Specifically, when the sub-pixel interpolation manner corresponding to the current frame is the after-sampling sub-pixel interpolation manner, it represents that sampling processing needs to be first performed on the reference frame, to obtain an intermediate reference frame having a resolution the same as the resolution of the current frame, and then sub-pixel interpolation processing is performed on the intermediate reference frame to obtain the corresponding target reference frame.

When a resolution represented by the resolution information of the current frame is less than the resolution of the reference frame, downsampling processing is performed on the reference frame according to the resolution information of the current frame, to obtain an intermediate reference frame, and then sub-pixel interpolation processing is performed on the intermediate reference frame based on the motion estimation pixel precision corresponding to the current frame, to obtain the target reference frame. For example, if downsampling processing is performed on an input video frame having a resolution of 2M*2N in a downsampling processing manner to obtain a current frame having a resolution of M*N, and a resolution of a reference frame is 2M*2N (full-resolution processing manner), downsampling processing is performed on the reference frame according to a sampling proportion of ½ to obtain an intermediate reference frame having a resolution of M*N. If the obtained motion estimation pixel precision corresponding to the current frame is ½, sub-pixel interpolation processing is then performed on the intermediate reference frame according to pixel interpolation precision the same as the motion estimation pixel precision, that is, ½ sub-pixel interpolation precision, to obtain a target reference frame; and if the obtained motion estimation pixel precision corresponding to the current frame is ¼, sub-pixel interpolation processing is performed on the intermediate reference frame according to ¼ sub-pixel interpolation precision, to obtain a target reference frame.

When a resolution represented by the resolution information of the current frame is greater than the resolution of the reference frame, the computer device performs upsampling processing on the reference frame according to the resolution information of the current frame, to obtain an intermediate reference frame, and then performs sub-pixel interpolation processing on the intermediate reference frame based on the motion estimation pixel precision corresponding to the current frame, to obtain the target reference frame. For example, if the resolution of the current frame is 2M*2N, and the resolution of the reference frame is ½M*½N, upsampling processing needs to be performed on the reference frame according to a sampling proportion of 4 to obtain an intermediate reference frame having a resolution the same as that of the current frame. If the motion estimation pixel precision is ½, sub-pixel interpolation processing continues to be performed on the obtained intermediate reference frame according to ½ pixel interpolation precision, to obtain the target reference frame; and if the motion estimation pixel precision is ¼, sub-pixel interpolation processing continues to be performed on the obtained intermediate reference frame according to ¼ pixel interpolation precision, to obtain the target reference frame.

Figure 10A:
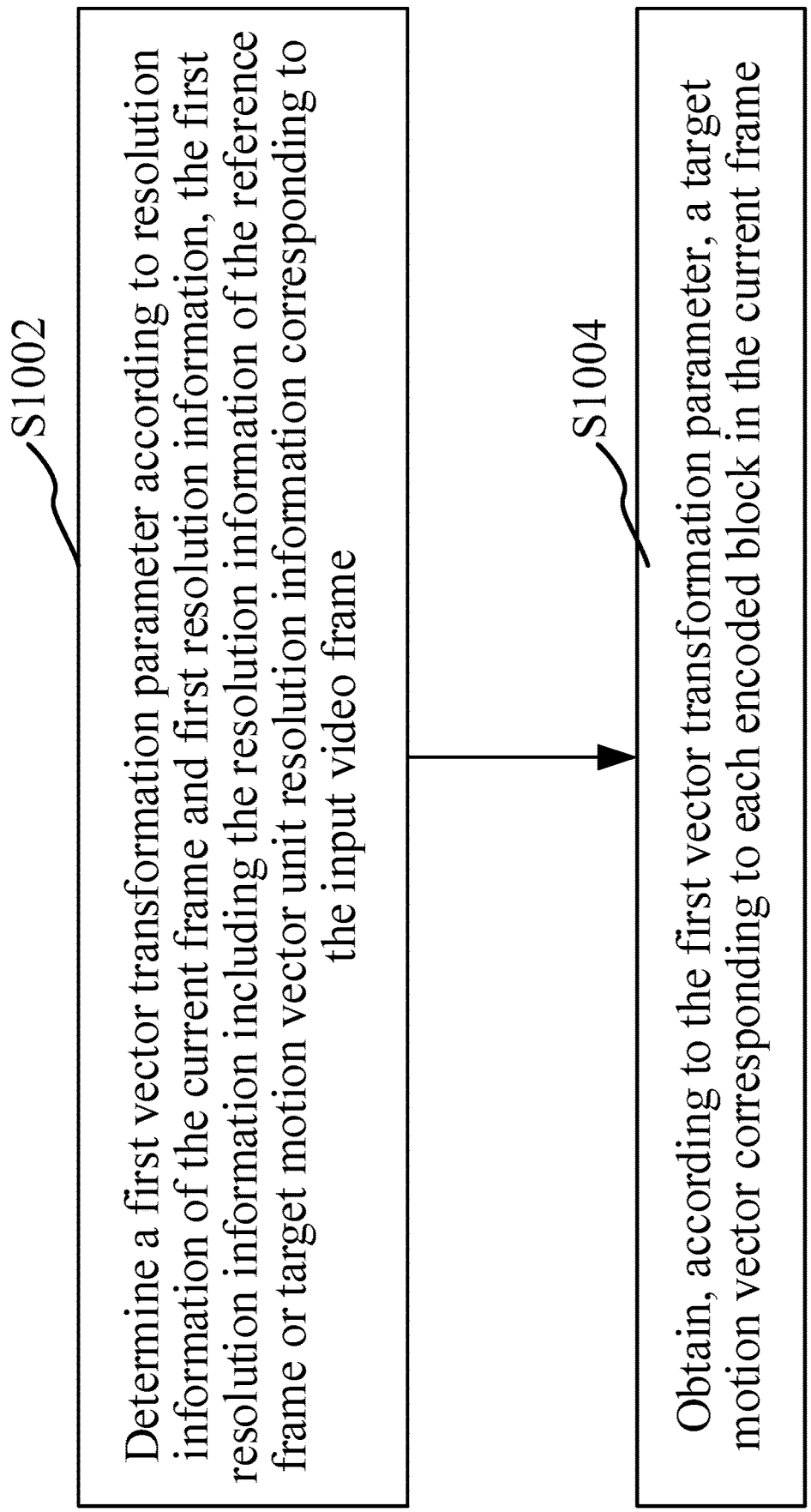
FIG. 10A is a flowchart of encoding a current frame according to a reference frame, to obtain encoded data corresponding to an input video frame according to an embodiment.

As shown in FIG. 10A, step S804, that is, the encoding the current frame at the resolution of the current frame and according to the reference frame, to obtain the encoded data corresponding to the input video frame includes:

Step S1002: Determine a first vector transformation parameter according to the resolution information of the current frame and first resolution information, the first resolution information including the resolution information of the reference frame or target motion vector unit resolution information corresponding to the input video frame.

Specifically, the first vector transformation parameter is used for transforming location information of the obtained motion vector or the obtained motion vector. The resolution information is information related to a resolution. For example, the resolution information may be the resolution or a downsampling proportion. The first vector transformation parameter may be a proportion of the resolution information of the current frame to the first resolution information. For example, assuming that a downsampling proportion of the reference frame is ⅓, and a downsampling proportion of the current frame is ⅙, the first vector transformation parameter may be obtained by dividing ⅓ by ⅙, that is, 2.

Step S1004: Obtain, according to the first vector transformation parameter, a target motion vector corresponding to each encoded block in the current frame.

Specifically, after the first vector transformation parameter is obtained, the obtained motion vector or the location information corresponding to the motion vector is transformed according to the first vector transformation parameter, to obtain the target motion vector. When the motion vector is transformed by using the first vector transformation parameter, the target motion vector is a motion vector at a target resolution represented by the target motion vector unit resolution information. The target motion vector unit resolution information is information corresponding to the target resolution corresponding to a unit of the target motion vector. For example, the target motion vector unit resolution information may be the target resolution or a downsampling proportion. When the location information corresponding to the motion vectors is transformed by using the first vector transformation parameter, the location information corresponding to the current frame and the location information of the reference frame are under the same quantization scale. A second motion vector is obtained according to the transformed location information, and the second motion vector is transformed to the target motion vector at the target resolution.

In an embodiment, step S1002, that is, the determining a first vector transformation parameter according to the resolution information of the current frame and first resolution information includes: determining the first vector transformation parameter according to the resolution information of the current frame and the resolution information of the reference frame. Step S1004, that is, the obtaining, according to the first vector transformation parameter, a target motion vector corresponding to each encoded block in the current frame includes: obtaining first location information corresponding to a current encoded block, obtaining second location information corresponding to a target reference block corresponding to the current encoded block; and calculating, according to the first vector transformation parameter, the first location information, and the second location information, a target motion vector corresponding to the current encoded block.

Specifically, the current encoded block is an encoded block that is in the input video frame and on which prediction encoding needs to be currently performed. The target reference block is an image block that is in a reference frame and used for performing prediction encoding on the current encoded block. The first location information corresponding to the current encoded block may be represented by using coordinates of pixels. The first location information corresponding to the current encoded block may include coordinates corresponding to all pixels of the current encoded block, or may include coordinates of one or more pixels of the current encoded block. The second location information corresponding to the target reference block may include coordinates corresponding to all pixels of the target reference block, or may include coordinates of one or more pixels of the target reference block. For example, coordinates of a first pixel of the current image block may be used as a coordinate value of the current encoded block, and coordinates of a first pixel of the target reference block may be used as a coordinate value of the target reference block.

In an embodiment, the first location information may be transformed by using the first vector transformation parameter, to obtain corresponding first transformed location information, and the target motion vector is obtained according to a difference between the first transformed location information and the second location information. Alternatively, the second location information may be transformed by using the first vector transformation parameter, to obtain corresponding second transformed location information, and the target motion vector is obtained according to a difference between the first location information and the second transformed location information.

In an embodiment, the first vector transformation parameter is a proportion that is obtained by dividing the greater resolution information of the resolution information of the current frame and the resolution information of the reference frame by the less resolution information thereof, a resolution corresponding to the greater resolution information being greater than a resolution corresponding to the less resolution information. The first vector transformation parameter is used for transforming location information of a frame that is in the current frame and the reference frame and that has the less resolution information. For example, if the resolution of the current frame is 1200*1200 pixels, and the resolution of the reference frame is 600*600 pixels, the greater resolution is 1200*1200 pixels, and the less resolution is 600*600 pixels. The first vector transformation parameter may be 2. Assuming that the first location information is (6, 8), and the second location information is (3, 3), the target motion vector is (6, 8)−(3*2, 3*2)=(0, 2). In this embodiment of this application, the location information corresponding to the frame having the less resolution information is transformed, so that a value of the target motion vector may be decreased, thereby reducing the data volume of the encoded data.

In an embodiment, the first vector transformation parameter is a proportion that is obtained by dividing the less resolution information of the resolution information of the current frame and the resolution information of the reference frame by the greater resolution information thereof. The first vector transformation parameter is used for transforming location information of a frame that is in the current frame and the reference frame and that has the greater resolution information. For example, if the resolution of the current frame is 1200*1200 pixels, and the resolution of the reference frame is 600*600 pixels, the first vector transformation parameter may be ½. Assuming that the first location information is (6, 8), and the second location information is (3, 3), the target motion vector is (6*½, 8*½)−(3, 3)=(0, 1).

Figure 10B:
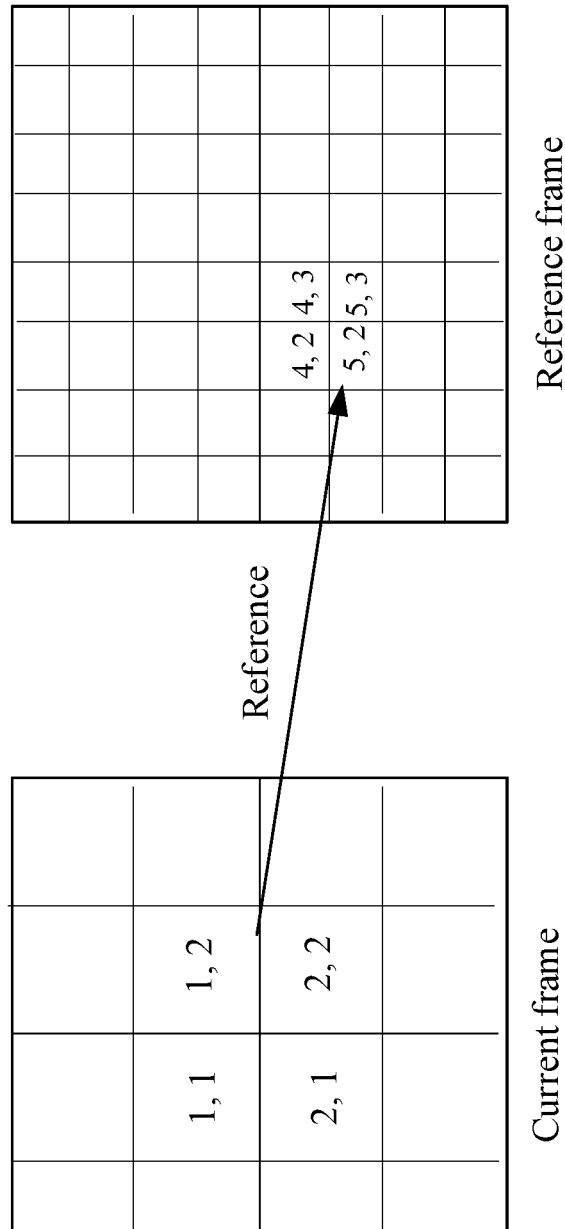
FIG. 10B is a schematic diagram of a reference frame and a current frame according to an embodiment.

In this embodiment of this application, the location information is transformed by using the first vector transformation parameter, causing the location information corresponding to the current frame and the location information of the reference frame to be under the same quantization scale, so that a value of the target motion vector can be decreased, thereby reducing the data volume of the encoded data. For example, as shown in FIG. 10B, the resolution of the reference frame is double of that of the current frame, the current encoded block includes pixels (1, 1), (1, 2), (2, 1) and (2, 2), and the corresponding target reference block includes pixels (4, 2), (4, 3), (5, 2), and (5, 3). If no transformation is performed, the target motion vector is (−3, −1); and during calculation of the target motion vector, if the location information corresponding to the current frame is multiplied by 2, and then the target motion vector is calculated, the target motion vector is (−2, 0), which is less than (−3, −1).

In an embodiment, step S1002, that is, the determining a first vector transformation parameter according to the resolution information of the current frame and first resolution information includes: obtaining target motion vector unit resolution information; and determining the first vector transformation parameter according to the resolution information of the current frame and the target motion vector unit resolution information. Step S1004, that is, the obtaining, according to the first vector transformation parameter, a target motion vector corresponding to each encoded block in the current frame includes: obtaining a first motion vector according to a displacement between the current encoded block and a corresponding target reference block; and obtaining, according to the first vector transformation parameter and the first motion vector, a target motion vector corresponding to the current encoded block.

Specifically, the target motion vector unit resolution information refers to information corresponding to target resolution corresponding to a unit of the target motion vector. For example, the target motion vector unit resolution information may be the target resolution or a corresponding downsampling proportion. The target motion vector is calculated by using a vector unit at the resolution as a standard. Some resolutions of the current frames corresponding to the input video sequence may be the same as the original resolution of the input video frame, and resolutions of the other current frames may be less than the original resolution of the input video frame, that is, there are a plurality of resolutions of the current frames in the video sequence. Therefore, the resolution corresponding to the unit of the target motion vector needs to be determined. The resolution corresponding to the unit of the target motion vector may be already set before encoding or be obtained according to parameters of the encoding process, and may be specifically set according to a requirement.

The first motion vector is obtained according to the displacement between the current encoded block and the corresponding target reference block. The target reference block may be obtained from the reference frame, or may be obtained from a target reference frame that is obtained after the reference frame is processed. After the first motion vector is obtained, the first vector transformation parameter may be multiplied by the first motion vector, and the obtained product is used as the target motion vector. For example, assuming that the resolution corresponding to the unit of the target motion vector is the original resolution, and the downsampling proportion corresponding to the current frame is ½, the unit of the target motion vector is the original resolution, and the first motion vector is calculated at the resolution of the current frame, so that the first motion vector needs to be transformed. The first vector transformation parameter is equal to 2, so that when the obtained first motion vector is (2, 2), the target motion vector is (4, 4). After the target motion vector is obtained, encoding may be performed according to the target motion vector. For example, the target motion vector and a predicted residual corresponding to the current encoded block may be encoded, to obtain encoded data.

In an embodiment, when the target reference block is obtained from the reference frame, it may be understood that for the same encoded block, a first motion vector may be equal to a second motion vector.

In an embodiment, the resolution corresponding to the unit of the target motion vector may be the resolution corresponding to the input video frame, that is, the original resolution; or the resolution corresponding to the unit of the target motion vector may be the resolution corresponding to the current frame. The first vector transformation parameter may be a proportion of the resolution information corresponding to the unit of the target motion vector to the resolution information of the current frame. For example, assuming that the resolution corresponding to the unit of the target motion vector is the original resolution, a sampling proportion corresponding to the unit of the target motion vector is 1, and a sampling proportion of the resolution of the current frame is ½, the first vector transformation parameter may be obtained by dividing 1 by ½, that is, 2. Alternatively, assuming that the resolution corresponding to the unit of the target motion vector is the original resolution and is 900*900 pixels, and the resolution of the current frame is 450*600 pixels, there may be two first vector transformation parameters: a first vector transformation parameter in a horizontal direction and a first vector transformation parameter in a vertical direction, the first vector transformation parameter in the horizontal direction is 900/450=2, and the first vector transformation parameter in the vertical direction is 900/600=1.5.

In an embodiment, the target motion vector unit resolution information may be obtained according to a calculation capability of the device performing the encoding. For example, when the device performing the encoding can only calculate integers or requires a long time for calculating decimals, the resolution corresponding to the unit of the target motion vector may be the original resolution corresponding to the input video frame; and when the device performing the encoding can quickly calculate decimals, the resolution corresponding to the unit of the target motion vector may be the resolution corresponding to the current frame.

In an embodiment, when the resolution information of the current frame is the same as the target motion vector unit resolution information, the first vector transformation parameter is 1, and the first motion vector is the same as the target motion vector. Therefore, step S1002 may be skipped, and the first motion vector is used as the target motion vector. When the resolution information of the current frame is different from the target motion vector unit resolution information, perform step S1002.

In this embodiment of this application, when the resolution corresponding to the unit of the target motion vector is the resolution corresponding to the input video frame, that is, the original resolution, for the video sequence having a unified resolution, target resolutions corresponding to the input video frames are the same, so that uniformity of the target motion vectors may be maintained. When the resolution corresponding to the unit of the target motion vector is the resolution corresponding to the current frame, because the resolution information of the current frame is the same as the target motion vector unit resolution information, the first motion vector does not need to be transformed, so that a calculation time can be reduced.

In an embodiment, the computer device may add identification information representing the target motion vector unit resolution information to encoded data, so that the decoding end may obtain the target resolution corresponding to the target motion vector. If no identification information is carried, the encoding end and the decoding end may agree on the target resolution corresponding to the target motion vector between. The identification information is used for representing the resolution information corresponding to the target motion vector. A location at which the identification information is added to the encoded data may be one or more of group-level header information, sequence-level header information, frame-level header information, and block-level header information, the block-level header information being header information of encoded data corresponding to an encoded block. The location at which the identification information is added to the encoded data may be determined according to an action range of the target motion vector unit resolution information. For example, if resolutions corresponding to vector units in the video sequence are the same, the adding location may be the sequence-level header information. Resolution information represented by a specific value of a flag bit may be set according to a requirement. For example, when the resolution corresponding to the target motion vector unit resolution information is the original resolution, a flag bit MV_Scale_Adaptive corresponding to the identification information is 0; and when the resolution corresponding to the target motion vector unit resolution information is the resolution corresponding to the current frame, a corresponding flag bit MV_Scale_Adaptive is 1.

Figure 11:
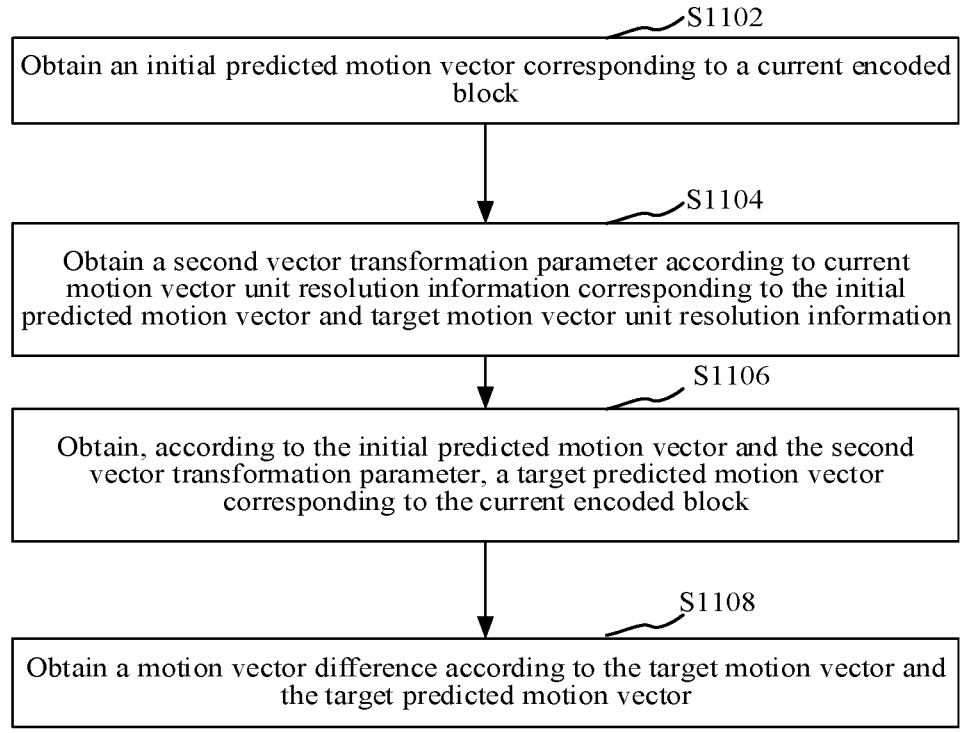
FIG. 11 is a flowchart of encoding a current frame according to a reference frame, to obtain encoded data corresponding to an input video frame according to an embodiment.

In an embodiment, as shown in FIG. 11, step S804, that is, the encoding the current frame according to the reference frame, to obtain encoded data corresponding to the input video frame includes:

Step S1102: Obtain an initial predicted motion vector corresponding to a current encoded block.

Specifically, to reduce the number of bits used for the encoded data, the computer device may perform prediction on a motion vector of the current encoded block, to obtain a predicted value, calculate a difference between a target motion vector and the predicted value, to obtain a motion vector difference, and encode the motion vector difference. The initial predicted motion vector is used for predicting the motion vector of the current encoded block. There may be one or more initial predicted motion vectors, and a quantity of the initial predicted motion vectors may be specifically set according to a requirement. An obtaining rule for the initial predicted motion vector may be set according to a requirement. The current encoded block is usually in a spatial correlation with an adjacent encoded block, so that target motion vector values corresponding to one or more adjacent encoded blocks corresponding to the current encoded block may be used as the initial predicted motion vector. For example, first motion vector values corresponding to an adjacent encoded block at the upper right corner of the current encoded block and an adjacent encoded block at the upper left corner of the current encoded block may be used as the initial predicted motion vector. Alternatively, a motion vector value corresponding to a target reference block corresponding to the current encoded block may be used as the initial predicted motion vector.

Step S1104: Obtain a second vector transformation parameter according to current motion vector unit resolution information corresponding to the initial predicted motion vector and target motion vector unit resolution information.

Specifically, the current motion vector unit resolution information refers to information of a current resolution corresponding to a unit of the initial predicted motion vector. For example, the current motion vector unit resolution information may be the current resolution or a downsampling proportion. The resolution corresponding to the unit of the initial predicted motion vector means that the initial predicted motion vector is calculated by using a vector unit at the current resolution as a standard, and is a motion vector at the current resolution. When the current motion vector unit resolution information corresponding to the initial predicted motion vector is different from the target motion vector unit resolution information, the second vector transformation parameter is obtained according to the current motion vector unit resolution information corresponding to the initial predicted motion vector and the target motion vector unit resolution information. The second vector transformation parameter is used for transforming the initial predicted motion vector to the motion vector at the target resolution. The second vector transformation parameter may be a proportion of the resolution information corresponding to a unit of the target motion vector to the current motion vector unit resolution information. For example, assuming that the resolution corresponding to the unit of the target motion vector is 200*200 pixels, and the current resolution corresponding to current motion vector unit resolution information is 100*100 pixels, the first vector transformation parameter is 2.

Step S1106: Obtain, according to the initial predicted motion vector and the second vector transformation parameter, a target predicted motion vector corresponding to the current encoded block.

Specifically, after obtaining the second vector transformation parameter, the computer device performs calculation according to the initial predicted motion vector and the second vector transformation parameter, to obtain the target predicted motion vector, the target predicted motion vector being a predicted motion vector at the target resolution. For example, when there is one initial predicted motion vector, the product of the initial predicted motion vector and the second vector transformation parameter may be used as the target predicted motion vector. When there are a plurality of initial predicted motion vectors, a minimum value, an average value, or a median value the initial predicted motion vectors may be calculated, to obtain a calculation result. The target motion vector is obtained according to the calculation result and the second vector transformation parameter. The calculation result may be one or more of the minimum value, the average value, and the median value of the initial predicted motion vectors. It may be understood that the algorithm for obtaining the target predicted motion vector according to the initial predicted motion vector and the second vector transformation parameter may be user-defined, and the same target predicted motion vector may be calculated on the decoding end according to the same user-defined algorithm.

Step S1108: Obtain a motion vector difference according to the target motion vector and the target predicted motion vector.

Specifically, a difference between the target motion vector and the target predicted motion vector is used as a motion vector difference, to perform encoding according to the motion vector difference, to obtain encoded data, thereby reducing the data volume of the encoded data.

In this embodiment of this application, the initial predicted motion vector is transformed, to obtain the target predicted motion vector at the target resolution, so that a unit of the target predicted motion vector and the unit of the target motion vector are under quantization scales matching each other. Therefore, the obtained motion vector difference is small, thereby reducing the data volume of the encoded data.

In an embodiment, step S702, that is, the obtaining a processing manner corresponding to the input video frame includes: calculating a proportion of target prediction-type encoded blocks in a forward-encoded video frame corresponding to the input video frame; and determining the processing manner corresponding to the input video frame according to the proportion.

Specifically, a prediction-type encoded block is an encoded block corresponding to a frame prediction type. A proportion of a target prediction type may be one or two of a proportion corresponding to intra coded blocks and a proportion corresponding to inter coded blocks. The proportion of the target prediction-type encoded blocks in the forward-encoded video frame corresponding to the input video frame may be a proportion of the target prediction-type encoded blocks to encoded blocks of other prediction types, or may be a proportion of the target prediction-type encoded blocks to a total quantity of encoded blocks. This may be specifically set according to a requirement. For example, the computer device may obtain a first quantity of intra coded blocks in the forward-encoded video frame and a second quantity of inter coded blocks in the forward-encoded video frame. A proportion of the intra coded block to the inter coded block is calculated according to the first quantity and the second quantity. Alternatively, a third quantity of all the encoded blocks in the forward-encoded video frame is counted, and a proportion of the intra coded block to all the encoded blocks is calculated according to the first quantity and the third quantity. A proportion of the inter coded blocks to all the encoded blocks may also be calculated according to the second quantity and the third quantity.

The forward-encoded video frame refers to a video frame that has been encoded before the input video frame is encoded, and a specific quantity of obtained forward-encoded video frames may be user-defined. For example, the forward-encoded video frame may be a previous encoded video frame, that has been encoded, of the input video frame, and the forward-encoded video frames may also be previous three encoded video frames, that have been encoded, of the input video frame. After the corresponding proportion of the target prediction-type encoded blocks in the forward-encoded video frame is calculated, the processing manner corresponding to the input video frame is determined according to the proportion obtained through calculation. If there are a plurality of obtained forward-encoded video frames, corresponding proportions of encoded blocks of different types in each of the forward-encoded video frames may be calculated. Weighting calculation is performed according to the proportions to obtain a total proportion, and the target processing manner corresponding to the input video frame is then determined according to the total proportion and a preset threshold. A weight corresponding to the forward-encoded video frame may be in a negative correlation with an encoding distance between the forward-encoded video frame and the input video frame.

In an embodiment, a proportion of intra coded blocks of the forward-encoded video frame in the forward-encoded video frame may be calculated. When the proportion is greater than a target threshold, it is determined that the processing manner is a downsampling processing manner.

For the proportion corresponding to the intra coded blocks, it may be that when the proportion is greater than the target threshold, it is determined that the target processing manner corresponding to the input video frame is the downsampling processing manner; otherwise, it is determined that the target processing manner corresponding to the input video frame is a full-resolution processing manner.

In this embodiment of this application, if the proportion of the intra coded blocks is large, it indicates that the video is relatively complex or correlations between video frames are relatively low, thereby obtaining a relatively large predicted residual. Therefore, the downsampling processing manner is more inclined to be used for encoding, to reduce the volume of the encoded data.

The target threshold may be determined according to a processing manner of a reference frame corresponding to the input video frame. When the processing manner of the reference frame corresponding to the input video frame is the downsampling processing manner, a first preset threshold T1 is obtained, and the first preset threshold T1 is used as the target threshold. Similarly, when the processing manner of the reference frame corresponding to the input video frame is the full-resolution processing manner, a second preset threshold T2 is obtained, and the second preset threshold T2 is used as the target threshold. Further, after the target threshold is obtained according to resolution information of the reference frame corresponding to the input video frame, the processing manner of the input video frame is determined according to the target threshold and the proportion of the intra coded blocks of the forward-encoded video frame in the forward-encoded video frame. When the proportion of the intra coded blocks of the forward-encoded video frame in the forward-encoded video frame is greater than the target threshold, it is determined that the processing manner corresponding to the input video frame is the downsampling processing manner.

In an embodiment, the second preset threshold is greater than the first preset threshold. In this case, when a processing manner corresponding to the reference frame is the full-resolution processing manner, the full-resolution processing manner is more inclined to be used for the input video frame; and when a processing manner corresponding to the reference frame is the downsampling processing manner, the downsampling processing manner is more inclined to be used for the input video frame.

The video encoding method is described below by assuming that a video sequence A includes three input video frames: a, b, and c.

1. A target video sequence encoding mode corresponding to the video sequence A is obtained. Because a current environment is a video call environment, the target video sequence encoding mode is a mixed-resolution encoding mode.

2. A decision is made for the first input video frame a by using a processing manner decision-making unit in a mixed-resolution encoding framework, to obtain that a processing manner is a downsampling processing manner, and a downsampling proportion is ½; a is downsampled to obtain a downsampled video frame a1; and intra-frame encoding is performed on a1, to obtain encoded data d1 corresponding to a1, and the encoded data d1 corresponding to a1 is reconstructed, to obtain a corresponding reconstructed video frame a2.

3. A decision is made for the second input video frame b by using the processing manner decision-making unit in the mixed-resolution encoding framework, to obtain that a processing manner is the downsampling processing manner, and a sampling proportion is $1/4$; b is downsampled to obtain a downsampled video frame b1; b1 is encoded, to obtain encoded data d2 corresponding to b; and sampling proportion information corresponding to the downsampling proportion and processing manner information corresponding to the processing manner are carried in the encoded data.

The encoding process includes: because b is an inter predictive frame, a2 needs to be used as a reference frame; and because a resolution of b1 is different from that of a2, a2 needs to be sampled. Direct sub-pixel interpolation is determined as a sampling manner of a2, and motion estimation precision is $1/4$, so that pixel interpolation precision is $1/4*2=1/2$, and $1/2$ sub-pixel interpolation is performed on a2 according to the pixel interpolation precision, to obtain a target reference frame a3. A first motion vector MV1 of a current encoded block in b1 and a target reference block in a target reference frame is calculated, a predicted residual is p1, and a target resolution is obtained to be an original resolution, so that a target motion vector is 4MV1. An initial predicted vector is calculated to be MV2, and the initial predicted vector is calculated at a resolution corresponding to a downsampling proportion of $1/4$, so that a target predicted vector is 4MV2, and a motion vector difference MVD1 corresponding to the current encoded block is equal to 4MV1-4MV2. Transformation, quantization, and entropy encoding are performed on MVD1 and p1, to obtain the encoded data d2.

4. A decision is made for the third input video frame c by using the processing manner decision-making unit in the mixed-resolution encoding framework, to obtain that a processing manner is a downsampling processing manner, and a downsampling proportion is $1/8$; c is downsampled to obtain a downsampled video frame c1; and c1 is encoded, to obtain encoded data d3 corresponding to c.

The encoding process includes: because c is an inter predictive frame, a corresponding reference frame is a reconstructed video frame b2 that is obtained by reconstructing the encoded data of b; and because a resolution of c1 is different from that of b2, b2 needs to be sampled. Direct sub-pixel interpolation is determined as a sampling manner of b2, and motion estimation precision is $1/4$, so that pixel interpolation precision is $1/4*2=1/2$; and $1/2$ sub-pixel interpolation is performed on b2 according to the pixel interpolation precision, to obtain a target reference frame b3. A first motion vector MV3 of a current encoded block in c1 and a target reference block in a target reference frame is calculated, a predicted residual is p2, and a target resolution is obtained to be an original resolution, so that a target motion vector is 8MV3. An initial predicted vector is obtained to be MV4, and the initial predicted vector is calculated at a resolution corresponding to a downsampling proportion of $1/4$, so that a target predicted vector is 4MV4, and a motion vector difference MVD2 corresponding to the current encoded block is equal to 8MV3-4MV4. Transformation, quantization, and entropy encoding are performed on MVD2 and p2, to obtain the encoded data d3.

5. d1, d2, and d3 are used to form an encoded data packet as encoded data corresponding to the video sequence, and the encoded data is transmitted to a receiving terminal, the encoded data corresponding to the video sequence carrying a flag bit describing that the target video sequence encoding mode is the mixed-resolution encoding mode.

Figure 12:
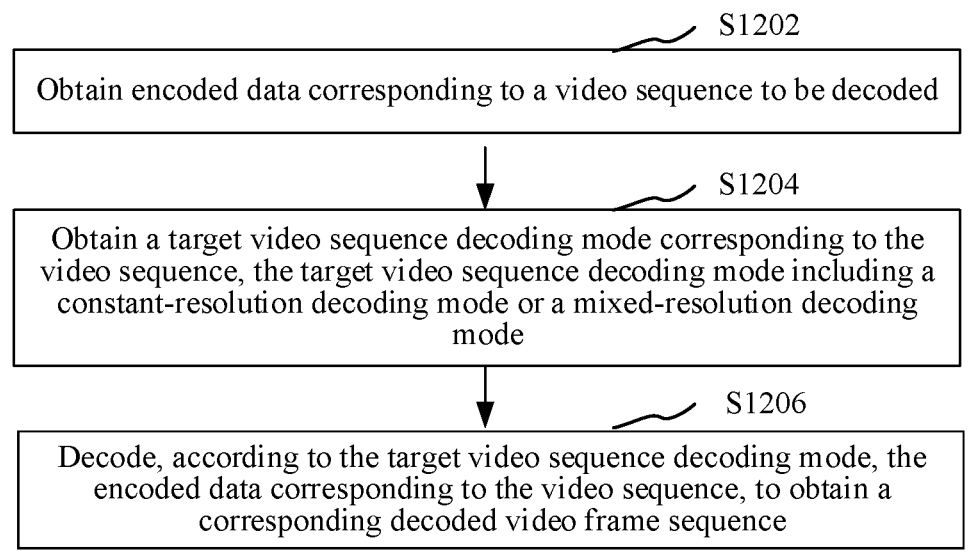
FIG. 12 is a flowchart of a video decoding method according to an embodiment.

As shown in FIG. 12, in an embodiment, a video decoding method is provided. In this embodiment, an example in which the method is applied to the terminal 110 or the server 120 in the foregoing FIG. 1 is used for description. The method may specifically include the following steps:

Step S1202: Obtain encoded data corresponding to a video sequence to be decoded.

Specifically, the video sequence is a video sequence needing to be decoded. One video sequence may include a plurality of video frames. The video sequence may be a video sequence that is obtained in real time, or may be a prestored video sequence. It may be understood that on an encoding end, data that is obtained through encoding is encoded data corresponding to an input video sequence. When the encoded data is transmitted to a decoding end, the encoded data that is received by the decoding end is the encoded data corresponding to the video sequence.

Step S1204: Obtain a target video sequence decoding mode corresponding to the video sequence, the target video sequence decoding mode including a constant-resolution decoding mode or a mixed-resolution decoding mode.

Specifically, a computer device may obtain target video sequence encoding mode information by parsing the encoded data, and obtain the target video sequence decoding mode according to the target video sequence encoding mode information. For example, when the target video sequence encoding mode corresponding to the target video sequence encoding mode information is the constant-resolution encoding mode, the corresponding target video sequence decoding mode is the constant-resolution decoding mode. In the constant-resolution decoding mode, resolutions of video frames in the video sequence are the same. When the target video sequence encoding mode corresponding to the target video sequence encoding mode information is the mixed-resolution encoding mode, the corresponding target video sequence decoding mode is the mixed-resolution decoding mode. That is, the video frames corresponding to the video sequence may have different resolutions.

Figure 13:
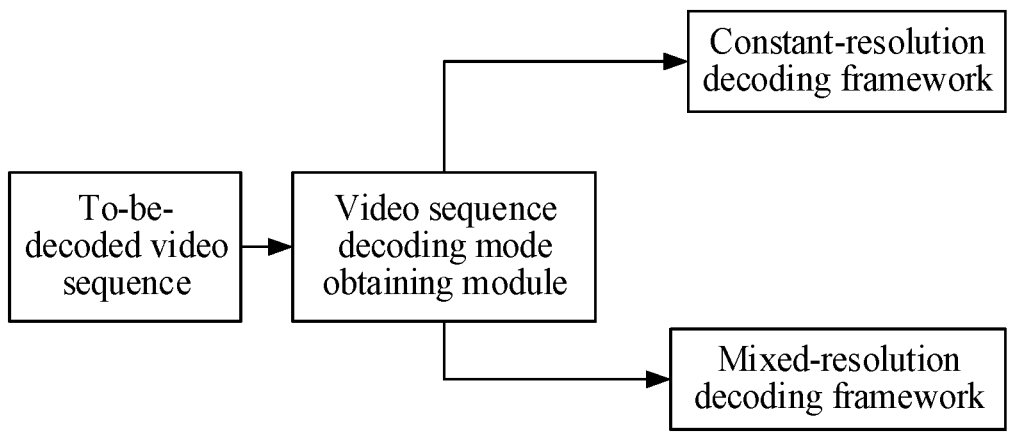
FIG. 13 is a schematic diagram of a video decoding framework according to an embodiment.

In an embodiment, video decoding frameworks are shown in FIG. 13. The video decoding frameworks include a constant-resolution decoding framework and a mixed-resolution decoding framework. The mixed-resolution decoding framework may correspond to the decoding framework in FIG. 3. After the video sequence is obtained, a decision is made on a video sequence decoding mode at a video sequence decoding mode obtaining module. When the target video sequence decoding mode is the mixed-resolution decoding mode, the mixed-resolution decoding framework is used for decoding; and when the target video sequence decoding mode is the constant-resolution decoding mode, the constant-resolution decoding framework in FIG. 13 is used for performing constant-resolution decoding. The constant-resolution decoding framework may be an HEVC decoding framework, an H.265 decoding framework, or the like.

In an embodiment, a decoding framework corresponding to a current video frame may be determined from header information of the encoded data. Specifically, the decoding end may obtain, from sequence-level header information corresponding to the encoded data, an encoding framework used for encoding each input video frame in an input video frame sequence corresponding to the current encoded data, so as to determine a decoding framework of the current video frame that matches the encoding framework. For example, when a flag bit Sequence_Mix_Flag that is in the sequence-level header information of the encoded data and used for determining the used encoding framework is 0, it represents that a constant-resolution encoding framework is used when each input video frame in the input video frame sequence is encoded, and the decoding end may use a constant-resolution decoding framework to decode the encoded data to obtain a reconstructed video frame corresponding to the current video frame; and when Sequence_Mix_Flag is 1, it represents that a mixed-resolution encoding framework is used when each input video frame in the input video frame sequence is encoded, and the decoding end may use a mixed-resolution decoding framework to decode the encoded data to obtain a reconstructed video frame sequence.

In an embodiment, the obtaining a target video sequence decoding mode corresponding to the video sequence may include: obtaining current environment information, the current environment information including at least one of current encoding environment information and current decoding environment information; and obtaining, from candidate video sequence decoding modes according to the current environment information, the target video sequence decoding mode corresponding to the video sequence.

Specifically, the computer device may alternatively obtain the corresponding target video sequence decoding mode according to a method for the encoding end to calculate a video sequence encoding mode. Therefore, in this embodiment of this application, determining the target video sequence decoding mode according to the current environment information is consistent with determining the target video sequence encoding mode according to the current environment information. Details are not described herein again.

In an embodiment, the current environment information includes current application scenario information. The target video sequence decoding mode is the mixed-resolution decoding mode in a case that a current application scenario corresponding to the current application scenario information is a real-time application scenario.

Step S1206: Decode, according to the target video sequence decoding mode, the encoded data corresponding to the video sequence, to obtain a corresponding decoded video frame sequence.

Specifically, when the target video sequence decoding mode is the constant-resolution decoding mode, constant-resolution decoding is performed on each video frame of the video sequence. When the target video sequence decoding mode is the mixed-resolution decoding mode, decoding is performed according to resolution information of the video frame in the video sequence. That is, the video frames corresponding to the video sequence may have different resolutions, and decoding needs to be performed according to the resolution information corresponding to the video frame.

In the foregoing video decoding method, during video decoding, encoded data corresponding to a video sequence is obtained; a target video sequence decoding mode corresponding to the video sequence is obtained, the target video sequence decoding mode including a constant-resolution decoding mode or a mixed-resolution decoding mode; and the encoded data corresponding to the video sequence is decoded according to the target video sequence decoding mode, to obtain a corresponding decoded video frame sequence. Therefore, during decoding, decoding can be flexibly performed according to the target video sequence decoding mode corresponding to the video sequence, so that an accurate decoded video frame can be obtained.

Figure 14:
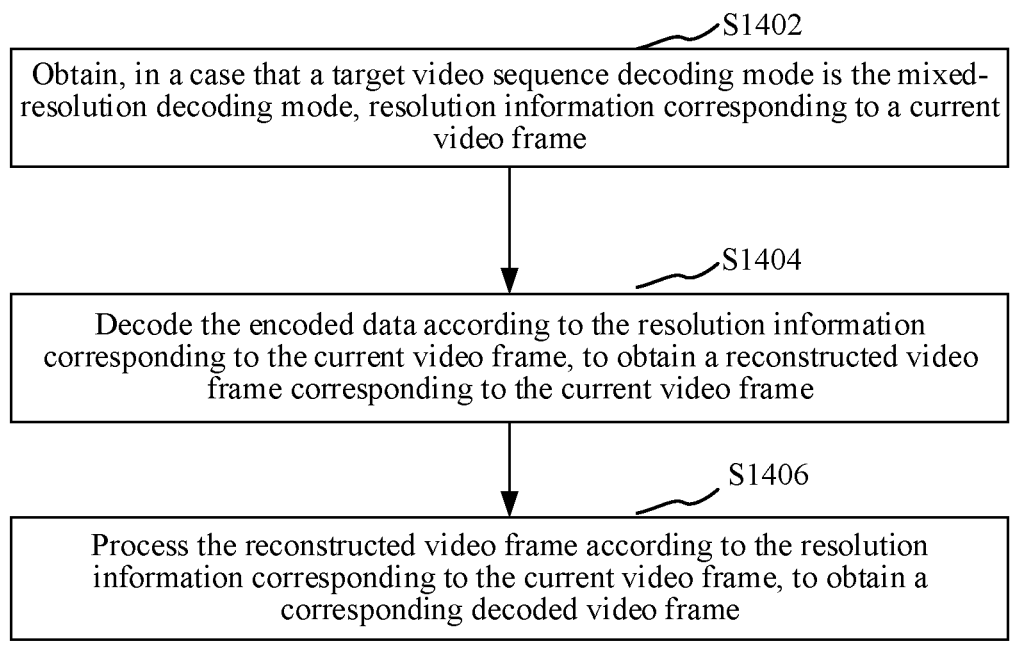
FIG. 14 is a flowchart of decoding, according to a target video sequence decoding mode, encoded data corresponding to a video sequence, to obtain a corresponding decoded video frame sequence according to an embodiment.

In an embodiment, as shown in FIG. 14, step S1206, that is, the decoding, according to the target video sequence decoding mode, the encoded data corresponding to the video sequence, to obtain a corresponding decoded video frame sequence includes:

Step S1402: Obtain, in a case that the target video sequence decoding mode is the mixed-resolution decoding mode, resolution information corresponding to a video frame.

Specifically, the video frame is a video frame in the video sequence. The resolution information is information related to a resolution, and may be the resolution or a downsampling proportion. The resolution information corresponding to the video frame may be carried in the encoded data, or may be obtained by a decoding device through calculation.

In an embodiment, the encoded data may carry the resolution information corresponding to the video frame. For example, the encoded data may carry a resolution or a downsampling proportion corresponding to the video frame.

In an embodiment, the encoded data may carry processing manner information. The computer device obtains processing manner information from the encoded data, and obtains, according to the processing manner information, the resolution information corresponding to the video frame. For example, the encoded data may carry processing manner information, and a processing manner corresponding to the processing manner information is a downsampling processing manner. It is determined in an encoding standard and a decoding standard that all downsampling proportions are ½, or the encoded data carries a corresponding downsampling proportion, so that the obtained resolution information is the downsampling proportion being ½.

Step S1404: Decode the encoded data according to the resolution information corresponding to the video frame, to obtain a reconstructed video frame corresponding to the video frame.

Specifically, the reconstructed video frame is a video frame obtained through decoding and reconstruction. It may be understood that resolution information corresponding to the reconstructed video frame corresponds to resolution information of a current frame in an encoding process. If there is no loss in image information in the encoding process, the reconstructed video frame is the same as the current frame. If there is a loss in image information in the encoding process, a difference between the reconstructed video frame and the current frame corresponds to a loss value. Decoding of the encoded data is performed according to the resolution information corresponding to the current video frames. The decoding may include at least one of prediction, inverse transformation, inverse quantization, and entropy decoding, and is specifically determined according to the encoding process. During decoding, the computer device processes, according to the resolution information of the current video frame, at least one of a reference frame, location information corresponding to each block of the current video frame, location information corresponding to each reference block of the reference frame, and a motion vector. The processing method matches the processing method that is used when the encoding end performs encoding. For example, the reference frame corresponding to the current video frame may be obtained, and the reference frame is processed according to the resolution information corresponding to the current video frame, to obtain a target reference frame; a target reference block is obtained according to motion vector information carried in the encoded data, and a predicted value corresponding to the block is obtained according to the target reference block; and a reconstructed video frame is obtained according to a predicted residual in the encoded data and the predicted value.

In an embodiment, if the encoding end has transformed location information, when corresponding location information is obtained in the decoding process, the location information needs to be correspondingly transformed, to maintain consistency between a target reference block obtained on the encoding end and the target reference block obtained on the decoding end.

In an embodiment, when the motion vector information carried in the encoded data is a target motion vector, the target motion vector may be transformed according to target motion vector unit resolution information and the resolution information corresponding to the current video frame, to obtain a first motion vector at the resolution information corresponding to the current video frame. The target reference block corresponding to the block is obtained according to the first motion vector.

In an embodiment, when the motion vector information carried in the encoded data is a motion vector difference, an initial predicted motion vector corresponding to a current block is obtained, and the motion vector difference and the initial predicted motion vector corresponding to the current block are processed at the same resolution, to obtain the first motion vector that corresponds to the current block and is at the resolution of the current video frame. The target reference block corresponding to the current block is obtained according to the first motion vector.

Specifically, the computer device transforms the motion vector difference and the initial predicted motion vector to corresponding motion vectors at the same resolution. For example, the initial predicted motion vector may be transformed to a target predicted motion vector at a target resolution; a target motion vector is obtained according to the target predicted motion vector and the motion vector difference; and then the target motion vector is transformed to the first motion vector at the resolution of the current video frame. Alternatively, the initial predicted motion vector may be transformed to a predicted motion vector at the resolution of the current video frame, and the motion vector difference may be transformed to a motion vector difference at the resolution of the current video frame. The first motion vector is obtained according to the motion vector difference at the resolution of the current video frame and the predicted motion vector at the resolution of the current video frame.

Step S1406: Process the reconstructed video frame according to the resolution information corresponding to the current video frame, to obtain a corresponding decoded video frames.

Specifically, the reconstructed video frame may be processed in a manner of sampling processing, for example, upsampling processing. A method for processing the reconstructed video frame may correspond to the method for processing the input video frame during encoding. For example, when a processing manner of the input video frame is the downsampling processing manner, and resolution information of the input video frame is a ½ downsampling proportion, upsampling processing is performed on the reconstructed video frame, and an upsampling proportion may be 2.

In an embodiment, when the decoding end determines, from header information of encoded data, that the encoded data is obtained through encoding in the downsampling processing manner, the decoding end may further obtain used downsampling proportion information and downsampling method information from the header information, and perform upsampling processing on the obtained reconstructed video frame by using an upsampling proportion and an upsampling method that match the downsampling proportion information or the downsampling method information, to obtain a decoded video frame. For example, if a sampling proportion corresponding to the downsampling proportion information is ½, the decoding end needs to perform upsampling processing on the reconstructed video frame according to a sampling proportion of 2 and an upsampling method matching the downsampling method information, to obtain the decoded video frame. The decoding end may obtain, from any one of sequence-level header information, group-level header information, and frame-level header information, the downsampling proportion information or downsampling method information corresponding to the current encoded data.

In the foregoing video decoding method, encoded data corresponding to a current video frame is obtained, and resolution information corresponding to the current video frame is obtained; the encoded data is decoded according to the resolution information corresponding to the current video frame, to obtain a reconstructed video frame corresponding to the current video frame; and the reconstructed video frame is processed according to the resolution information corresponding to the current video frame, to obtain a corresponding decoded video frame. Therefore, during decoding, decoding may be flexibly performed according to the resolution information corresponding to the current video frame, to obtain the decoded video frame; and the decoding is performed at a resolution of the current video frame, so that an accurate decoded video frame can be obtained.

In an embodiment, all the reconstructed video frames corresponding to the current video frames of the video sequence are processed into decoded video frames having the same resolution. For example, the reconstructed video frames are processed into decoded video frames having a resolution the same as an original resolution of the input video frames.

Figure 15:
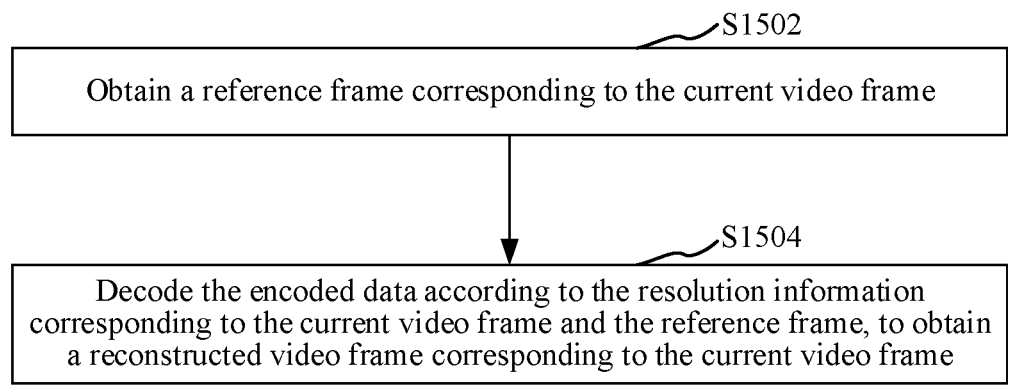
FIG. 15 is a flowchart of decoding encoded data according to resolution information corresponding to a current frame, to obtain a reconstructed video frame corresponding to the current frame according to an embodiment.

In an embodiment, as shown in FIG. 15, step S1404, that is, the decoding the encoded data according to the resolution information corresponding to the current video frame, to obtain a reconstructed video frame corresponding to the current video frame includes:

Step S1502: Obtain a reference frame corresponding to the current video frame.

Specifically, there may be one or more reference frames corresponding to the current video frame. For example, when the current video frame is a P frame, there may be one corresponding reference frame; and when the current video frame is a B frame, there may be two corresponding reference frames. The reference frame corresponding to the current video frame may be obtained according to a reference relationship, and the reference relationship may vary according to video encoding and decoding standards. For example, if a second video frame in a GOP is a B frame, corresponding reference frames may be an I frame of the GOP and a fourth frame of the GOP. Alternatively, the reference frame corresponding to the current video frame may be previous one or two of forward-encoded frames of the current video frame. It may be understood that the reference frame herein is the same as that in the encoding process.

In an embodiment, the obtaining a reference frame corresponding to the current video frame includes: obtaining a second reference rule, the second reference rule including a resolution magnitude relationship between the current video frame and the reference frame; and obtaining, according to the second reference rule, the reference frame corresponding to the current video frame.

Specifically, the second reference rule determines a resolution magnitude restrictive relationship between the current video frame and the reference frame. It may be understood that, to ensure that the reference frame obtained in the encoding process is the same as the reference frame obtained in the decoding process, the first reference rule is the same as the second reference rule. The first reference rule and the second reference rule may be preset in encoding and decoding standards. Alternatively, during encoding, the first reference rule may be selected according to an encoding application scenario, a real-time requirement, and the like, and reference rule information is carried in the encoded data, so that a decoder obtains the second reference rule according to the reference rule information in the encoded data. The resolution magnitude relationship includes at least one of the resolution of the current video frame being the same as that of the reference frame and the resolution of the current video frame being different from that of the reference frame. When the second reference rule includes that the resolution of the current video frame is the same as that of the reference frame, the second reference rule may further include a processing manner reference rule of the resolution of the current video frame and the resolution of the reference frame. For example, the processing manner reference rule may include one or two of that: for a current video frame using the full-resolution processing manner, reference may be made to a reference frame using the full-resolution processing manner; and for a current video frame using the downsampling processing manner, reference may be made to a reference frame using the downsampling processing manner. When the second reference rule includes that the resolution of the current video frame is different from that of the reference frame, the second reference rule may further include one or two of: the resolution of the current video frame being greater than that of the reference frame, and the resolution of the current video frame being less than that of the reference frame. Therefore, the second reference rule may include one or more of that: for a current video frame having an original resolution, reference may be made to a reference frame having a downsampling resolution; for a current video frame having a downsampling resolution, reference may be made to a reference frame having an original resolution; for a current video frame having an original resolution, reference may be made to a reference frame having an original resolution; and for a current video frame having a downsampling resolution, reference may be made to a reference frame having a downsampling resolution. The current video frame having the original resolution means that the resolution of current video frame is the same as that of a corresponding input video frame. The reference frame having the original resolution means that the resolution of the reference frame is the same as that of an input video frame corresponding to the reference frame. The current video frame having the downsampling resolution means that resolution information corresponding to the current video frame is downsampling. The reference frame having the downsampling resolution means that resolution information corresponding to the reference frame is downsampling. After the second reference rule is obtained, the reference frame corresponding to the current video frame is obtained according to the second reference rule, so that the obtained reference frame satisfies the second reference rule.

Step S1504: Decode the encoded data according to the resolution information corresponding to the current video frame and the reference frame, to obtain a reconstructed video frame corresponding to the current video frame.

Specifically, the computer device may obtain, from the reference frame, a reference block corresponding to a current block of the current video frame, and decode the current block according to the reference block. The computer device may alternatively process the reference frame according to the resolution information of the current video frame, to obtain a corresponding target reference frame; obtain, from the target reference frame, a target reference block corresponding to the current block of the current video frame; and decode the current block according to the target reference block, to obtain the reconstructed video frame corresponding to the current video frame.

In an embodiment, step S1504, that is, the decoding the encoded data according to the resolution information corresponding to the current video frame and the reference frame, to obtain a reconstructed video frame corresponding to the current video frame includes: performing sampling processing on the reference frame according to the resolution information corresponding to the current video frame, to obtain the corresponding target reference frame; and decoding the current video frame according to the target reference frame, to obtain the reconstructed video frame corresponding to the current video frame.

Specifically, the target reference block is obtained from the target reference frame according to motion vector information carried in the encoded data; a predicted value corresponding to the current block is obtained according to the target reference block; and the reconstructed video frame is obtained according to a predicted residual in the encoded data and the predicted value.

In an embodiment, the performing sampling processing on the reference frame according to the resolution information corresponding to the current video frame, to obtain the corresponding target reference frame includes: performing sampling processing on the reference frame according to the resolution information and motion estimation pixel precision of the current video frame, to obtain the corresponding target reference frame.

In an embodiment, the performing sampling processing on the reference frame according to the resolution information and motion estimation pixel precision of the current video frame, to obtain the corresponding target reference frame includes: calculating pixel interpolation precision according to the resolution information and the motion estimation pixel precision of the current video frame; and directly performing sub-pixel interpolation processing on the reference frame according to the pixel interpolation precision, to obtain the corresponding target reference frame.

In an embodiment, the performing sampling processing on the reference frame according to the resolution information and motion estimation pixel precision of the current video frame, to obtain the corresponding target reference frame includes: performing sampling processing on the reference frame according to the resolution information of the current video frame, to obtain an intermediate reference frame; and performing sub-pixel interpolation processing on the intermediate reference frame according to the motion estimation pixel precision, to obtain the target reference frame.

Specifically, the resolution of the current video frame is the same as that of the current frame, and the obtained target reference frames are also the same. Therefore, the method in which sampling processing is performed on the reference frame according to the resolution information corresponding to the current video frame, to obtain the corresponding target reference frame is the same as that in the encoding end, sampling processing is performed on the reference frame according to the resolution information of the current frame, to obtain the corresponding target reference frame. Details are not described herein again in this embodiment of this application.

In an embodiment, the decoding end may also obtain sampling manner information corresponding to the current video frame from the header information of the encoded data. Specifically, the decoding end may obtain, from any one of sequence-level header information, group-level header information, and frame-level header information, sub-pixel interpolation manner information corresponding to the current video frame. For example, when a flag bit Pixel_Sourse_Interpolation that is in the frame-level header information of the encoded data and used for determining the sampling manner is 0, it represents that sub-pixel interpolation processing is directly performed on the reference frame corresponding to the input video frame; and when Pixel_Sourse_Interpolation is 1, it represents that after sampling processing is performed on the reference frame corresponding to the input video frame, sub-pixel interpolation processing is then performed on the reference frame corresponding to the input video frame. The decoding end may perform sub-pixel interpolation processing on the reference frame in a manner the same as a sub-pixel interpolation manner represented by a flag bit in the encoded data, to obtain a target reference frame, so that the encoded data may be decoded according to the target reference frame to obtain the reconstructed video frame.

Figure 16:
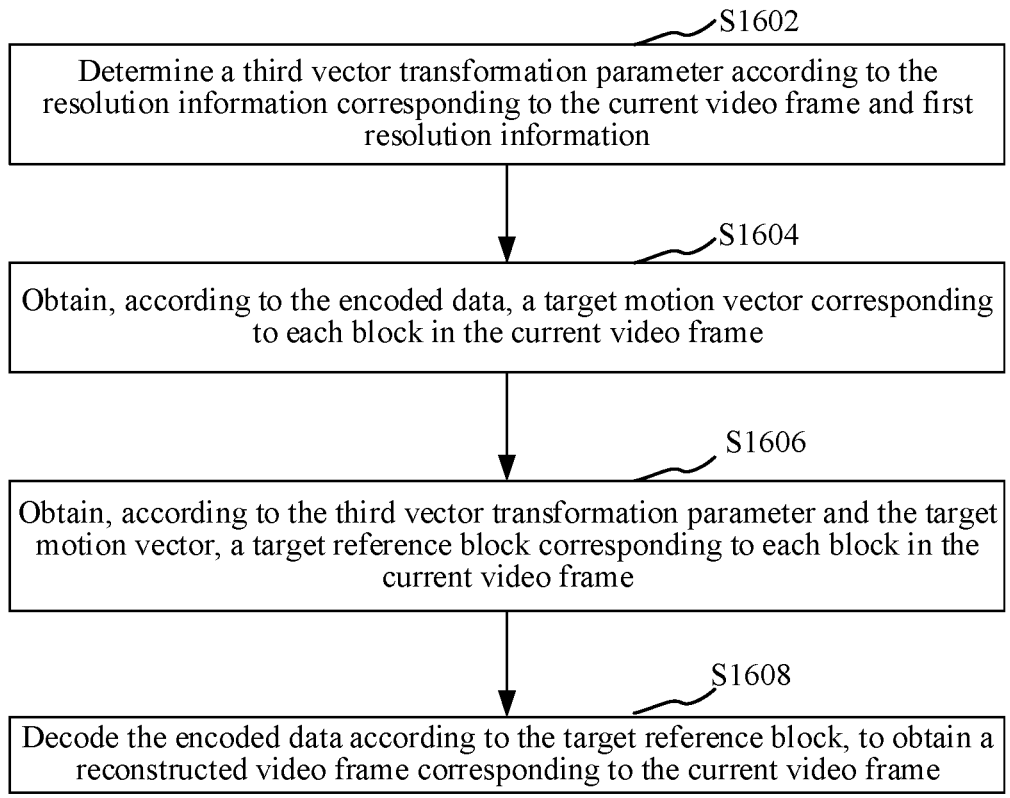
FIG. 16 is a flowchart of decoding encoded data according to resolution information corresponding to a current frame and a reference frame, to obtain a reconstructed video frame corresponding to the current frame according to an embodiment.

In an embodiment, as shown in FIG. 16, step S1504, that is, the decoding the encoded data according to the resolution information corresponding to the current video frame and the reference frame, to obtain a reconstructed video frame corresponding to the current video frame includes:

Step S1602: Determine a third vector transformation parameter according to the resolution information corresponding to the current video frame and first resolution information, the first resolution information including target motion vector unit resolution information or resolution information of the reference frame.

Specifically, the third vector transformation parameter is used for transforming location information of obtained motion vector or the obtained motion vector. The third vector transformation parameter may be a proportion of the first resolution information to the resolution information of the current video frame, and corresponds to the first vector transformation parameter. When transforming the target motion vector by using the third vector transformation parameter, the computer device may transform the target motion vector into a corresponding motion vector at the resolution corresponding to the current video frame, so that the third vector transformation parameter may be the reciprocal of the first vector transformation parameter. When the location information corresponding to the motion vectors is transformed by using the third vector transformation parameter, if the first vector transformation parameter in the encoding end is used for transforming first location information, because the location information of the current block is the same as that of the encoded block, the third vector transformation parameter is the same as the first vector transformation parameter. If the first vector transformation parameter in the encoding end is used for transforming second location information, because a location value that is calculated according to the target motion vector and the first location information is a location value in the encoding end that is obtained after the second location information is transformed according to the first vector transformation parameter, the third vector transformation parameter is the reciprocal of the first vector transformation parameter.

Step S1604: Obtain, according to the encoded data, a target motion vector corresponding to each block in the current video frame.

Specifically, when the encoded data carries the target motion vector, the computer device reads the target motion vector from the encoded data. When the encoded data carries the motion vector difference, the computer device may calculate a target predicted motion vector, and obtain the target motion vector according to the motion vector difference and the target predicted motion vector.

Step S1606: Obtain, according to the third vector transformation parameter and the target motion vector, a target reference block corresponding to each block in the current video frame.

Specifically, after the third vector transformation parameter is obtained, the computer device transforms, according to the third vector transformation parameter, the obtained motion vector or the location information corresponding to the motion vector, to obtain location information corresponding to the target reference block, thereby obtaining the target reference block.

Step S1608: Decode the encoded data according to the target reference block, to obtain the reconstructed video frame corresponding to the current video frame.

Specifically, after obtaining the target reference block, the computer device obtains a pixel value of each image block of the reconstructed video frame according to a pixel value of the target reference block and the predicted residual of the image block that is carried in the encoded data, to obtain the reconstructed video frame.

In an embodiment, step S1602, that is, the determining a third vector transformation parameter according to the resolution information corresponding to the current video frame and first resolution information includes: determining the third vector transformation parameter according to the resolution information corresponding to the current video frame and the resolution information of the reference frame; and step S1606, that is, the obtaining, according to the third vector transformation parameter and the target motion vector, a target reference block corresponding to each block in the current video frame includes: obtaining first location information corresponding to a current block; and obtaining, according to the first location information, the third vector transformation parameter, and the target motion vector, a target reference block corresponding to the current block.

Specifically, the computer device may obtain, according to the first location information, the third vector transformation parameter, and the target motion vector, the second location information corresponding to the target reference block, and obtain the target reference block according to the second location information. Due to the correspondence between encoding and decoding, if the first vector transformation parameter in the encoding end is used for transforming the first location information, because the location information of the current block is the same as that of the encoded block, the third vector transformation parameter is the same as the first vector transformation parameter. If the first vector transformation parameter in the encoding end is used for transforming the second location information, because a location value that is calculated according to the target motion vector and the first location information is a location value in the encoding end that is obtained after the second location information is transformed according to the first vector transformation parameter, the third vector transformation parameter is the reciprocal of the first vector transformation parameter.

For example, if the resolution of the current video frame is 1200*1200 pixels, the resolution of the reference frame is 600*600 pixels, the first vector transformation parameter is used for transforming the second location information, and the first vector transformation parameter is 2, the third vector transformation parameter is ½. Assuming that the first location information is (6, 8), and the target motion vector is (0, 2), intermediate location information is (6, 8)−(0, 2)=(6, 6), and the second location information corresponding to the target reference block is (6*½, 6*½)=(3, 3).

For example, if the resolution of the current video frame is 1200*1200 pixels, the resolution of the reference frame is 600*600 pixels, the first vector transformation parameter is used for transforming the first location information, and the first vector transformation parameter is ½, the third vector transformation parameter is ½. Assuming that the first location information is (6, 8), the target motion vector is (0, 1), and the second location information is (6*½, 8*½)−(0, 1)=(3, 3).

In an embodiment, step S1602, that is, the determining a third vector transformation parameter according to the resolution information corresponding to the current video frame and first resolution information includes: determining the third vector transformation parameter according to the resolution information corresponding to the current video frame and the target motion vector unit resolution information; and step S1606, that is, the obtaining, according to the third vector transformation parameter and the target motion vector, a target reference block corresponding to the current block in the current video frame includes: obtaining a first motion vector according to the target motion vector and the third vector transformation parameter; and obtaining, according to the first motion vector, a target reference block corresponding to the current block.

Specifically, the third vector transformation parameter is determined according to the resolution information corresponding to the current video frame and the target motion vector unit resolution information, and is used for transforming the target motion vector into the first motion vector at the resolution corresponding to the current video frame. After the third vector transformation parameter is obtained, the computer device may multiply the third vector transformation parameter by the target motion vector, and use the obtained product as the first motion vector. It may be understood that the process of obtaining the first motion vector according to the third vector transformation parameter and the target motion vector is an inverse process of obtaining, according to the first vector transformation parameter and the first motion vector, the target motion vector corresponding to the current encoded block. For example, in the encoding end, if the first vector transformation parameter of an encoded block corresponding to the current block is equal to 2, the obtained first motion vector is (2, 2), the target motion vector is obtained to be (4, 4) according to the product of the first vector transformation parameter and the first motion vector (2, 2). Therefore, in the decoding process, the third vector transformation parameter is ½, the obtained target motion vector is (4, 4), and the first motion vector is obtained to be (2, 2) according to the product of the third vector transformation parameter ½ and the target motion vector (4, 4).

In an embodiment, when the encoded data carries a motion vector difference, the obtaining, according to the encoded data, a target motion vector corresponding to each block in the current video frame includes: obtaining, according to the encoded data, a motion vector difference corresponding to a current block in the current video frame; obtaining an initial predicted motion vector corresponding to the current block; obtaining a second vector transformation parameter according to current motion vector unit resolution information corresponding to the initial predicted motion vector and the target motion vector unit resolution information; obtaining, according to the initial predicted motion vector and the second vector transformation parameter, a target predicted motion vector corresponding to the current block; and obtaining the target motion vector according to the target predicted motion vector and the motion vector difference.

Specifically, because the block in the decoding process corresponds to the current block in the encoding process, and rules for obtaining the initial predicted motion vectors are the same, the initial predicted motion vector corresponding to the current block is the same as that corresponding to the current block. For the method for obtaining the target predicted motion vector, reference may be made to the corresponding method in the encoding process. Details are not described herein again. The target motion vector is a sum of the target predicted motion vector and the motion vector difference.

In an embodiment, a proportion of target prediction-type decoded blocks in a forward-decoded video frame corresponding to the current video frame may further be calculated; the processing manner corresponding to the current video frame is determined according to the proportion; and the resolution information corresponding to the current video frame is obtained according to the processing manner.

Specifically, the target prediction-type decoded blocks correspond to the target prediction-type encoded blocks. The forward-decoded video frame is a video frame that has been decoded before the current video frame is decoded, and also corresponds to a forward-encoded video frame. Therefore, the method for calculating the proportion of the target prediction-type encoded blocks and a result thereof that are obtained by the encoding end are also the same as the method for calculating the proportion of the target prediction-type decoded blocks and a result thereof that are obtained by the decoding end. For the method for obtaining the proportion of the target prediction-type decoded blocks, reference may be made to the method for obtaining the proportion of the target prediction-type encoded blocks. Details are not described herein again. After the processing manner is obtained, when the processing manner is the full-resolution processing manner, the corresponding resolution information is the original resolution. When the processing manner is the downsampling processing manner, a preset downsampling proportion is obtained or a downsampling proportion is obtained from the header information of the encoded data.

In an embodiment, a proportion of intra decoded blocks of the forward-decoded video frame in the forward-decoded video frame may be calculated. When the proportion is greater than a target threshold, it is determined that the processing manner is the downsampling processing manner.

For the proportion corresponding to the intra decoded blocks, it may be that when the proportion is greater than the target threshold, it is determined that the target processing manner corresponding to the current video frame is the downsampling processing manner; otherwise, it is determined that the target processing manner corresponding to the current video frame is the full-resolution processing manner.

The target threshold may be determined according to a processing manner of a reference frame corresponding to the current video frame. When the processing manner of the reference frame corresponding to the current video frame is the downsampling processing manner, a first preset threshold T1 is obtained, and the first preset threshold T1 is used as the target threshold. Similarly, when the processing manner of the reference frame corresponding to the current video frame is the full-resolution processing manner, a second preset threshold T2 is obtained, and the second preset threshold T2 is used as the target threshold. Further, after the target threshold is obtained according to resolution information of the reference frame corresponding to the current video frame, the processing manner of the current video frame is determined according to the target threshold and the proportion of the intra decoded blocks of the forward-decoded video frame in the forward-decoded video frame. When the proportion of the intra decoded blocks of the forward-decoded video frame in the forward-decoded video frame is greater than the target threshold, it is determined that the processing manner corresponding to the current video frame is the downsampling processing manner.

The video decoding method is described below by using an example in which the encoded data corresponding to the video sequence A is decoded. It is assumed that the input video frames a, b, and c respectively correspond to current video frames e, f, and g on a decoding end.

1. A receiving terminal (namely, the decoding end) obtains the encoded data corresponding to the video sequence A, and obtains, from sequence header information corresponding to the encoded data, that the target video sequence encoding mode is a mixed-resolution encoding mode. Therefore, the encoded data is decoded by using a mixed-resolution decoding framework.

2. A resolution information obtaining unit of the mixed-resolution decoding framework obtains resolution information corresponding to the first current video frame e. It may be understood that encoded data corresponding to e is data obtained by encoding a1. Intra-frame decoding is performed on e, to obtain a reconstructed video frame e1. Resolution information corresponding to e is: a downsampling proportion being ½, so that the reconstructed video frame e1 may be upsampled by using a sampling proportion of 2, to obtain a decoded video frame e2.

3. The resolution information obtaining unit of the mixed-resolution decoding framework obtains resolution information corresponding to the second current video frame f. It may be understood that encoded data corresponding to f is data that is obtained by encoding b1. Inter-frame decoding is performed on f, to obtain a reconstructed video frame f1. Resolution information corresponding to f is: a downsampling proportion being ¼, so that the reconstructed video frame f1 may be upsampled by using a sampling proportion of 4, to obtain a decoded video frame f2.

The decoding process is as follows: because f is an inter predictive frame, the reconstructed video frame e1 needs to be used as a reference frame. It may be understood that e1 and a2 are the same, and the same sampling processing is performed on e1 and a2, to obtain e3. Herein, e3 and a3 are the same, and are target reference frames. It is obtained from the encoded data that a motion vector difference corresponding to a current block is MVD1. MVD1 is at a target resolution, that is, an original resolution, so that MVD1 needs to be transformed to be at a resolution corresponding to f. Therefore, MVD3 being MVD1/4 may be obtained. An initial predicted vector being MV2 is obtained. The initial predicted vector is calculated at a resolution that corresponds to the downsampling proportion of ¼ and that is the same as a resolution corresponding to f, so that a first motion vector being MV1 may be obtained, and MV1 is equal to MVD1/4+MV2. A target reference block is obtained according to MV1. A predicted value corresponding to the current block is obtained according to the target reference block, and a predicted residual p1 is added to the predicted value, to reconstruct and obtain a reconstructed block corresponding to the reconstructed video frame f1.

4. The resolution information obtaining unit of the mixed-resolution decoding framework obtains resolution information corresponding to the third current video frame g. It may be understood that encoded data corresponding to g is data obtained by encoding c1. Inter-frame decoding is performed on g, to obtain a reconstructed video frame g1. Resolution information corresponding to g is: a downsampling proportion being ⅛, so that the reconstructed video frame g1 may be upsampled by using a sampling proportion of 8, to obtain a decoded video frame g2.

The decoding process is as follows: because g is an inter predictive frame, the reconstructed video frame f1 needs to be used as a reference frame. It may be understood that f1 and b2 are the same, and the same sampling processing is performed on f1 and b2, to obtain f3. Herein, f3 and b3 are the same, and are target reference frames. It is obtained from the encoded data that a motion vector difference corresponding to a current block is MVD2. MVD2 is at a target resolution, that is, an original resolution, so that MVD2 needs to be transformed to be at a resolution corresponding to g. Therefore, MVD2 being MVD1/8 may be obtained. An initial predicted vector being MV4 is obtained. The initial predicted vector is calculated at a resolution corresponding to the downsampling proportion of ¼ and needs to be transformed to be at the resolution corresponding to f. The downsampling proportion corresponding to f is ⅛, so that a first motion vector being MV3 may be obtained, and MV3 is equal to MVD2/8+MV4/2. A target reference block is obtained according to MV3. A predicted value corresponding to the current block is obtained according to the target reference block, and a predicted residual p2 is added to the predicted value, to reconstruct and obtain a reconstructed block corresponding to the reconstructed video frame g1.

5. The receiving terminal plays e2, f2, and g2.

Figure 17:
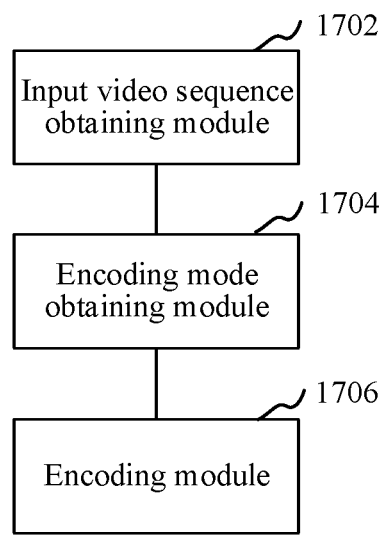
FIG. 17 is a structural block diagram of a video encoding apparatus according to an embodiment.

As shown in FIG. 17, in an embodiment, a video encoding apparatus is provided. The video encoding apparatus may be integrated in the foregoing computer device such the terminal 110 or the server 120, and may specifically include an input video sequence obtaining module 1702, an encoding mode obtaining module 1704, and an encoding module 1706.

The input video sequence obtaining module 1702 is configured to obtain an input video sequence.

The encoding mode obtaining module 1704 is configured to obtain, from candidate video sequence encoding modes, a target video sequence encoding mode corresponding to the input video sequence, the candidate video sequence encoding modes including a constant-resolution encoding mode and a mixed-resolution encoding mode.

The encoding module 1706 is configured to encode each input video frame of the input video sequence according to the target video sequence encoding mode, to obtain encoded data.

In an embodiment, the encoding module 1706 is configured to: perform constant-resolution encoding on each input video frame of the input video sequence in a case that the target video sequence encoding mode is the constant-resolution encoding mode.

In an embodiment, the encoding module 1706 includes:

a processing manner obtaining unit, configured to obtain a processing manner corresponding to the input video frame in a case that the target video sequence encoding mode is the mixed-resolution encoding mode;

a processing unit, configured to process the input video frame according to the processing manner, to obtain a current frame, a resolution of the current frame corresponding to the processing manner being a resolution of the input video frame or being less than a resolution of the input video frame; and an encoding unit, configured to encode the current frame at the resolution of the current frame, to obtain the encoded data corresponding to the input video frame.

In an embodiment, the encoding mode obtaining module 1704 is configured to: obtain current environment information, the current environment information including at least one of current encoding environment information and current decoding environment information; and obtain, from candidate video sequence encoding modes according to the current environment information, the target video sequence encoding mode corresponding to the input video sequence.

In an embodiment, the current environment information includes current application scenario information; and the target video sequence encoding mode is the mixed-resolution encoding mode in a case that a current application scenario corresponding to the current application scenario information is a real-time application scenario.

In an embodiment, the encoding module 1706 is configured to add target video sequence encoding mode information corresponding to the target video sequence encoding mode to the encoded data.

Figure 18:
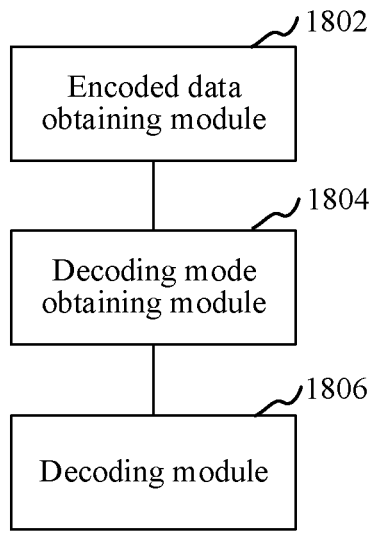
FIG. 18 is a structural block diagram of a video decoding apparatus according to an embodiment.

As shown in FIG. 18, in an embodiment, a video decoding apparatus is provided. The video decoding apparatus may be integrated in the foregoing computer device such as the server 120 or the terminal 110, and may specifically include an encoded data obtaining module 1802, a decoding mode obtaining module 1804, and a decoding module 1806.

The encoded data obtaining module 1802 is configured to obtain encoded data corresponding to a video sequence.

The decoding mode obtaining module 1804 is configured to obtain a target video sequence decoding mode corresponding to the video sequence, the target video sequence decoding mode including a constant-resolution decoding mode or a mixed-resolution decoding mode.

The decoding module 1806 is configured to decode, according to the target video sequence decoding mode, the encoded data corresponding to the video sequence, to obtain a corresponding decoded video frame sequence.

In an embodiment, the decoding module 1806 is configured to: perform constant-resolution decoding on each current video frame of the video sequence in a case that the target video sequence decoding mode is the constant-resolution decoding mode.

In an embodiment, the decoding module 1806 includes:

a resolution information obtaining unit, configured to obtain resolution information corresponding to current video frames in a case that the target video sequence decoding mode is the mixed-resolution decoding mode;

a decoding unit, configured to decode the encoded data according to the resolution information corresponding to the current video frames, to obtain a reconstructed video frame corresponding to the current video frames; and a processing unit, configured to process the reconstructed video frame according to the resolution information corresponding to the current video frames, to obtain a corresponding decoded video frame.

In an embodiment, the decoding mode obtaining module 1804 is configured to: obtain current environment information, the current environment information including at least one of current encoding environment information and current decoding environment information; and obtain, from candidate video sequence decoding modes according to the current environment information, the target video sequence decoding mode corresponding to the video sequence.

In an embodiment, the decoding mode obtaining module 1804 is configured to obtain the target video sequence decoding mode by parsing the encoded data corresponding to the video sequence.

Figure 19:
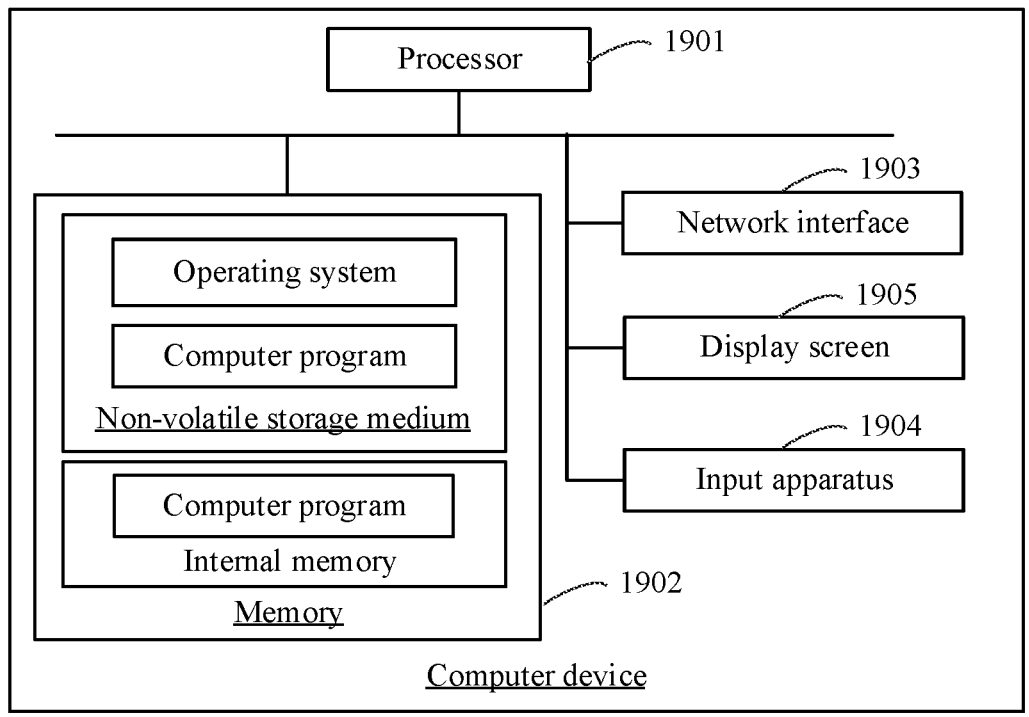
FIG. 19 is a block diagram of an internal structure of a computer device according to an embodiment.

FIG. 19 is a diagram of an internal structure of a computer device according to an embodiment. The computer device may be specifically the terminal 110 in FIG. 1. As shown in FIG. 19, the computer device includes a processor 1901, a memory 1902, a network interface 1903, an input apparatus 1904, and a display screen 1905 that are connected through a system bus. The memory 1902 includes a non-volatile storage medium and an internal memory. The non-volatile storage medium of the computer device stores an operating system and may further store a computer program, and the computer program, when executed by the processor 1901, may cause the processor 1901 to implement at least one method of the video encoding method and the video decoding method according to any one of the embodiments of this application. The internal memory may also store a computer program, the computer program, when executed by the processor 1901, may cause the processor 1901 to perform at least one method of the video encoding method and the video decoding method according to any one of the embodiments of this application. The display screen 1905 of the computer device may be a liquid crystal display screen or an electronic ink display screen. The input apparatus 1904 of the computer device may be a touch layer covering the display screen, or may be a key, a trackball or a touchpad disposed on a housing of the computer device, and may further be an external keyboard, touchpad, mouse, or the like.

Figure 20:
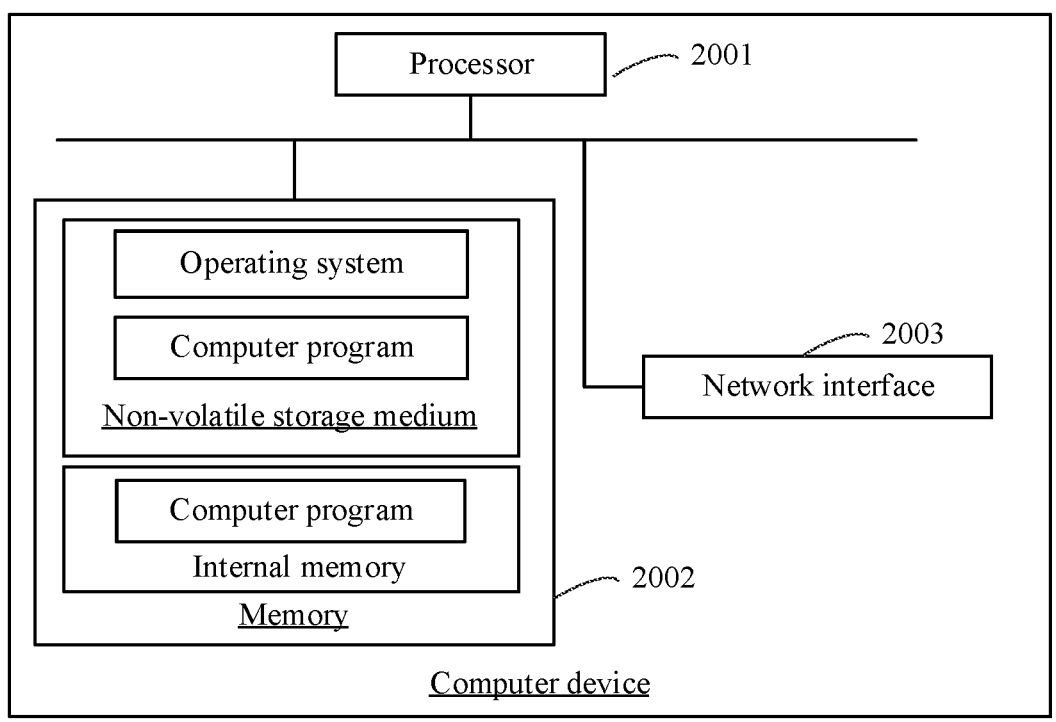
FIG. 20 is a block diagram of an internal structure of a computer device according to an embodiment.

FIG. 20 is a diagram of an internal structure of a computer device according to an embodiment. The computer device may be specifically the server 120 in FIG. 1. As shown in FIG. 20, the computer device includes a processor 2001, a memory 2002, and a network interface 2003 that are connected through a system bus. The memory 2002 includes a non-volatile storage medium and an internal memory. The non-volatile storage medium of the computer device stores an operating system and may further store a computer program, and the computer program, when executed by the processor 2001, may cause the processor 2001 to implement at least one method of the video encoding method and the video decoding method according to any one of the embodiments of this application. The internal memory may also store a computer program, the computer program, when executed by the processor 2001, may cause the processor 2001 to perform at least one method of the video encoding method and the video decoding method according to any one of the embodiments of this application.

A person skilled in the art may understand that, the structures shown in FIG. 19 and FIG. 20 are only block diagrams of partial structures related to the solution of this application, and do not constitute a limitation to the computer device to which the solution of this application is applied. Specifically, the computer device may include more or fewer components than those shown in the figures, or combine some components, or have a different component deployment.

In an embodiment, the video encoding apparatus provided in this application may be implemented in a form of a computer program. The computer program may be run on the computer device shown in FIG. 19 and FIG. 20. The memory of the computer device may store program modules forming the video encoding apparatus, for example, the input video sequence obtaining module 1702, the encoding mode obtaining module 1704, and the encoding module 1706 shown in FIG. 17. The computer program formed by the program modules causes the processor to perform the steps of the video encoding method described in the embodiments of this application in this specification.

For example, the computer device shown in FIG. 19 and FIG. 20 may obtain an input video sequence by using the input video sequence obtaining module 1702 shown in FIG. 17; obtain, from candidate video sequence encoding modes, a target video sequence encoding mode corresponding to the input video sequence by using the encoding mode obtaining module 1704, the candidate video sequence encoding modes including a constant-resolution encoding mode and a mixed-resolution encoding mode; and encode each input video frame of the input video sequence according to the target video sequence encoding mode by using the encoding module 1706, to obtain encoded data.

In an embodiment, the video decoding apparatus provided in this application may be implemented in a form of a computer program. The computer program may be run on the computer device shown in FIG. 19 and FIG. 20. The memory of the computer device may store program modules forming the video decoding apparatus, for example, the encoded data obtaining module 1802, the decoding mode obtaining module 1804, and the decoding module 1806 shown in FIG. 18. The computer program formed by the program modules causes the processor to perform the steps of the video decoding method described in the embodiments of this application in this specification.

For example, the computer device shown in FIG. 19 and FIG. 20 may obtain encoded data corresponding to a video sequence by using the encoded data obtaining module 1802 shown in FIG. 18; obtain a target video sequence decoding mode corresponding to the video sequence by using the decoding mode obtaining module 1804, the target video sequence decoding mode including a constant-resolution decoding mode or a mixed-resolution decoding mode; and decode, according to the target video sequence decoding mode, the encoded data corresponding to the video sequence by using the decoding module 1806, to obtain a corresponding decoded video frame sequence.

In an embodiment, a computer device is provided. The computer device may be shown in FIG. 19 or FIG. 20. The computer device includes a memory, a processor, and a computer program being stored on the memory and executable on the processor, the processor, when performing the computer program, implementing the following steps: obtaining an input video sequence; obtaining, from candidate video sequence encoding modes, a target video sequence encoding mode corresponding to the input video sequence, the candidate video sequence encoding modes including a constant-resolution encoding mode and a mixed-resolution encoding mode; and encoding each input video frame of the input video sequence according to the target video sequence encoding mode, to obtain encoded data.

In an embodiment, the step performed by the processor, that is, the encoding each input video frame of the input video sequence according to the target video sequence encoding mode to obtain encoded data includes: performing constant-resolution encoding on each input video frame of the input video sequence in a case that the target video sequence encoding mode is the constant-resolution encoding mode.

In an embodiment, the step performed by the processor, that is, the encoding each input video frame of the input video sequence according to the target video sequence encoding mode to obtain encoded data includes: obtaining a processing manner corresponding to the input video frame in a case that the target video sequence encoding mode is the mixed-resolution encoding mode; processing the input video frame according to the processing manner, to obtain a current frame, a resolution of the current frame corresponding to the processing manner being a resolution of the input video frame or being less than a resolution of the input video frame; and encoding the current frame at the resolution of the current frame, to obtain the encoded data corresponding to the input video frame.

In an embodiment, the step performed by the processor, that is, the obtaining, from candidate video sequence encoding modes, a target video sequence encoding mode corresponding to the input video sequence includes: obtaining current environment information, the current environment information including at least one of current encoding environment information and current decoding environment information; and obtaining, from the candidate video sequence encoding modes according to the current environment information, the target video sequence encoding mode corresponding to the input video sequence.

In an embodiment, the current environment information includes current application scenario information; and the target video sequence encoding mode is the mixed-resolution encoding mode in a case that a current application scenario corresponding to the current application scenario information is a real-time application scenario.

In an embodiment, the step performed by the processor, that is, the encoding each input video frame of the input video sequence according to the target video sequence encoding mode, to obtain encoded data includes: adding target video sequence encoding mode information corresponding to the target video sequence encoding mode to the encoded data.

In an embodiment, the step performed by the processor, that is, the encoding the current frame at the resolution of the current frame, to obtain the encoded data corresponding to the input video frame includes: adding processing manner information corresponding to the processing manner to the encoded data corresponding to the input video frame.

In an embodiment, the step performed by the processor, that is, the obtaining a processing manner corresponding to the input video frame includes: obtaining a processing parameter corresponding to the input video frame, and determining the processing manner corresponding to the input video frame according to the processing parameter; and the step performed by the processor, that is, the adding processing manner information corresponding to the processing manner to the encoded data corresponding to the input video frame includes: adding, when the processing parameter cannot be reproduced in a decoding process, the processing manner information corresponding to the processing manner to the encoded data corresponding to the input video frame.

In an embodiment, the step performed by the processor, that is, the encoding the current frame at the resolution of the current frame, to obtain the encoded data corresponding to the input video frame includes: obtaining a reference frame corresponding to the current frame; and encoding the current frame at the resolution of the current frame and according to the reference frame, to obtain the encoded data corresponding to the input video frame.

In an embodiment, the step performed by the processor, that is, the encoding the current frame according to the reference frame, to obtain encoded data corresponding to the input video frame includes: determining a first vector transformation parameter according to resolution information of the current frame and first resolution information, the first resolution information including resolution information of the reference frame or target motion vector unit resolution information corresponding to the input video frame; and obtaining, according to the first vector transformation parameter, a target motion vector corresponding to each encoded block in the current frame.

In an embodiment, the step performed by the processor, that is, the encoding the current frame according to the reference frame, to obtain encoded data corresponding to the input video frame includes: performing sampling processing on the reference frame according to resolution information of the current frame, to obtain a corresponding target reference frame; and encoding the current frame according to the target reference frame, to obtain the encoded data corresponding to the input video frame.

In an embodiment, the step performed by the processor, that is, the encoding the current frame at the resolution of the current frame, to obtain the encoded data corresponding to the input video frame includes: obtaining, at the resolution of the current frame, a corresponding encoding manner when the current frame is encoded; and adding encoding manner information corresponding to the encoding manner to the encoded data corresponding to the input video frame.

In an embodiment, the step performed by the processor, that is, the determining a first vector transformation parameter according to resolution information of the current frame and first resolution information includes: determining the first vector transformation parameter according to the resolution information of the current frame and the resolution information of the reference frame; and the step performed by the processor, that is, the obtaining, according to the first vector transformation parameter, a target motion vector corresponding to each encoded block in the current frame includes: obtaining first location information corresponding to a current encoded block, and obtaining second location information corresponding to a target reference block corresponding to the current encoded block; and calculating a target motion vector corresponding to the current encoded block according to the first vector transformation parameter, the first location information, and the second location information.

In an embodiment, the step performed by the processor, that is, the determining a first vector transformation parameter according to resolution information of the current frame and first resolution information includes: obtaining target motion vector unit resolution information; and determining the first vector transformation parameter according to the resolution information of the current frame and the target motion vector unit resolution information; and the step performed by the processor, that is, the obtaining, according to the first vector transformation parameter, a target motion vector corresponding to each encoded block in the current frame includes: obtaining a first motion vector according to a displacement between the current encoded block and a corresponding target reference block; and obtaining, according to the first vector transformation parameter and the first motion vector, a target motion vector corresponding to the current encoded block.

In an embodiment, the step performed by the processor, that is, the encoding the current frame according to the reference frame, to obtain encoded data corresponding to the input video frame includes: obtaining an initial predicted motion vector corresponding to a current encoded block; obtaining a second vector transformation parameter according to current motion vector unit resolution information corresponding to the initial predicted motion vector and the target motion vector unit resolution information; obtaining, according to the initial predicted motion vector and the second vector transformation parameter, a target predicted motion vector corresponding to the current encoded block; and obtaining a motion vector difference according to the target motion vector and the target predicted motion vector.

In an embodiment, the step performed by the processor, that is, the performing sampling processing on the reference frame according to resolution information of the current frame, to obtain a corresponding target reference frame includes: performing sampling processing on the reference frame according to the resolution information and motion estimation pixel precision of the current frame, to obtain the corresponding target reference frame.

In an embodiment, the step performed by the processor, that is, the performing sampling processing on the reference frame according to the resolution information and motion estimation pixel precision of the current frame, to obtain the corresponding target reference frame includes: calculating pixel interpolation precision according to the resolution information and the motion estimation pixel precision of the current frame; and directly performing sub-pixel interpolation processing on the reference frame according to the pixel interpolation precision, to obtain the corresponding target reference frame.

In an embodiment, the step performed by the processor, that is, the performing sampling processing on the reference frame according to the resolution information and motion estimation pixel precision of the current frame, to obtain the corresponding target reference frame includes: performing sampling processing on the reference frame according to the resolution information of the current frame, to obtain an intermediate reference frame; and performing sub-pixel interpolation processing on the intermediate reference frame according to the motion estimation pixel precision, to obtain the target reference frame.

In an embodiment, the step performed by the processor, that is, the encoding the current frame at the resolution of the current frame, to obtain the encoded data corresponding to the input video frame includes: adding sampling manner information corresponding to sampling processing performed on the reference frame to encoded data corresponding to the reference frame.

In an embodiment, the step performed by the processor, that is, the obtaining a reference frame corresponding to the current frame includes: obtaining a first reference rule, the first reference rule including a resolution magnitude relationship between the current frame and the reference frame; and obtaining, according to the first reference rule, the reference frame corresponding to the current frame.

In an embodiment, the step performed by the processor, that is, the encoding the current frame at the resolution of the current frame, to obtain the encoded data corresponding to the input video frame includes: adding rule information corresponding to the first reference rule to the encoded data corresponding to the input video frame.

In an embodiment, the step performed by the processor, that is, the obtaining a processing manner corresponding to the input video frame includes: calculating a proportion of target prediction-type encoded blocks in a forward-encoded video frame corresponding to the input video frame; and determining, according to the proportion, the processing manner corresponding to the input video frame.

In an embodiment, the processing manner includes downsampling, and the step performed by the processor, that is, the processing the input video frame according to the processing manner, to obtain a current frame includes: performing downsampling processing on the input video frame, to obtain the current frame.

In an embodiment, the step performed by the processor, that is, the encoding the current frame at the resolution of the current frame, to obtain the encoded data corresponding to the input video frame includes: adding downsampling processing manner information corresponding to downsampling processing to the encoded data corresponding to the input video frame.

In an embodiment, a computer-readable storage medium is provided. The computer-readable storage medium stores a computer program, the computer program, when executed by a processor, causing the processor to perform the following steps: obtaining an input video sequence; obtaining, from candidate video sequence encoding modes, a target video sequence encoding mode corresponding to the input video sequence, the candidate video sequence encoding modes including a constant-resolution encoding mode and a mixed-resolution encoding mode; and encoding each input video frame of the input video sequence according to the target video sequence encoding mode, to obtain encoded data.

In an embodiment, the step performed by the processor, that is, the encoding each input video frame of the input video sequence according to the target video sequence encoding mode to obtain encoded data includes: performing constant-resolution encoding on each input video frame of the input video sequence in a case that the target video sequence encoding mode is the constant-resolution encoding mode.

In an embodiment, the step performed by the processor, that is, the encoding each input video frame of the input video sequence according to the target video sequence encoding mode to obtain encoded data includes: obtaining a processing manner corresponding to the input video frame in a case that the target video sequence encoding mode is the mixed-resolution encoding mode; processing the input video frame according to the processing manner, to obtain a current frame, a resolution of the current frame corresponding to the processing manner being a resolution of the input video frame or being less than a resolution of the input video frame; and encoding the current frame at the resolution of the current frame, to obtain the encoded data corresponding to the input video frame.

In an embodiment, the step performed by the processor, that is, the obtaining, from candidate video sequence encoding modes, a target video sequence encoding mode corresponding to the input video sequence includes: obtaining current environment information, the current environment information including at least one of current encoding environment information and current decoding environment information; and obtaining, from the candidate video sequence encoding modes according to the current environment information, the target video sequence encoding mode corresponding to the input video sequence.

In an embodiment, the current environment information includes current application scenario information; and the target video sequence encoding mode is the mixed-resolution encoding mode in a case that a current application scenario corresponding to the current application scenario information is a real-time application scenario.

In an embodiment, the step performed by the processor, that is, the encoding each input video frame of the input video sequence according to the target video sequence encoding mode, to obtain encoded data includes: adding target video sequence encoding mode information corresponding to the target video sequence encoding mode to the encoded data.

In an embodiment, the step performed by the processor, that is, the encoding the current frame at the resolution of the current frame, to obtain the encoded data corresponding to the input video frame includes: adding processing manner information corresponding to the processing manner to the encoded data corresponding to the input video frame.

In an embodiment, the step performed by the processor, that is, the obtaining a processing manner corresponding to the input video frame includes: obtaining a processing parameter corresponding to the input video frame, and determining the processing manner corresponding to the input video frame according to the processing parameter; and the step performed by the processor, that is, the adding processing manner information corresponding to the processing manner to the encoded data corresponding to the input video frame includes: adding, when the processing parameter cannot be reproduced in a decoding process, the processing manner information corresponding to the processing manner to the encoded data corresponding to the input video frame.

In an embodiment, the step performed by the processor, that is, the encoding the current frame at the resolution of the current frame, to obtain the encoded data corresponding to the input video frame includes: obtaining a reference frame corresponding to the current frame; and encoding the current frame at the resolution of the current frame and according to the reference frame, to obtain the encoded data corresponding to the input video frame.

In an embodiment, the step performed by the processor, that is, the encoding the current frame according to the reference frame, to obtain encoded data corresponding to the input video frame includes: determining a first vector transformation parameter according to resolution information of the current frame and first resolution information, the first resolution information including resolution information of the reference frame or target motion vector unit resolution information corresponding to the input video frame; and obtaining, according to the first vector transformation parameter, a target motion vector corresponding to each encoded block in the current frame.

In an embodiment, the step performed by the processor, that is, the encoding the current frame according to the reference frame, to obtain encoded data corresponding to the input video frame includes: performing sampling processing on the reference frame according to resolution information of the current frame, to obtain a corresponding target reference frame; and encoding the current frame according to the target reference frame, to obtain the encoded data corresponding to the input video frame.

In an embodiment, the step performed by the processor, that is, the encoding the current frame at the resolution of the current frame, to obtain the encoded data corresponding to the input video frame includes: obtaining, at the resolution of the current frame, a corresponding encoding manner when the current frame is encoded; and adding encoding manner information corresponding to the encoding manner to the encoded data corresponding to the input video frame.

In an embodiment, the step performed by the processor, that is, the determining a first vector transformation parameter according to resolution information of the current frame and first resolution information includes: determining the first vector transformation parameter according to the resolution information of the current frame and the resolution information of the reference frame; and the step performed by the processor, that is, the obtaining, according to the first vector transformation parameter, a target motion vector corresponding to each encoded block in the current frame includes: obtaining first location information corresponding to a current encoded block, and obtaining second location information corresponding to a target reference block corresponding to the current encoded block; and calculating a target motion vector corresponding to the current encoded block according to the first vector transformation parameter, the first location information, and the second location information.

In an embodiment, the step performed by the processor, that is, the determining a first vector transformation parameter according to resolution information of the current frame and first resolution information includes: obtaining target motion vector unit resolution information; and determining the first vector transformation parameter according to the resolution information of the current frame and the target motion vector unit resolution information; and the step performed by the processor, that is, the obtaining, according to the first vector transformation parameter, a target motion vector corresponding to each encoded block in the current frame includes: obtaining a first motion vector according to a displacement between the current encoded block and a corresponding target reference block; and obtaining, according to the first vector transformation parameter and the first motion vector, a target motion vector corresponding to the current encoded block.

In an embodiment, the step performed by the processor, that is, the encoding the current frame according to the reference frame, to obtain encoded data corresponding to the input video frame includes: obtaining an initial predicted motion vector corresponding to a current encoded block; obtaining a second vector transformation parameter according to current motion vector unit resolution information corresponding to the initial predicted motion vector and the target motion vector unit resolution information; obtaining, according to the initial predicted motion vector and the second vector transformation parameter, a target predicted motion vector corresponding to the current encoded block; and obtaining a motion vector difference according to the target motion vector and the target predicted motion vector.

In an embodiment, the step performed by the processor, that is, the performing sampling processing on the reference frame according to resolution information of the current frame, to obtain a corresponding target reference frame includes: performing sampling processing on the reference frame according to the resolution information and motion estimation pixel precision of the current frame, to obtain the corresponding target reference frame.

In an embodiment, the step performed by the processor, that is, the performing sampling processing on the reference frame according to the resolution information and motion estimation pixel precision of the current frame, to obtain the corresponding target reference frame includes: calculating pixel interpolation precision according to the resolution information and the motion estimation pixel precision of the current frame; and directly performing sub-pixel interpolation processing on the reference frame according to the pixel interpolation precision, to obtain the corresponding target reference frame.

In an embodiment, the step performed by the processor, that is, the performing sampling processing on the reference frame according to the resolution information and motion estimation pixel precision of the current frame, to obtain the corresponding target reference frame includes: performing sampling processing on the reference frame according to the resolution information of the current frame, to obtain an intermediate reference frame; and performing sub-pixel interpolation processing on the intermediate reference frame according to the motion estimation pixel precision, to obtain the target reference frame.

In an embodiment, the step performed by the processor, that is, the encoding the current frame at the resolution of the current frame, to obtain the encoded data corresponding to the input video frame includes: adding sampling manner information corresponding to sampling processing performed on the reference frame to encoded data corresponding to the reference frame.

In an embodiment, the step performed by the processor, that is, the obtaining a reference frame corresponding to the current frame includes: obtaining a first reference rule, the first reference rule including a resolution magnitude relationship between the current frame and the reference frame; and obtaining, according to the first reference rule, the reference frame corresponding to the current frame.

In an embodiment, the step performed by the processor, that is, the encoding the current frame at the resolution of the current frame, to obtain the encoded data corresponding to the input video frame includes: adding rule information corresponding to the first reference rule to the encoded data corresponding to the input video frame.

In an embodiment, the step performed by the processor, that is, the obtaining a processing manner corresponding to the input video frame includes: calculating a proportion of target prediction-type encoded blocks in a forward-encoded video frame corresponding to the input video frame; and determining, according to the proportion, the processing manner corresponding to the input video frame.

In an embodiment, the processing manner includes downsampling, and the step performed by the processor, that is, the processing the input video frame according to the processing manner, to obtain a current frame includes: performing downsampling processing on the input video frame, to obtain the current frame.

In an embodiment, the step performed by the processor, that is, the encoding the current frame at the resolution of the current frame, to obtain the encoded data corresponding to the input video frame includes: adding downsampling processing manner information corresponding to downsampling processing to the encoded data corresponding to the input video frame.

In an embodiment, a computer device is provided. The computer device may be shown in FIG. 19 or FIG. 20. The computer device includes a memory, a processor, and a computer program being stored on the memory and executable on the processor, the processor, when performing the computer program, implementing the following steps: obtaining encoded data corresponding to a video sequence; obtaining a target video sequence decoding mode corresponding to the video sequence, the target video sequence decoding mode including a constant-resolution decoding mode or a mixed-resolution decoding mode; and decoding, according to the target video sequence decoding mode, the encoded data corresponding to the video sequence, to obtain a corresponding decoded video frame sequence.

In an embodiment, the step performed by the processor, that is, the decoding, according to the target video sequence decoding mode, the encoded data corresponding to the video sequence, to obtain a corresponding decoded video frame sequence includes: performing constant-resolution decoding on each current video frame of the video sequence in a case that the target video sequence decoding mode is the constant-resolution decoding mode.

In an embodiment, the step performed by the processor, that is, the decoding, according to the target video sequence decoding mode, the encoded data corresponding to the video sequence, to obtain a corresponding decoded video frame sequence includes: obtaining resolution information corresponding to a current video frame in a case that the target video sequence decoding mode is the mixed-resolution decoding mode; decoding the encoded data according to the resolution information corresponding to the current video frame, to obtain a reconstructed video frame corresponding to the current video frame; and processing the reconstructed video frame according to the resolution information corresponding to the current video frame, to obtain the corresponding decoded video frame.

In an embodiment, the step performed by the processor, that is, the obtaining a target video sequence decoding mode corresponding to the video sequence includes: obtaining current environment information, the current environment information including at least one of current encoding environment information and current decoding environment information; and obtaining, from candidate video sequence decoding modes according to the current environment information, the target video sequence decoding mode corresponding to the video sequence.

In an embodiment, the step performed by the processor, that is, the obtaining a target video sequence decoding mode corresponding to the video sequence includes: obtaining the target video sequence decoding mode by parsing the encoded data corresponding to the video sequence.

In an embodiment, the step performed by the processor, that is, the obtaining resolution information corresponding to a current video frame includes: reading processing manner information from the encoded data, and obtaining, according to the processing manner information, the resolution information corresponding to the current video frame.

In an embodiment, the step performed by the processor, that is, the obtaining resolution information corresponding to a current video frame includes: calculating a proportion of target prediction-type decoded blocks in a forward-decoded video frame corresponding to the current video frame; determining, according to the proportion, a processing manner corresponding to the current video frame; and obtaining, according to the processing manner, the resolution information corresponding to the current video frame.

In an embodiment, the step performed by the processor, that is, the decoding the encoded data according to the resolution information corresponding to the current video frame, to obtain a reconstructed video frame corresponding to the current video frame includes: obtaining a reference frame corresponding to the current video frame; and decoding the encoded data according to the resolution information corresponding to the current video frame and the reference frame, to obtain the reconstructed video frame corresponding to the current video frame.

In an embodiment, the step performed by the processor, that is, the decoding the encoded data according to the resolution information corresponding to the current video frame and the reference frame, to obtain the reconstructed video frame corresponding to the current video frame includes: determining a third vector transformation parameter according to the resolution information corresponding to the current video frame and first resolution information, the first resolution information including target motion vector unit resolution information or resolution information of the reference frame; obtaining, according to the encoded data, a target motion vector corresponding to each block in the current video frame; obtaining, according to the third vector transformation parameter and the target motion vector, a target reference block corresponding to each block in the current video frame; and decoding the encoded data according to the target reference block, to obtain the reconstructed video frame corresponding to the current video frame.

In an embodiment, the step performed by the processor, that is, the determining a third vector transformation parameter according to the resolution information corresponding to the current video frame and first resolution information includes: determining the third vector transformation parameter according to the resolution information corresponding to the current video frame and the resolution information of the reference frame; and the step performed by the processor, that is, the obtaining, according to the third vector transformation parameter and the target motion vector, a target reference block corresponding to each block in the current video frame includes: obtaining first location information corresponding to a current block; and obtaining, according to the first location information, the third vector transformation parameter, and the target motion vector, a target reference block corresponding to the current block.

In an embodiment, the step performed by the processor, that is, the determining a third vector transformation parameter according to the resolution information corresponding to the current video frame and first resolution information includes: determining the third vector transformation parameter according to the resolution information corresponding to the current video frame and the target motion vector unit resolution information; and the step performed by the processor, that is, the obtaining, according to the third vector transformation parameter and the target motion vector, a target reference block corresponding to each block in the current video frame includes: obtaining a first motion vector according to the target motion vector and the third vector transformation parameter; and obtaining, according to the first motion vector, a target reference block corresponding to a current block.

In an embodiment, the step performed by the processor, that is, the obtaining, according to the encoded data, a target motion vector corresponding to each block in the current video frame includes: obtaining, according to the encoded data, a motion vector difference corresponding to a current block in the current video frame; obtaining an initial predicted motion vector corresponding to the current block; obtaining a second vector transformation parameter according to current motion vector unit resolution information corresponding to the initial predicted motion vector and the target motion vector unit resolution information; obtaining, according to the initial predicted motion vector and the second vector transformation parameter, a target predicted motion vector corresponding to the current block; and obtaining the target motion vector according to the target predicted motion vector and the motion vector difference.

In an embodiment, the step performed by the processor, that is, the decoding the encoded data according to the resolution information corresponding to the current video frame and the reference frame, to obtain a reconstructed video frame corresponding to the current video frame includes: performing sampling processing on the reference frame according to the resolution information corresponding to the current video frame, to obtain a corresponding target reference frame; and decoding the current video frame according to the target reference frame, to obtain the reconstructed video frame corresponding to the current video frame.

In an embodiment, the step performed by the processor, that is, the performing sampling processing on the reference frame according to the resolution information corresponding to the current video frame, to obtain a corresponding target reference frame includes: processing the reference frame according to the resolution information and motion estimation pixel precision of the current video frame, to obtain the corresponding target reference frame.

In an embodiment, the step performed by the processor, that is, the performing sampling processing on the reference frame according to the resolution information and motion estimation pixel precision of the current video frame, to obtain the corresponding target reference frame includes: calculating pixel interpolation precision according to the resolution information and the motion estimation pixel precision of the current video frame; and directly performing sub-pixel interpolation processing on the reference frame according to the pixel interpolation precision, to obtain the corresponding target reference frame.

In an embodiment, the step performed by the processor, that is, the performing sampling processing on the reference frame according to the resolution information and motion estimation pixel precision of the current video frame, to obtain the corresponding target reference frame includes: performing sampling processing on the reference frame according to the resolution information of the current video frame, to obtain an intermediate reference frame; and performing sub-pixel interpolation processing on the intermediate reference frame according to the motion estimation pixel precision, to obtain the target reference frame.

In an embodiment, the step performed by the processor, that is, the obtaining a reference frame corresponding to the current video frame includes: obtaining a second reference rule, the second reference rule including a resolution magnitude relationship between the current video frame and the reference frame; and obtaining, according to the second reference rule, the reference frame corresponding to the current video frame.

In an embodiment, a computer-readable storage medium is provided. The computer-readable storage medium stores a computer program, the computer program, when executed by a processor, causing the processor to perform the following steps:

obtaining encoded data corresponding to a video sequence; obtaining a target video sequence decoding mode corresponding to the video sequence, the target video sequence decoding mode including a constant-resolution decoding mode or a mixed-resolution decoding mode; and decoding, according to the target video sequence decoding mode, the encoded data corresponding to the video sequence, to obtain a corresponding decoded video frame sequence.

In an embodiment, the step performed by the processor, that is, the decoding, according to the target video sequence decoding mode, the encoded data corresponding to the video sequence, to obtain a corresponding decoded video frame sequence includes: performing constant-resolution decoding on each current video frame of the video sequence in a case that the target video sequence decoding mode is the constant-resolution decoding mode.

In an embodiment, the step performed by the processor, that is, the decoding, according to the target video sequence decoding mode, the encoded data corresponding to the video sequence, to obtain a corresponding decoded video frame sequence includes: obtaining resolution information corresponding to a current video frame in a case that the target video sequence decoding mode is the mixed-resolution decoding mode; decoding the encoded data according to the resolution information corresponding to the current video frame, to obtain a reconstructed video frame corresponding to the current video frame; and processing the reconstructed video frame according to the resolution information corresponding to the current video frame, to obtain the corresponding decoded video frame.

In an embodiment, the step performed by the processor, that is, the obtaining a target video sequence decoding mode corresponding to the video sequence includes: obtaining current environment information, the current environment information including at least one of current encoding environment information and current decoding environment information; and obtaining, from candidate video sequence decoding modes according to the current environment information, the target video sequence decoding mode corresponding to the video sequence.

In an embodiment, the step performed by the processor, that is, the obtaining a target video sequence decoding mode corresponding to the video sequence includes: obtaining the target video sequence decoding mode by parsing the encoded data corresponding to the video sequence.

In an embodiment, the step performed by the processor, that is, the obtaining resolution information corresponding to a current video frame includes: reading processing manner information from the encoded data, and obtaining, according to the processing manner information, the resolution information corresponding to the current video frame.

In an embodiment, the step performed by the processor, that is, the obtaining resolution information corresponding to a current video frame includes: calculating a proportion of target prediction-type decoded blocks in a forward-decoded video frame corresponding to the current video frame; determining, according to the proportion, a processing manner corresponding to the current video frame; and obtaining, according to the processing manner, the resolution information corresponding to the current video frame.

In an embodiment, the step performed by the processor, that is, the decoding the encoded data according to the resolution information corresponding to the current video frame, to obtain a reconstructed video frame corresponding to the current video frame includes: obtaining a reference frame corresponding to the current video frame; and decoding the encoded data according to the resolution information corresponding to the current video frame and the reference frame, to obtain the reconstructed video frame corresponding to the current video frame.

In an embodiment, the step performed by the processor, that is, the decoding the encoded data according to the resolution information corresponding to the current video frame and the reference frame, to obtain the reconstructed video frame corresponding to the current video frame includes: determining a third vector transformation parameter according to the resolution information corresponding to the current video frame and first resolution information, the first resolution information including target motion vector unit resolution information or resolution information of the reference frame; obtaining, according to the encoded data, a target motion vector corresponding to each block in the current video frame; obtaining, according to the third vector transformation parameter and the target motion vector, a target reference block corresponding to each block in the current video frame; and decoding the encoded data according to the target reference block, to obtain the reconstructed video frame corresponding to the current video frame.

In an embodiment, the step performed by the processor, that is, the determining a third vector transformation parameter according to the resolution information corresponding to the current video frame and first resolution information includes: determining the third vector transformation parameter according to the resolution information corresponding to the current video frame and the resolution information of the reference frame; and the step performed by the processor, that is, the obtaining, according to the third vector transformation parameter and the target motion vector, a target reference block corresponding to each block in the current video frame includes: obtaining first location information corresponding to a current block; and obtaining, according to the first location information, the third vector transformation parameter, and the target motion vector, a target reference block corresponding to the current block.

In an embodiment, the step performed by the processor, that is, the determining a third vector transformation parameter according to the resolution information corresponding to the current video frame and first resolution information includes: determining the third vector transformation parameter according to the resolution information corresponding to the current video frame and the target motion vector unit resolution information; and the step performed by the processor, that is, the obtaining, according to the third vector transformation parameter and the target motion vector, a target reference block corresponding to each block in the current video frame includes: obtaining a first motion vector according to the target motion vector and the third vector transformation parameter; and obtaining, according to the first motion vector, a target reference block corresponding to a current block.

In an embodiment, the step performed by the processor, that is, the obtaining, according to the encoded data, a target motion vector corresponding to each block in the current video frame includes: obtaining, according to the encoded data, a motion vector difference corresponding to a current block in the current video frame; obtaining an initial predicted motion vector corresponding to the current block; obtaining a second vector transformation parameter according to current motion vector unit resolution information corresponding to the initial predicted motion vector and the target motion vector unit resolution information; obtaining, according to the initial predicted motion vector and the second vector transformation parameter, a target predicted motion vector corresponding to the current block; and obtaining the target motion vector according to the target predicted motion vector and the motion vector difference.

In an embodiment, the step performed by the processor, that is, the decoding the encoded data according to the resolution information corresponding to the current video frame and the reference frame, to obtain a reconstructed video frame corresponding to the current video frame includes: performing sampling processing on the reference frame according to the resolution information corresponding to the current video frame, to obtain a corresponding target reference frame; and decoding the current video frame according to the target reference frame, to obtain the reconstructed video frame corresponding to the current video frame.

In an embodiment, the step performed by the processor, that is, the performing sampling processing on the reference frame according to the resolution information corresponding to the current video frame, to obtain a corresponding target reference frame includes: processing the reference frame according to the resolution information and motion estimation pixel precision of the current video frame, to obtain the corresponding target reference frame.

In an embodiment, the step performed by the processor, that is, the performing sampling processing on the reference frame according to the resolution information and motion estimation pixel precision of the current video frame, to obtain the corresponding target reference frame includes: calculating pixel interpolation precision according to the resolution information and the motion estimation pixel precision of the current video frame; and directly performing sub-pixel interpolation processing on the reference frame according to the pixel interpolation precision, to obtain the corresponding target reference frame.

In an embodiment, the step performed by the processor, that is, the performing sampling processing on the reference frame according to the resolution information and motion estimation pixel precision of the current video frame, to obtain the corresponding target reference frame includes: performing sampling processing on the reference frame according to the resolution information of the current video frame, to obtain an intermediate reference frame; and performing sub-pixel interpolation processing on the intermediate reference frame according to the motion estimation pixel precision, to obtain the target reference frame.

In an embodiment, the step performed by the processor, that is, the obtaining a reference frame corresponding to the current video frame includes: obtaining a second reference rule, the second reference rule including a resolution magnitude relationship between the current video frame and the reference frame; and obtaining, according to the second reference rule, the reference frame corresponding to the current video frame.

It is to be understood that although the steps in the flowcharts of the embodiments of this application are displayed in order according to arrows, the steps are not necessarily performed in the order indicated by the arrows. Unless explicitly specified in this application, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

A person of ordinary skill in the art may understand that all or some of the procedures of the methods in the foregoing embodiments may be implemented by a computer program instructing relevant hardware. The program may be stored in a non-volatile computer-readable storage medium. When the program is executed, the program may include the procedures of the embodiments of the foregoing methods. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), synchronous link (Synch-link) DRAM (SLDRAM), a Rambus direct RAM (RDRAM), a direct Rambus dynamic RAM (DRDRAM), and a Rambus dynamic RAM (DRAM).

Technical features of the foregoing embodiments may be randomly combined. To make the description concise, not all possible combinations of the technical features in the foregoing embodiments are described. However, the combinations of the technical features shall be considered as falling within the scope recorded by this specification provided that no conflict exists.

The foregoing embodiments show several implementations of this application and are described in detail, but they are not to be construed as a limit to the scope of this application. A person of ordinary skill in the art may make several variations and improvements without departing from the ideas of this application, the variations and improvements shall fall within the protection scope of this application. Therefore, the protection scope of this application shall be subject to the appended claims.

What is claimed is:

1. A video encoding method, performed by a computer device having a processor and memory storing a plurality of computer programs to be executed by the processor, the method comprising:
obtaining an input video sequence;
selecting, from one or more candidate video sequence encoding modes, a target video sequence encoding mode for the input video sequence according to one or more attributes of the input video sequence and/or the computer device, the attributes including: a real-time or non-real time application of the input video sequence, a bandwidth for playback of the input video sequence, and a processing speed of the processor, wherein:
the selected target video sequence encoding mode is a mixed-resolution encoding mode; and
in the mixed-resolution encoding mode, different input video frames in the input video sequence are encoded at varying resolutions that are adaptively adjusted according to the one or more attributes;
encoding each of the input video frames of the input video sequence according to the target video sequence encoding mode, including encoding a first frame of the input video frames at a first resolution and a second frame of the input video frames at a second resolution that is distinct from the first resolution;
processing each frame of the input video sequence according to the target video sequence encoding mode information, further including:
adding, to sequence-level header information of the encoded data, a flag bit for describing the target video sequence encoding mode, wherein the flag bit has a first predefined value corresponding to the mix-resolution encoding mode; and
for each of the video input frames, adding a respective frame-level header information indicating a respective processing manner for the input video frame to achieve the respective resolution; and
obtaining the encoded data in accordance with the encoding.

2. The method according to claim 1, wherein encoding each of the input video frames of the input video sequence further comprises:
obtaining a processing manner corresponding to the input video frame when the target video sequence encoding mode is the mixed-resolution encoding mode;
processing the input video frame according to the processing manner to obtain a current frame having a resolution that corresponds to a resolution of the input video frame or a resolution that is less than a resolution of the input video frame; and
encoding the current frame at the resolution to obtain the encoded data corresponding to the input video frame.

3. The method according to claim 1, wherein selecting the target video sequence encoding mode further comprises:
obtaining current environment information, the current environment information comprising at least one of current encoding environment information and current decoding environment information.

4. The method according to claim 3, wherein the current environment information further comprises current application scenario information; and the method further comprises:
selecting the mixed-resolution encoding mode as the target video sequence encoding mode when the current application scenario is a real-time application scenario.

5. The method according to claim 1, wherein adding the flag bit for describing the target video sequence encoding mode comprises adding the flag bit to sequence-level header information of the encoded data, and the first predefined value corresponding to the mixed-resolution encoding mode is 1.

6. A computer device, comprising:
a processor; and
memory;
the memory storing a plurality of computer programs that, when executed by the processor, causing the processor to perform a plurality of operations including:
obtaining an input video sequence;
selecting, from one or more candidate video sequence encoding modes, a target video sequence encoding mode for the input video sequence according to one or more attributes of the input video sequence and/or the computer device, the attributes including: a real-time or non-real time application of the input video sequence, a bandwidth for playback of the input video sequence, and a processing speed of the processor, wherein:
the selected target video sequence encoding mode is a mixed-resolution encoding mode; and
in the mixed-resolution encoding mode, different input video frames in the input video sequence are encoded at varying resolutions that are adaptively adjusted according to the one or more attributes;
encoding each of the input video frames of the input video sequence according to the target video sequence encoding mode, including encoding a first frame of the input video frames at a first resolution and a second frame of the input video frames at a second resolution that is distinct from the first resolution;
processing each frame of the input video sequence according to the target video sequence encoding mode information, further including:
adding, to sequence-level header information of the encoded data, a flag bit for describing the target video sequence encoding mode, wherein the flag bit has a first predefined value corresponding to the mix-resolution encoding mode; and for each of the video input frames, adding a respective frame-level header information indicating a respective processing manner for the input video frame to achieve the respective resolution; and obtaining the encoded data in accordance with the encoding.

7. The computer device according to claim 6, wherein encoding each of the input video frames of the input video sequence further comprises:

obtaining a processing manner corresponding to the input video frame when the target video sequence encoding mode is the mixed-resolution encoding mode;

processing the input video frame according to the processing manner to obtain a current frame having a resolution that corresponds to a resolution of the input video frame or a resolution that is less than a resolution of the input video frame; and encoding the current frame at the resolution to obtain encoded data corresponding to the input video frame.

8. The computer device according to claim 6, wherein selecting the target video sequence encoding mode further comprises:

obtaining current environment information, the current environment information comprising at least one of current encoding environment information and current decoding environment information.

9. The computer device according to claim 8, wherein the current environment information further comprises current application scenario information; and the plurality of operations further include:

selecting the mixed-resolution encoding mode as the target video sequence encoding mode when the current application scenario is a real-time application scenario.

10. The computer device according to claim 6, wherein adding flag bit for describing the target video sequence encoding mode comprises adding the flag bit to sequence-level header information of the encoded data, and the first predefined value corresponding to the mixed-resolution encoding mode is 1.

11. A non-transitory computer-readable storage medium, storing a plurality of computer programs that, when executed by a processor of a computer device, cause the computer device to perform a plurality of operations including:

obtaining an input video sequence;

selecting, from one or more candidate video sequence encoding modes, a target video sequence encoding mode for the input video sequence according to one or more attributes of the input video sequence and/or the computer device, the attributes including: a real-time or non-real time application of the input video sequence, a bandwidth for playback of the input video sequence, and a processing speed of the processor, wherein:

the selected target video sequence encoding mode is a mixed-resolution encoding mode; and in the mixed-resolution encoding mode, different input video frames in the input video sequence are encoded at varying resolutions that are adaptively adjusted according to the one or more attributes;

encoding each of the input video frames of the input video sequence according to the target video sequence encoding mode, including encoding a first frame of the input video frames at a first resolution and a second frame of the input video frames at a second resolution that is distinct from the first resolution;

processing each frame of the input video sequence according to the target video sequence encoding mode information, further including:

adding, to sequence-level header information of the encoded data, a flag bit for describing the target video sequence encoding mode, wherein the flag bit has a first predefined value corresponding to the mix-resolution encoding mode; and for each of the video input frames, adding a respective frame-level header information indicating a respective processing manner for the input video frame to achieve the respective resolution; and obtaining the encoded data in accordance with the encoding.

12. The non-transitory computer-readable storage medium according to claim 11, wherein encoding each of the input video frames of the input video sequence further comprises:

obtaining a processing manner corresponding to the input video frame when the target video sequence encoding mode is the mixed-resolution encoding mode;

processing the input video frame according to the processing manner to obtain a current frame having a resolution that corresponds to a resolution of the input video frame or a resolution that is less than a resolution of the input video frame; and encoding the current frame at the resolution to obtain encoded data corresponding to the input video frame.

13. The non-transitory computer-readable storage medium according to claim 11, wherein selecting the target video sequence encoding mode further comprises:

obtaining current environment information, the current environment information comprising at least one of current encoding environment information and current decoding environment information.

14. The non-transitory computer-readable storage medium according to claim 13, wherein the current environment information further comprises current application scenario information; and the plurality of operations further include:

selecting the mixed-resolution encoding mode as the target video sequence encoding mode when the current application scenario is a real-time application scenario.

* * * * *